United States Patent
Kim et al.

(10) Patent No.: US 12,149,362 B2
(45) Date of Patent: Nov. 19, 2024

(54) METHOD AND APPARATUS FOR TRANSMITTING A HYBRID AUTOMATIC REPEAT REQUEST (HARQ) RESPONSE OF A PHYSICAL DOWNLINK SHARED CHANNEL (PDSCH)

(71) Applicant: ELECTRONICS AND TELECOMMUNICATIONS RESEARCH INSTITUTE, Daejeon (KR)

(72) Inventors: Cheul Soon Kim, Daejeon (KR); Sung Hyun Moon, Daejeon (KR); Jung Hoon Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 18/366,422

(22) Filed: Aug. 7, 2023

(65) Prior Publication Data

US 2023/0388062 A1    Nov. 30, 2023

Related U.S. Application Data

(63) Continuation of application No. 17/382,816, filed on Jul. 22, 2021, now Pat. No. 11,764,908.

(30) Foreign Application Priority Data

Jul. 31, 2020  (KR) .................. 10-2020-0096379
Aug. 28, 2020  (KR) .................. 10-2020-0109696
(Continued)

(51) Int. Cl.
*H04W 72/04*  (2023.01)
*H04L 1/1812*  (2023.01)
(Continued)

(52) U.S. Cl.
CPC .......... *H04L 1/1819* (2013.01); *H04L 1/1861* (2013.01); *H04L 1/1893* (2013.01); *H04L 5/0055* (2013.01); *H04L 5/0098* (2013.01)

(58) Field of Classification Search
CPC ... H04L 1/1819; H04L 1/1861; H04L 1/1893; H04L 1/1812; H04L 1/1854;
(Continued)

(56) References Cited

U.S. PATENT DOCUMENTS 10,172,071 B2    1/2019   Abedini et al.
2011/0243048 A1  10/2011  Wang et al.
(Continued)

FOREIGN PATENT DOCUMENTS

WO    2020055075 A1    3/2020
WO    2020145748 A1    7/2020

OTHER PUBLICATIONS

Sandra Lagen et al., "New Radio Beam-based Access to Unlicensed Spectrum: Design Challenges and Solutions", arXiv:1809.10443v2 [cs.NI] Oct. 23, 2019.

*Primary Examiner* — Mahbubul Bar Chowdhury
(74) *Attorney, Agent, or Firm* — Rabin & Berdo, P.C.

(57) ABSTRACT

A method and an apparatus for transmitting a hybrid automatic repeat request (HARQ) response of a physical downlink shared channel (PDSCH) may comprise receiving a first semi-persistent scheduling (SPS) physical downlink shared channel (PDSCH) from a base station, generating first hybrid automatic repeat request-acknowledgement (HARQ-ACK) information of the first SPS PDSCH, determining a second resource after a first resource when transmission of the first HARQ-ACK information is not performed in the first resource, and transmitting a HARQ-ACK codebook including the first HARQ-ACK information using the second resource to the base station.

14 Claims, 22 Drawing Sheets

(30) Foreign Application Priority Data

| Nov. 4, 2020 | (KR) | ........................ 10-2020-0146397 |
| Jan. 18, 2021 | (KR) | ........................ 10-2021-0007059 |
| Apr. 5, 2021 | (KR) | ........................ 10-2021-0044260 |
| May 4, 2021 | (KR) | ........................ 10-2021-0058133 |
| May 11, 2021 | (KR) | ........................ 10-2021-0061031 |
| Jul. 16, 2021 | (KR) | ........................ 10-2021-0093423 |

(51) Int. Cl.
*H04L 1/1829* (2023.01)
*H04L 1/1867* (2023.01)
*H04L 5/00* (2006.01)

(58) Field of Classification Search
CPC ... H04L 5/0055; H04L 5/0098; H04L 5/0044; H04L 5/0048; H04L 5/001
See application file for complete search history.

(56) References Cited

U.S. PATENT DOCUMENTS

| 2011/0243102 | A1 | 10/2011 | Sebire et al. |
| 2013/0188618 | A1 | 7/2013 | Dinan |
| 2014/0022960 | A1 | 1/2014 | Fu et al. |
| 2020/0045709 | A1 | 2/2020 | Seo et al. |
| 2020/0205131 | A1 | 6/2020 | Lee et al. |
| 2020/0228231 | A1 | 7/2020 | Fan et al. |
| 2020/0229172 | A1 | 7/2020 | Wilson et al. |
| 2020/0235846 | A1 | 7/2020 | Lei |
| 2020/0280971 | A1 | 9/2020 | Moon et al. |
| 2020/0288457 | A1 | 9/2020 | Hong et al. |
| 2020/0328849 | A1 | 10/2020 | Noh et al. |
| 2021/0006318 | A1 | 1/2021 | Kim et al. |
| 2021/0050948 | A1 | 2/2021 | Gao et al. |
| 2021/0314100 | A1 | 10/2021 | Yeo et al. |
| 2021/0385841 | A1 | 12/2021 | Bao et al. |
| 2022/0095337 | A1* | 3/2022 | Wang .................... H04L 5/0053 |
| 2022/0159691 | A1* | 5/2022 | Chen ..................... H04W 76/20 |
| 2022/0377813 | A1* | 11/2022 | Wang ................ H04W 72/0453 |
| 2022/0385411 | A1 | 12/2022 | Lei et al. |
| 2022/0399979 | A1* | 12/2022 | Gao ...................... H04L 5/0055 |
| 2023/0155744 | A1* | 5/2023 | Bae ....................... H04L 5/0055 |
| | | | 370/280 |

\* cited by examiner

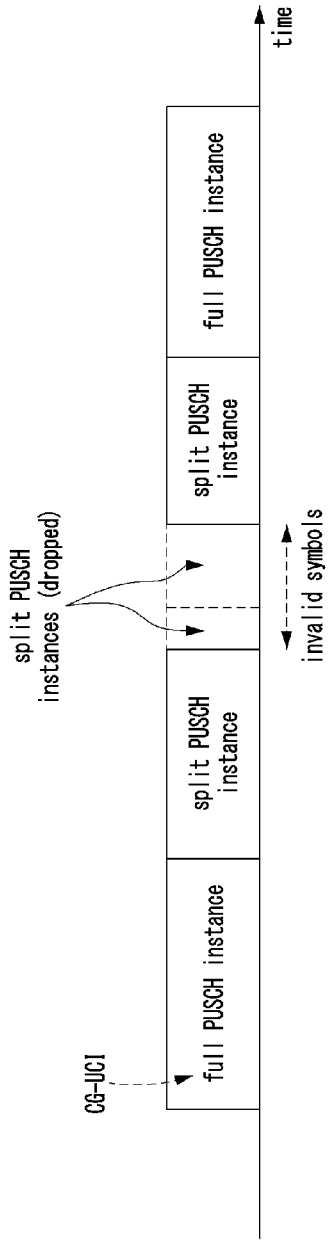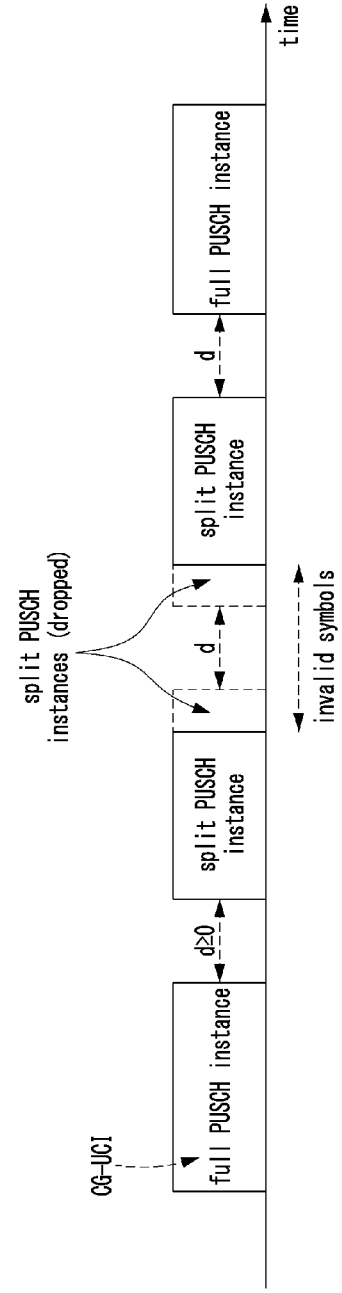

METHOD AND APPARATUS FOR TRANSMITTING A HYBRID AUTOMATIC REPEAT REQUEST (HARQ) RESPONSE OF A PHYSICAL DOWNLINK SHARED CHANNEL (PDSCH)

CROSS-REFERENCE TO RELATED APPLICATIONS

This application is a continuation of U.S. application Ser. No. 17/382,816, filed on Jul. 22, 2021, and claims priority to Korean Patent Applications No. 10-2020-0096379 filed on Jul. 31, 2020, No. 10-2020-0109696 filed on Aug. 28, 2020, No. 10-2020-0146397 filed on Nov. 4, 2020, No. 10-2021-0007059 filed on Jan. 18, 2021, No. 10-2021-0044260 filed on Apr. 5, 2021, No. 10-2021-0058133 filed on May 4, 2021, No. 10-2021-0061031 filed on May 11, 2021, and No. 10-2021-0093423 filed on Jul. 16, 2021 with the Korean Intellectual Property Office (KIPO), the entire contents of which are hereby incorporated by reference.

BACKGROUND

1. Technical Field

The present disclosure relates to a data transmission technique in a communication system, and more particularly, to a technique for transmitting data based on sensing.

2. Related Art

With the development of information and communication technologies, various wireless communication technologies are being developed. Representative wireless communication technologies include long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

After commercialization of 4G communication systems (e.g., communication systems supporting the LTE), 5G communication systems (e.g., communication systems supporting the NR) using a higher frequency band (e.g., a frequency band of 6 GHz or above) than a frequency band (e.g., a frequency band of 6 GHz or below) of the 4G communication systems are being considered for processing of soaring wireless data. The 5G communication systems may support enhanced Mobile BroadBand (eMBB), Ultra Reliable Low Latency Communication (URLLC), and Massive Machine Type Communication (mMTC).

Meanwhile, in order to provide a communication service in an unlicensed band, a communication node (e.g., base station or terminal) should use radio resources with fairness by using a sensing procedure (e.g., listen before talk (LBT) procedure or clear channel assessment (CCA) procedure). In this case, the sensing procedure may have different configuration parameters according to importance of data. The communication node (e.g., base station or terminal) may transmit a signal and/or a channel through the sensing procedure. In a special case (e.g., when a transmission operation is performed within a channel occupancy time (COT) secured by a base station and/or a terminal), a signal and/or a channel may be transmitted without the sensing procedure.

A beam-based sensing procedure in an unlicensed band may be classified into two types. For example, the sensing procedure may be classified into an omni-directional sensing procedure and a directional sensing procedure. When the omni-directional sensing procedure is applied, a base station may not perform a transmission operation even when an energy is detected in a direction that does not interfere with a terminal. This problem may be referred to as an 'exposed node problem'. When the directional sensing procedure is applied, a hidden node problem may occur. In this case, even when an energy is not detected in the sensing procedure of the base station, transmission of the base station may interfere with other terminals (e.g., hidden nodes).

SUMMARY

Accordingly, exemplary embodiments of the present disclosure are directed to providing a method and an apparatus for transmitting data based on sensing in a communication system.

According to a first exemplary embodiment of the present disclosure, an operation method of a terminal in a communication system may comprise: receiving one or more data units from a base station; generating a hybrid automatic repeat request (HARQ) codebook for at least one dada unit of the one or more data units at a reference time; and transmitting the HARQ codebook to the base station, wherein the reference time is shared by the terminal and the base station.

The operation method may further comprise receiving, from the base station, downlink control information (DCI) triggering transmission of the HARQ codebook.

The reference time may be implicitly indicated by information included in the DCI.

The reference time may be set based on a channel on which the HARQ codebook is transmitted.

The one or more data units may be received through one or more aggregated carriers or resources according to one or more semi-persistent schedulings (SPSs).

The HARQ codebook may include a HARQ-acknowledgement (HARQ-ACK) for the at least one data unit received through one or more aggregated carriers that are active at the reference time, or HARQ-ACKs for data units received in one or more aggregated carriers that are active at the reference time and one or more aggregated carriers that are inactive at the reference time.

The HARQ codebook may include a HARQ-ACK for the at least one data unit received in resources according to one or more SPSs that are active at the reference time, or HARQ-ACKs for data units received in resources according to one or more SPSs that are active at the reference time and one or more SPSs that are inactive at the reference time.

When the HARQ codebook includes a HARQ-ACK for the at least one data unit received in one or more aggregated carriers that are active at the reference time, a HARQ buffer for one or more aggregated carriers that are inactive may be flushed at a preset time.

The preset time may be after transmission of the HARQ codebook.

When the HARQ codebook includes a HARQ-ACK for the at least one data unit received in resources according to one or more SPSs that are active at the reference time, a HARQ buffer for one or more SPSs that are inactive may be flushed at a preset time.

When a HARQ-ACK for a DCI indicating release of SPS configuration is transmitted to the base station, the reference time may be set to a time after a time required for processing of the HARQ-ACK in the base station.

According to a second exemplary embodiment of the present disclosure, an operation method of a base station in a communication system may comprise: transmitting one or more data units to a terminal; receiving a hybrid automatic repeat request (HARQ) codebook for at least one data unit of the one or more data units from the terminal; estimating that the HARQ codebook is generated at a reference time; and interpreting the HARQ codebook based on the reference time, wherein the reference time is shared by the terminal and the base station.

The operation method may further comprise transmitting, to the terminal, downlink control information (DCI) triggering transmission of the HARQ codebook, wherein the DCI includes information indicating the reference time.

The one or more data units may be transmitted through one or more aggregated carriers or resources according to one or more semi-persistent schedulings (SPSs).

The HARQ codebook may include a HARQ-acknowledgement (HARQ-ACK) for the at least one data unit received in one or more aggregated carriers that are active at the reference time, HARQ-ACKs for data units received in one or more aggregated carriers that are active at the reference time and one or more aggregated carriers that are inactive at the reference time, a HARQ-ACK for the at least one data unit received in resources according to one or more SPSs that are active at the reference time, or HARQ-ACKs for data units received in resources according to one or more SPSs that are active at the reference time and one or more SPSs that are inactive at the reference time.

The operation method may further comprise: transmitting DCI indicating release of SPS configuration to the terminal; and receiving a HARQ-ACK for the DCI from the terminal, wherein the reference time is set to a time after a time required for processing of the HARQ-ACK in the base station.

According to a third exemplary embodiment of the present disclosure, a terminal in a communication system may comprise: a processor; a memory electronically communicating with the processor; and instructions stored in the memory, wherein when executed by the processor, the instructions cause the terminal to: receive one or more data units from a base station; generate a hybrid automatic repeat request (HARQ) codebook for at least one dada unit of the one or more data units at a reference time; and transmit the HARQ codebook to the base station, wherein the reference time is shared by the terminal and the base station.

The instructions may further cause the terminal to receive, from the base station, downlink control information (DCI) triggering transmission of the HARQ codebook, and the DCI may include information indicating the reference time.

When the HARQ codebook includes a HARQ-ACK for the at least one data unit received in one or more aggregated carriers that are active at the reference time, a HARQ buffer for one or more aggregated carriers that are inactive may be flushed at a preset time.

When a HARQ-ACK for a DCI indicating release of SPS configuration is transmitted to the base station, the reference time may be set to a time after a time required for processing of the HARQ-ACK in the base station.

According to the exemplary embodiments, when carrier aggregation (CA) or semi-persistent scheduling (SPS) is configured, the terminal may generate a hybrid automatic repeat request (HARQ) codebook for one or more data units at a reference time, and transmit the HARQ codebook to the base station. Since the reference time is interpreted equally by the terminal and the base station, the interpretation of the HARQ codebook in the base station may be the same as the interpretation of the HARQ codebook in the terminal. Accordingly, the performance of the communication system can be improved.

BRIEF DESCRIPTION OF DRAWINGS

FIG. 20A is a conceptual diagram illustrating a first exemplary embodiment of a method of transmitting a CG-UCI in the first PUSCH instance for which LBT is successful when PUSCH instances are consecutively arranged.

FIG. 20B is a conceptual diagram illustrating a first exemplary embodiment of a method of transmitting a CG UCI in the first PUSCH instance for which LBT is successful wen PUSCH instances are arranged according to a preset interval.

DETAILED DESCRIPTION OF THE EMBODIMENTS

Figure 1:
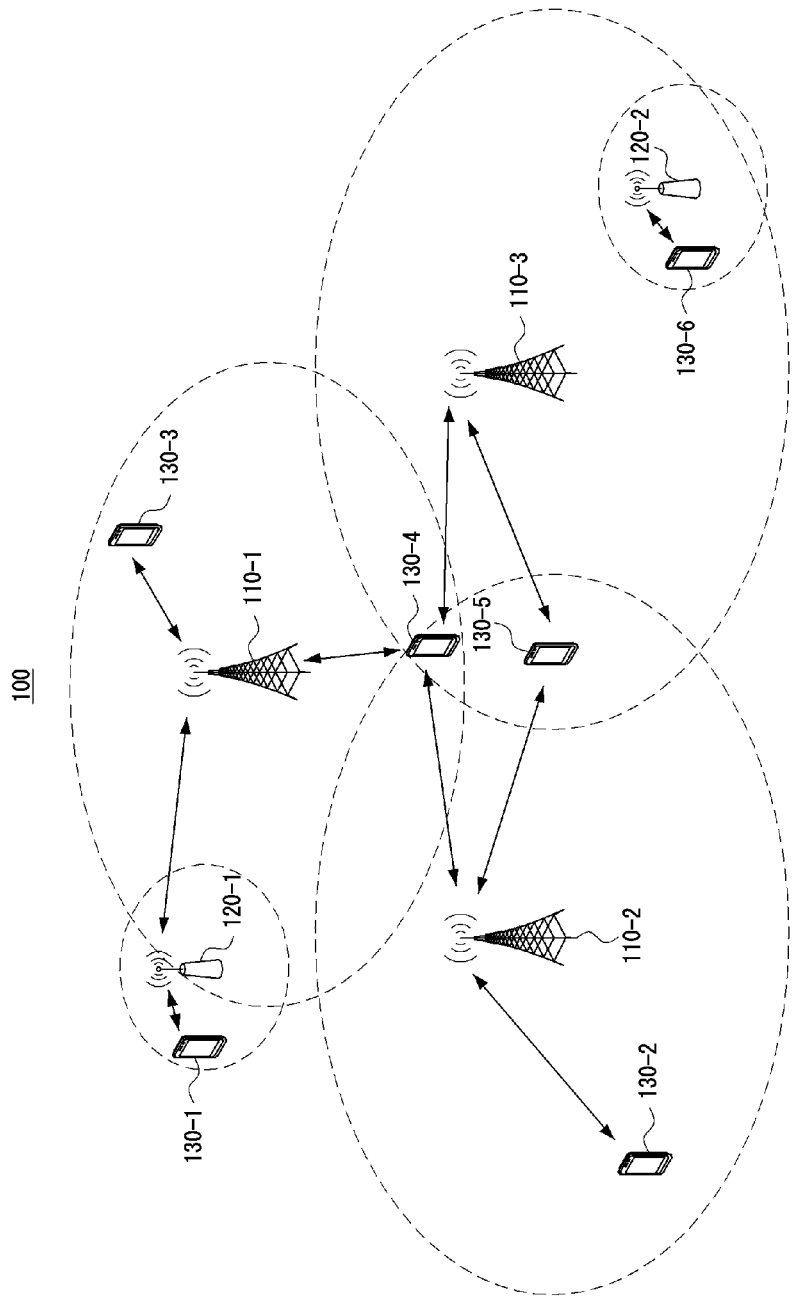
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
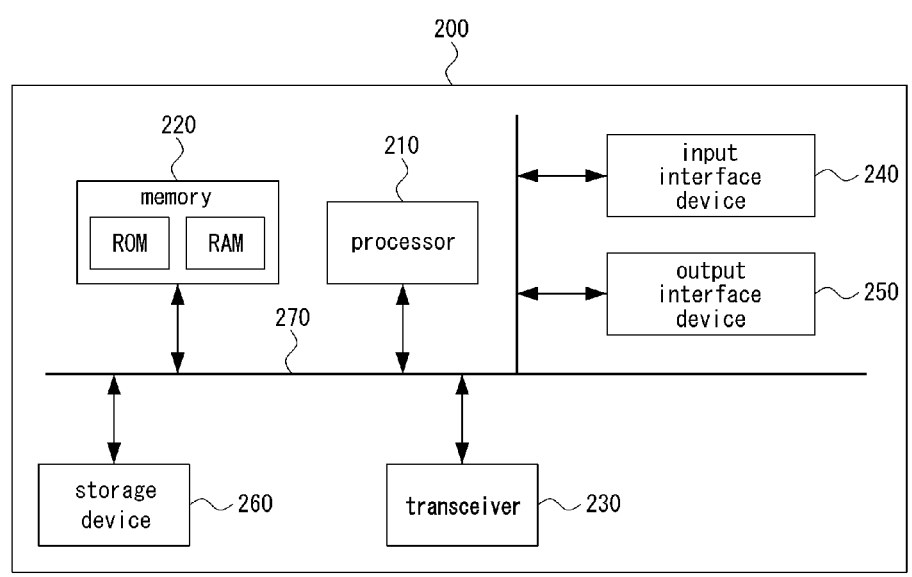
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each of the components included in the communication node 200 may not be connected to the processor 210 not through the common bus 270 but through an individual interface or an individual bus. For example, the processor 210 may be connected to at least one of the memory 220, the transceiver 230, the input interface device 240, the output interface device 250, and the storage device 260 through a dedicated interface(s).

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, operation methods of a communication node in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Chapter 1

In order to support service scenarios such as enhanced Mobile BroadBand (eMBB), Ultra-Reliable and Low Latency Communication (URLLC), and massive Machine Type Communication (mMTC), technical requirements are being studied in the 3GPP. The purpose of the eMBB service may be processing of large-capacity traffic, the purpose of the URLLC service may be reducing an end-to-end latency and an error rate, and the purpose of the mMTC service may be processing of intermittent traffic or periodic traffic in a geographic area with highly-dense terminals. One communication system may support one or more service scenarios simultaneously. For the service scenario(s), one communication system may be operated by variously adjusting configuration parameters (e.g., numerology) of an OFDM waveform. One numerology may be used in the LTE communication system, and one or more numerologies may be applied according to a situation in the NR communication system.

A time division duplex (TDD)-based communication system (hereinafter, referred to as 'TDD system') may support both the eMBB service and the URLLC service. In this case, a low-latency performance of the URLLC service may be improved. Since an uplink hybrid automatic repeat request-acknowledgement (UL HARQ-ACK) is required to support downlink (DL) traffic, a latency experienced by the DL traffic may be determined by a period in which DL slot(s) and UL slot(s) repeatedly appear. Even in case of UL traffic, since a base station indicates a UL grant to a terminal in a DL slot, a latency experienced by the UL traffic may be determined by a period in which DL slot(s) and UL slot(s) repeatedly appear. In the NR communication system, a type of slot may be dynamically changed according to a situation. The terminal may identify a DL symbol, a UL symbol, or a flexible (FL) symbol on a symbol basis. The FL symbol may be re-indicated to a DL symbol or a UL symbol. In the LTE communication system, a type of subframe may be changed according to a situation. The type of subframe may be a DL subframe, a UL subframe, or a special subframe. There is no concept of a FL subframe (or FL symbol) in the LTE communication system.

Among UL channels transmitted by the terminal, a physical uplink shared channel (PUSCH) and a physical uplink control channel (PUCCH) may be considered. A PUSCH may be dynamically scheduled. Alternatively, it may be indicated that a PUSCH is periodically transmitted. The periodic PUSCH transmission method may be classified into two schemes according to a periodic PUSCH transmission indication scheme. Uplink downlink control information (UL-DCI) may be utilized to activate a semi-static PUSCH in the LTE communication system. Considering URLLC traffic in the NR communication system, in order to reduce dependence on an error rate of a UL-DCI, periodic PUSCH transmission may be indicated only by higher layer signaling instead of the UL-DCI.

On the other hand, in order to provide a communication service in an unlicensed band, a communication node (e.g., base station or terminal) may use a sensing procedure (e.g., listen before talk (LBT) procedure or clear channel assessment (CCA) procedure) to use radio resources with fairness. In this case, the sensing procedure may have different configuration parameters according to importance of data. The communication node (e.g., base station or terminal) may transmit a signal and/or a channel through the sensing procedure. In a special case (e.g., when a transmission operation is performed within a channel occupancy time (COT) secured by the base station and/or the terminal), a signal and/or a channel may be transmitted without the sensing procedure.

A beam-based sensing procedure in an unlicensed band may be classified into two types. For example, the sensing procedure may be classified into an omni-directional sensing procedure and a directional sensing procedure. When the omni-directional sensing procedure is applied, the base station may not perform a transmission operation even when an energy is detected in a direction that does not interfere with the terminal. This problem may be referred to as an 'exposed node problem'. When the directional sensing procedure is applied, a 'hidden node problem' may occur. In this case, even when an energy is not detected in the sensing procedure of the base station, transmission of the base station may interfere with other terminals (e.g., hidden nodes).

Chapter 2 UL Channel Transmission Method
2.1 Periodic UL Channel Transmission Method Based on Omni-Directional Sensing Procedure The terminal may transmit a type1 (T1) configured grant (CG) PUSCH or a type2 (T2) CG PUSCH. The T1 CG PUSCH may be a data unit transmitted according to configuration of a T1 CG, and the T2 CG PUSCH may be a data unit transmitted according to configuration of a T2 CG. Information element(s) required for transmission of a T1 CG PUSCH may be indicated (e.g., configured) to the terminal through higher layer signaling only. Some information element(s) for transmission of a T2 CG PUSCH may be indicated to the terminal by a UL-DCI, and the remaining information element(s) for transmission of the T2 CG PUSCH may be indicated to the terminal by higher layer signaling. A transmission beam used for transmission of the T1 CG PUSCH may be configured through higher layer signaling, and a transmission beam used for transmission of the T2 CG PUSCH may be activated and/or configured by a value of a field included in the UL-DCI. When the UL-DCI does not include the field for activating the transmission beam of the T2 CG PUSCH, the transmission beam of the T2 CG PUSCH may be configured through higher layer signaling. For example, a transmission beam applied to a PUCCH may also be applied to a CG PUSCH (e.g., PUSCH according to configuration of a CG). Alternatively, a transmission beam (or spatial filter) associated with a reception beam (or transmission configuration indicator (TCI) state) of a control resource set (CORESET) having the lowest ID among CORESETs configured in a serving cell may be applied to the CG PUSCH.

A case where a transmission beam is associated with a reception beam and a bidirectionality of the beams is established may mean that a spatial filter used for the transmission beam and a spatial filter used for the reception beam are the same, that a spatial filter used for the reception beam can be derived from a spatial filter used for the transmission beam, or that a spatial filter used for the transmission beam can be derived from a spatial filter used for the reception beam. A case where a transmission beam is associated with a reception beam and a bidirectionality of the beams is not established may mean that a spatial filter used for the transmission beam and a spatial filter used for the reception beam have a one-to-one correspondence through a beam management procedure.

One TCI state may be described as a relation with one or more reference signals (RSs). For example, a TCI state of a DL signal/channel may be defined as a quasi-colocation (QCL) relation(s) or qcl-type between the DL signal/channel and one or more RSs. Each RS may have a different qcl-type. The qcl-type may be classified into a qcl-type1 and a qcl-type2. The qcl-type1 may have a value of qcl-typeA, qcl-typeB, or qcl-typeC, and the qcl-type2 may have a value of qcl-typeD. For example, when a specific RS1 and/or RS2 is indicated as a TCI state in a PDSCH or PDCCH reception procedure, the terminal may assume a qcl-type1 for the RS1 and a qcl-type2 for the RS2 to receive a PDSCH or PDCCH. The qcl-typeA may mean sharing fine time and frequency synchronization, the qcl-typeB may mean sharing fine frequency synchronization, the qcl-typeC may mean sharing coarse time and frequency synchronization, and the qcl-typeD may mean sharing a reception beam.

When operating in a frequency range 1 (FR1), a TCI state may be indicated by one RS (e.g., RS1), and the terminal may derive parameter(s) in a channel estimation process for receiving the RS1. When operating in frequency range 2 (FR2), a TCI state may be indicated by two RSs (e.g., RS1 and RS2), and a procedure for deriving parameter(s) in a channel estimation process for receiving the RS1 may be the same as that of FR1, and the terminal may additionally perform a procedure for deriving a beam for receiving the RS2.

In a reception procedure from a plurality of base stations (or transmission and reception points (TRPs)), the number of RSs constituting a TCI state may increase according to the number of TRPs.

In one example, the same TCI state may mean that both qcl-type1 and qcl-type2 are the same. In another example, the same TCI state may mean that only qcl-type2 is the same.

The terminal may transmit a PUCCH to transmit a HARQ-ACK for a semi-persistent scheduling (SPS) physical downlink shared channel (PDSCH). The SPS PDSCH may be a data unit transmitted according to a SPS configuration. According to configuration of the base station, a resource of the PUCCH transmitted by the terminal may be determined. In this case, one spatial filter applied by the terminal may be determined according to configuration of the base station or the technical specification. For example, a transmission beam associated with a reception beam of a CORESET having the lowest ID among CORESETs configured in the serving cell may be applied to the PUCCH.

In a communication system supporting an unlicensed band, the terminal may transmit a physical random access channel (PRACH), PUCCH, PUSCH, sounding reference signal (SRS), phase tracking-reference signal (PT-RS), and/or the like within a COT secured by the base station. One spatial filter and/or one spatial relation information may be defined for all UL channels and UL RSs transmitted by the terminal. In exemplary embodiments, a spatial filter and/or spatial relation information that the terminal applies to transmit a certain UL channel and/or UL RS may be referred to as a pre-processing scheme applied by the terminal to transmit the certain UL channel and/or UL RS. The pre-processing scheme may be indicated by a DCI and/or higher layer signaling (e.g., system information and/or RRC signaling). One pre-processing scheme may be indicated to the terminal. The pre-processing scheme may be indicated to the terminal by an SRS resource indicator (SRI) field included in a DCI. Alternatively, the pre-processing scheme may be indicated to the terminal by a codepoint or index of a TCI state field included in the DCI.

When the omni-directional sensing procedure is used for transmission of the UL channel and/or UL RS, the terminal may apply the indicated pre-processing scheme without restriction. In this case, since the terminal can apply a spatial filter with directionality, the transmission of the terminal may interfere with an adjacent base station or an adjacent terminal. Therefore, when the omni-directional sensing is applied to the COT secured by the base station, it may be preferable for the terminal to transmit the UL channel and/or UL RS by applying a spatial filter without directionality.

Method 2.1-1: When a base station secures a COT by using the omni-directional sensing procedure and a terminal does not apply a spatial filter within the corresponding COT, the terminal may transmit a UL channel and/or UL RS.

When the directional sensing procedure is applied, the terminal may perform the directional sensing procedure according to the indicated pre-processing scheme. For example, when the directional sensing procedure is used to transmit a UL channel (e.g., PUSCH and/or PUCCH), the terminal may form a reception beam corresponding to a transmission beam corresponding to the pre-processing scheme of the UL channel, and apply the reception beam to the directional sensing procedure.

Method 2.1-2: A base station may secure a COT by using the omni-directional sensing procedure, and a terminal may transmit a UL channel and/or a UL RS by applying a spatial filter within the corresponding COT.

The terminal may use the indicated or selected spatial filter as it is. In this case, it may be preferable that the transmission of the terminal does not interfere with other base stations and/or other terminals that are not detected by the omni-directional sensing procedure performed by the base station. In order to support this operation, the terminal may use a spatial filter. It may also be preferable to minimize the amount of interference through an appropriate power control.

Method 2.1-3: A base station may secure a COT by using the omni-directional sensing procedure, and a terminal may perform an additional sensing procedure to transmit a UL channel and/or UL RS by applying a spatial filter within the COT.

When the base station performs the omni-directional sensing procedure and the terminal transmits a UL channel and/or UL RS having directionality, the transmission of the terminal may interfere with an adjacent base station or an adjacent terminal. In order to prevent or minimize the interference, the terminal may perform an additional sensing procedure. The additional sensing procedure may be associated with a spatial filter for a UL channel and/or UL RS that the terminal intends to transmit. For example, the additional sensing procedure may be the directional sensing procedure. When the additional sensing procedure is performed, reception parameters for the additional sensing procedure may be different from reception parameters for the sensing procedure performed by the terminal to secure a COT (e.g., the length of a sensing slot, the number of sensing slots, the length of an idle slot, the number of idle slots, a relative arrangement of sensing slots and/or idle slots, a spatial filter deriving the directionality of sensing, coefficients determining the directionality and/or spatial filter, and/or the like).

When each of the base station and the terminal performs the sensing procedure, a time for the terminal to receive a DL channel and/or DL RS (e.g., decoding time, demodulation time), a time allocated to the sensing procedure of the terminal, a time required to prepare transmission of a UL channel and/or UL RS, a timing advance, and/or a time required for switching from the sensing procedure to the transmission procedure in the terminal supporting half duplex communication may be considered.

2.2 Periodic UL Channel Transmission Method Based on Directional Sensing Procedure A base station may secure a COT by performing the directional sensing procedure. A case in which a terminal transmits a UL channel and/or UL RS within the COT secured by the base station may be considered. The terminal may derive a pre-processing scheme associated with the directional sensing procedure used by the base station to secure the COT. The terminal may transmit only the UL channel and/or UL RS corresponding to the derived pre-processing scheme. For example, the base station may transmit a COT-DCI, and the terminal may receive the COT-DCI. In this case, the terminal may identify spatial relation information (e.g., spatial filter) associated with a CORESET (hereinafter, referred to as a 'COT-CORESET') in which the COT-DCI is transmitted. Therefore, the terminal may apply the corresponding pre-processing scheme to transmit the UL channel and/or UL RS within the COT.

In exemplary embodiments, an SPS PDSCH may refer to a PDSCH (e.g., data unit) transmitted according to a SPS, and an SPS PUCCH or an SPS PUSCH may refer to a channel on which a HARQ-ACK for the SPS PDSCH is transmitted, and an SPS HARQ-ACK may refer to a HARQ-ACK for the SPS PDSCH. The terminal may periodically transmit a UL channel (e.g., PUCCH including a HARQ-ACK for a CG PUSCH or an SPS PDSCH). In order to secure a time resource for transmitting the UL channel, the terminal may secure a COT by itself by performing a sensing procedure. Alternatively, the terminal may transmit the UL channel within the COT secured by the base station. In this case, the terminal may perform a minimum sensing procedure. For example, the terminal may perform a type-1 channel access in order to secure a COT by itself. In order to transmit a UL channel within the COT secured by the base station, the terminal may perform a type-2 channel access (or type-2A channel access, type-2B channel access, type-2C channel access).

Even when a time resource of a UL channel transmitted based on one predetermined beam in a high frequency band fully belongs to the COT secured by the base station, in case that the base station performs the directional sensing procedure, the terminal may determine whether to transmit a UL channel in consideration of it (e.g., directional sensing procedure).

Upon receiving the COT-DCI, the terminal may derive spatial relation information corresponding to a TCI state or quasi colocation (QCL) assumption of the COT-CORESET. The terminal may know a spatial filter applied to transmit a UL channel and/or UL RS within the corresponding COT based on the spatial relation information.

Method 2.2-1: When a spatial filter derived by a terminal from a COT-CORESET matches a spatial filter of a UL channel, the terminal may transmit the UL channel within a COT secured by a base station.

For example, beamforming for control information may have a wide beamwidth, and beamforming for data may have a narrow beamwidth. The terminal may determine a reception beam for the COT-DCI by using the COT-CORESET, and may determine a transmission beam for the data. Therefore, even if reciprocity of UL-DL is applied, a beamwidth of the reception beam may be different from a beamwidth of the transmission beam.

One pre-processing scheme applied by the terminal to the UL channel is fixed, but a plurality of UL channels may be configured and/or activated. In this case, since the same time and frequency resource and different multi-input multi-output (MIMO) configuration parameters are configured, this may mean that a plurality of UL channels are configured and/or activated. When the maximum number of UL channels configurable in the terminal is large, the above-described configuration may be possible, but the above-described configuration may not be applied to all terminals. Since there are cases in which a plurality of UL channels are configured and/or activated in order to continuously secure a COT, an operation of configuring and/or activating UL channels having only different MIMO configuration parameters may be a burden or waste for signaling. When the terminal transmits UL channels to two or more base stations or when the terminal has a plurality of antenna panels, two or more pre-processing schemes may be indicated to the terminal.

When the terminal performs the directional sensing procedure, a COT for the direction in which the directional sensing procedure is performed may be secured. Accordingly, a UL channel (e.g., UL channel with an appropriate spatial filter) may be transmitted within the COT. When the base station secures a COT by performing the directional sensing procedure, and the COT secured by the base station is shared with the terminal, the terminal may transmit a UL channel only in the direction in which the base station performs the directional sensing procedure. In this case, in order to derive association between the COT-CORESET and the UL channel, a plurality of spatial filters may be indicated to the terminal.

Method 2.2-2: For a TCI state or QCL assumption of a COT-CORESET, a set of pre-processing schemes applicable to a UL channel may be indicated to a terminal.

When the terminal transmits a UL channel within the COT secured by the base station, a transmittable UL channel may be limited to only a UL channel having spatial relation information associated with the COT-CORESET. The terminal may implicitly know the above-described spatial relation information from the COT-CORESET. Alternatively, the terminal may explicitly know the above-described spatial relation information from the COT-DCI.

Method 2.2-3: A COT-DCI may include information on a set of pre-processing schemes applied to UL channels (e.g., a set of spatial filters and/or spatial relation information).

In order to transmit a UL channel within the COT secured by the base station, the terminal may select one pre-processing scheme belonging to a set of pre-processing schemes indicated by the COT-DCI. The terminal may transmit a UL channel to which the selected pre-processing scheme is applied. The pre-processing scheme selected by the terminal may refer to a pre-processing scheme allowed within the COT secured by the base station.

For example, the pre-processing schemes may be indicated in form of TCI states. A synchronization signal/physical broadcast channel (SS/PBCH) block index, a channel state information-reference signal (CSI-RS) resource ID, and/or a sounding reference signal (SRS) resource ID may be indicated to the terminal. The pre-processing schemes may be defined differently for each terminal. In addition, the pre-processing schemes may be indicated differently for each terminal. Accordingly, the set of pre-processing schemes may be expressed differently for each terminal. Therefore, in an exemplary embodiment according to Method 2.2-3, a TCI state list may be included in the COT-DCI.

A position to which the TCI states are mapped within the COT-DCI may be different for each terminal. The COT-DCI may include a plurality of TCI state lists, and one TCI state list may be commonly interpreted by some terminal(s). In this case, the size of the COT-DCI may increase by the number of TCI state lists. In order to reduce the burden of the TCI state lists, the TCI state (e.g., TCI state list) may consist of only an SS/PBCH block index, a CSI-RS resource ID, and/or an SRS resource ID. The reason is that orthogonal resources may be indicated to each terminal for SRS transmission, but the SS/PBCH block and CSI-RS may be commonly indicated to a plurality of terminals.

Alternatively, a pre-processing scheme allowed for the terminal may be implicitly derived by a reception processor of a CORESET in which the COT-DCI is received. A method still complying Method 2.2-1, but not complying Method 2.2-2 and Method 2.2-3, may be utilized by the terminal.

2.2.1 Exemplary Embodiment: CG PUSCH

When a CG PUSCH is configured and/or activated in an unlicensed band, a terminal may transmit configured grant uplink control information (CG-UCI) on the CG PUSCH by multiplexing it with a transport block (TB). The CG-UCI may include a HARQ process number (HPN), a redundancy version (RV), a new data indicator (NDI), and/or COT related information. When the terminal performs the omni-directional sensing procedure and/or the directional sensing procedure to transmit the CG PUSCH, a COT secured by the sensing procedure may be considered as being initiated by the terminal. The COT-related information may include information indicating that the base station is not able to use the COT, or the COT-related information may include the length of the COT and a channel access priority class (CAPC) index of the COT when the base station uses the COT.

When the terminal transmits the CG PUSCH within the COT secured by the terminal or when the terminal transmits the CG PUSCH within the COT secured by the base station, spatial relation information applied to the CG PUSCH may be selected by the terminal. In this case, the CG-UCI may be extended to further include a TCI state or SRI so that the base station can easily decode the TB of the CG PUSCH.

Method 2.2-4: A CG-UCI may include information of a pre-processing scheme (e.g., spatial relation information and/or spatial filter).

The base station may indicate to the terminal a set of pre-processing schemes or a TCI state list, and the terminal may transmit a CG-UCI by applying a pre-processing scheme belonging to the set of pre-processing schemes indicated by the base station. Accordingly, the base station may easily decode the CG-UCI received from the terminal. Then, based on information element(s) included in the CG-UCI, the base station may know the pre-processing scheme applied by the terminal to the TB.

As a method of expressing a pre-processing scheme, an SRI (or TCI state index) may be used. When a CG PUSCH is configured for the terminal, the base station may indicate and/or configure a set of pre-processing schemes to the terminal, and the terminal may select one pre-processing scheme among the pre-processing scheme(s) belonging to the set of pre-processing schemes. Accordingly, the terminal may change an SRI applied to the CG PUSCH according to a result of the directional sensing procedure.

The CG PUSCH may be transmitted based on the directional sensing procedure within the COT secured by the terminal. In this case, the terminal may derive spatial relation information associated with the directional sensing procedure, and may apply the derived spatial relation information to the CG PUSCH. The CG PUSCH may be transmitted based on the directional sensing procedure within the COT secured by the base station. In this case, the terminal may derive spatial relation information associated with the COT-CORESET, and may apply the derived spatial relation information to the CG PUSCH.

It may be allowed to the terminal through higher layer signaling (e.g., CG-COT-Sharing) that the base station uses (or shares) the COT secured by the terminal. The base station may additionally set a threshold value (e.g., ul-toDL-COT-SharingED-Threshold) applied to the sensing procedure to the terminal by higher layer signaling. When a result (e.g., detected energy) of the sensing performed by the terminal is equal to or greater than (or exceeds) the threshold value indicated by the base station, the terminal may not share the COT secured by the terminal with the base station. When the result (e.g., detected energy) of the sensing performed by the terminal is less than (or equal to or less than) the threshold value indicated by the base station, the terminal may share the COT secured by the terminal with the base station.

In addition, the terminal may generate a CG-UCI including an index indicating a time resource structure that the COT secured through the sensing procedure may have. The time resource structure may be expressed by a CAPC, a slot offset, and/or the number of slots based on a slot in which the CG-UCI is transmitted. A set of the above-described time resource structures may be configured to the terminal by higher layer signaling. Accordingly, the terminal may express one or more time resource structures based on the set configured by higher layer signaling. The terminal may generate a CG-UCI including an index corresponding to one time resource structure belonging to the set of time resource structures.

When the directional sensing procedure is performed, the threshold value of the sensing procedure applied by the terminal may be indicated differently.

Method 2.2-5: A base station may indicate to a terminal two or more threshold values through higher layer signaling. The terminal may select one threshold value from among the threshold values indicated by the base station, perform the omni-directional sensing procedure or the directional sensing procedure based on the selected threshold value, and determine whether the COT secured by the sensing procedure can be shared with the base station or another terminal.

In an exemplary embodiment, the threshold value for the directional sensing procedure and the threshold value for the omni-directional sensing procedure may be separately indicated to the terminal. For example, different threshold values may be indicated to the terminal according to a direction in which the directional sensing procedure is performed and/or a spatial filter applied to the sensing procedure. The threshold value for the omni-directional sensing procedure is distinguished from the threshold value for the directional sensing procedure, but the same threshold value may be indicated depending on the spatial filter by which the directional sensing is performed.

When the directional sensing procedure is performed, a time resource structure that the COT secured by the terminal may have may be indicated differently. Alternatively, the time resource structure may be equally applied regardless of the directionality of the sensing procedure.

Method 2.2-6: A time resource structure of a COT secured by a terminal may be equally applied regardless of a method of a sensing procedure performed by the terminal.

2.3 Dynamic UL Channel Transmission Method Based on Directional Sensing Procedure A terminal may transmit a PUSCH or PUCCH according to indication of a base station. When the terminal transmits a HARQ-ACK for a PDSCH scheduled by a DL-DCI on a PUCCH or when the terminal transmits a PUSCH scheduled by a UL-DCI, the terminal may apply a pre-processing scheme indicated by the UL-DCI and/or DL-DCI.

The pre-processing scheme may be explicitly or implicitly indicated by a non-fallback DCI. For example, the non-fallback DCI may include a field indicating the pre-processing scheme. In a PUSCH transmission procedure, an SRI field (or TCI state field) may indicate a spatial filter. In a PUCCH transmission procedure, a PRI field and/or an index of a control channel element (CCE) to which a DL-DCI is mapped may indicate one resource (e.g., PUCCH resource). Here, spatial relation information for the PUCCH resource may be indicated by higher layer signaling.

A fallback DCI may not explicitly indicate a pre-processing scheme. In this case, the terminal may apply a reference pre-processing scheme. A pre-processing scheme applied to transmission of a UL channel may be indicated to be associated with a CORESET. When it is configured to receive two or more CORESETs (e.g., when two or more CORESET IDs are indicated), the terminal may determine from which CORESET a pre-processing scheme is to be derived. For example, the terminal may use the most recently received CORESET, a CORESET having the lowest ID, or a CORESET that scheduled the corresponding UL channel to derive the pre-processing scheme.

It may be preferable that a transmission directionality of the terminal coincides with a directionality in which the directional sensing procedure is performed. In order to transmit a UL channel within the COT secured by the base station, the terminal may consider a change to the reference pre-processing scheme.

2.3.1 Exemplary Embodiment: PUCCH

A terminal may receive a DL-DCI from a base station, may receive a PDSCH scheduled by the DL-DCI, and may decode the PDSCH. The terminal may transmit a HARQ-ACK (e.g., ACK or NACK), which is a result of decoding the PDSCH, to the base station on a PUCCH. A case of beam failure recovery may be considered in the PUCCH transmission procedure.

The beam failure recovery procedure may be performed for beam failure recovery for a PCell or SCell. The terminal may change a reception beam to a new DL RS referred to as q1 while receiving a radio link monitoring (RLM) RS referred to as q0. In order to support this operation (e.g., a reception beam change operation), the terminal may use a PRACH preamble configured for beam failure recovery and a search space set of beam failure recovery for receiving a response of the base station to the PRACH preamble. When the terminal needs to transmit a PUCCH even before receiving information indicating a new reception beam from the base station, a spatial filter applied to the PUCCH may be limited to be the same as a spatial filter of the most recently transmitted PRACH preamble.

In a scenario other than the beam failure recovery, the terminal may select a CORESET having the lowest ID among CORESET(s) configured in a serving cell to which a PUCCH is transmitted. Spatial relation information associated with the selected CORESET may correspond to a spatial filter of the PUCCH. In order to support this operation, the base station may indicate to the terminal relevant information (e.g., enableDefaultBeamPL-ForPUCCH) through higher layer signaling, and may not indicate an RS, which is a reference for a path loss, through higher layer signaling.

A case in which the base station secures a COT by performing the directional sensing procedure may be considered. In addition, a case may be considered in which a time resource indicated to transmit a PUCCH belongs to the COT.

Method 2.3-1: When spatial relation information of a PUCCH is not associated with a COT-CORESET, a terminal may not transmit the PUCCH. When the spatial relation information of the PUCCH is associated with the COT-CORESET, the terminal may transmit the PUCCH.

The base station may not know the reason why it does not receive a PUCCH from the terminal (e.g., DTX, when the PUCCH is not transmitted according to the sensing procedure performed by the terminal, or when the spatial relation information of the PUCCH is different from that of the COT-CORESET). If the PUCCH is not received from the terminal, the base station may retransmit a PDSCH to the terminal. Alternatively, the base station may instruct the terminal to retransmit the PUCCH.

The terminal may not fix one pre-processing scheme of the PUCCH, and may select and/or change the pre-processing scheme under a specific condition. In this case, the signaling burden of the base station may be reduced. When a search space set in which a COT-DCI may be detected is configured to the terminal, the same spatial filter as that of the PRACH preamble may not be applied in the PUCCH transmission procedure. In order to support this operation, the pre-processing scheme of the PUCCH may be implicitly changed by the COT-DCI, and the terminal may transmit the PUCCH within the COT secured by the base station.

Method 2.3-2: A terminal may transmit a PUCCH to a base station in a time resource indicated to transmit the PUCCH by applying spatial relation information associated with the most recently received CORESET.

If it is not configured to the terminal to receive a COT-DCI, the terminal may apply spatial relation information associated with the most recently received CORESET (or CORESET including a DCI allocating the PUCCH) instead of the same spatial relation information as that of the most recently transmitted PRACH preamble.

If it is configured to the terminal to receive a COT-DCI, the base station may instruct the terminal to transmit a PUCCH. In addition, the base station may instruct the terminal to transmit the PUCCH in a COT not secured. The base station may instruct the terminal to perform a type-1 channel access (e.g., LBT category 4 or sensing of performing a random backoff) before transmission of the PUCCH. However, when the COT-DCI is received from the base station, the terminal may change the sensing procure to a type-2 channel access (e.g., LBT category 2 (e.g., type-2A, type-2B, type-2C, etc.) or sensing performed in a fixed duration) before transmission of the PUCCH, and change the spatial relation information of the PUCCH to be associated with the most recently received CORESET. Based on this operation, the terminal may transmit the PUCCH within the COT secured by the base station.

When the directional sensing procedure is used, the base station may transmit only the CORESET to which the same or similar spatial filter is applied within the COT secured by the base station. In this case, the terminal may derive that the most recently received CORESET and the COT-CORESET have the same spatial relation information.

Method 2.3-3: A terminal may transmit a PUCCH to a base station by applying spatial relation information associated with a COT-CORESET.

The terminal may derive spatial relation information from the COT-CORESET instead of the most recently received CORESET, and may know a spatial filter applied to the PUCCH based on the spatial relation information.

The terminal may receive a DL-DCI from a search space set of beam failure recovery. In this case, it may be assumed that the terminal can receive the CORESET 0 in association with a DL RS changed to q1 after a preset time.

2.3.2 Exemplary Embodiment: PUSCH

When a pre-processing scheme is indicated by a base station in a PUSCH transmission procedure, a terminal may apply the pre-processing scheme indicated by the base station. Alternatively, the base station may not indicate the pre-processing scheme to the terminal. For example, when a PUSCH is scheduled by a fallback DCI, a spatial filter applied to a PUCCH may be applied as a pre-processing scheme for the PUSCH. In this case, implementation of the base station may necessarily configure the PUCCH in a UL BWP in which the PUSCH is allocated, and the pre-processing scheme of the PUCCH may be necessarily configured. On the other hand, when a PUSCH is scheduled by a non-fallback DCI, a pre-processing scheme applied to the PUSCH may be indicated by an SRI field (or TCI state field). Such the restriction may be relaxed. For example, even when a pre-processing scheme is not configured for any PUCCH in a UL BWP used by the base station, it may be indicated through higher layer signaling (e.g., enableDefaultBeamPL-ForPUSCH0_0) that a spatial filter applied by the terminal is defined. For example, the terminal may receive information on a reference beam from the base station, and may apply the reference beam to the PUSCH scheduled by the fallback DCI. This operation may be applied even when the pre-processing scheme of the PUCCH is configured to the terminal. When a spatial filter is separately indicated to the terminal, a reference RS for estimating a path loss may be separately indicated to the terminal in order to transmit the PUSCH by using the reference spatial filter. Whether the reference RS is applied may be indicated by higher layer signaling (e.g., enableDefaultBeamPL-ForPUSCH0_0).

Therefore, the spatial filter applied to the PUSCH scheduled by the fallback DCI may be determined according to whether the reference beam configured by higher layer signaling is used and/or whether the PUCCH is configured in the UL BWP in which the PUSCH is to be transmitted.

For example, when the terminal uses the reference beam and the PUCCH is not configured in the UL BWP, the terminal may derive spatial relation information associated with the CORESET having the lowest ID among CORESET(s) configured in the DL BWP for the PUSCH scheduled by the fallback DCI. That is, the terminal may derive the spatial filter applied to PUSCH transmission from the spatial filter applied in the reception procedure of the CORESET having the lowest ID.

For example, when the terminal uses the reference beam, the PUCCH is configured in the UL BWP, and the pre-processing scheme is not configured for all PUCCHs, the terminal may derive spatial relation information associated with the CORESET having the lowest ID among the CORESET(s) configured in the DL BWP.

A case in which the base station secures a COT by performing the directional sensing may be considered. In addition, a case in which a time resource indicated to transmit a PUSCH belongs to the COT may be considered.

Method 2.3-4: When spatial relation information of a PUSCH is not associated with a COT-CORESET, a terminal may not transmit the PUSCH. When the spatial relation information of the PUSCH is associated with the COT-CORESET, the terminal may transmit the PUSCH.

The base station may not know the reason why the PUSCH is not received from the terminal. The reason for the PUSCH reception failure may be DTX, a transmission failure due to the sensing procedure performed by the terminal, or that the spatial relation information of the PUSCH is different from that of the COT-CORESET. In this case, the base station may instruct the terminal to retransmit the PUSCH.

The terminal may select and/or change the pre-processing scheme of the PUSCH under a specific condition without fixing the pre-processing scheme of the PUSCH. In this case, the signaling burden of the base station may be reduced. When a search space set in which a COT-DCI may be detected is configured to the terminal, a spatial filter associated with a CORESET having the lowest ID may not be applied in the PUSCH transmission procedure. In order to support this operation, the pre-processing scheme of the PUSCH may be implicitly changed by the COT-DCI, and the PUSCH may be transmitted within a COT secured by the base station.

Method 2.3-5: A terminal may transmit a PUCCH to a base station by applying spatial relation information associated with the most recently received CORESET in a time resource indicated to transmit a PUSCH.

If it is not configured to the terminal to receive a COT-DCI, the terminal may apply spatial relation information associated with the most received CORESET rather than a spatial filter associated with the CORESET having the lowest ID.

If it is configured to the terminal to receive a COT-DCI, the base station may instruct the terminal to transmit the PUSCH. Here, the base station may instruct the terminal to transmit the PUSCH in a COT not secured. The base station may instruct the terminal to perform a type-1 channel access (e.g., LBT category 4 or sensing of performing random backoff) before transmitting the PUSCH. The terminal detecting the COT-DCI may change the sensing procedure to a type-2 channel access (e.g., LBT category 2 (e.g., type-2A, type-2B, type-2C) or sensing performed in a fixed duration) before transmitting the PUSCH. The terminal may change spatial relation information of the PUSCH to be associated with the most recently received CORESET. According to this operation, the terminal may transmit the PUSCH within the COT secured by the base station.

When the directional sensing procedure is used, the base station may transmit only a CORESET to which the same or similar spatial filter is applied within the secured COT. In this case, the terminal may derive the same spatial relation information for the most recently received CORESET and the COT-CORESET.

Method 2.3-6: A terminal may transmit a PUSCH to a base station by applying spatial relation information associated with a COT-CORESET.

The terminal may derive spatial relation information from the COT-CORESET instead of the most recently received CORESET, and may know a spatial filter applied to the PUSCH based on the derived spatial relation information.

Chapter 3 DL Channel Reception Method 3.1 Search Space Set Reception Method Based on Omni-Directional Sensing Procedure A base station may secure a channel by performing a sensing procedure, and may transmit a PDCCH and/or a PDSCH to a terminal. The terminal may not know when the base station succeeds in the sensing procedure. Therefore, the terminal may frequently monitor CORESETs to increase a transmission amount. When a DCI is detected in a CORESET, the terminal may consider that the base station has secured the channel. When necessary, the base station may inform forms of time and frequency resources of the channel (e.g., COT) secured by the base station by broadcasting a COT-DCI to terminals. The base station may configure a search space set to the terminal. In this case, the base station may set a periodicity of the search space set to be short so that the terminal can receive the CORESET. Here, the periodicity of the search space set may be set in units of mini-slots or subslots. The search space set may not need to occur frequently according to characteristics of traffic (e.g., eMBB traffic) within the time resource (e.g., COT) secured by the base station. In this case, the base station may set the periodicity of the search space set to be long within the COT, and may inform the terminal of the set periodicity. Here, the periodicity of the search space set may be set in units of slots.

In order to reduce power wasted in the monitoring procedure of the search space set of the terminal, a function of search space set switching may be introduced. A search space set (e.g., type3-PDCCH CSS set or USS set) may be configured as an element of a search space set group, and the search space set group may be divided into two groups. For example, the search space set group may be divided into a search space set group 0 and a search space set group 1. The search space set group 0 and the search space set group 1 may be configured to the terminal to have different periodicities. For example, the periodicity of the search space set group 0 may be shorter than the periodicity of the search space set group 1. In this case, the terminal may perform a monitoring operation on the search space set group 0 according to the short periodicity, and may perform a monitoring operation on the search space set group 1 according to the long periodicity.

A search space set may correspond to a CORESET. The search space set may be configured together with a CORESET ID. When the search space set is periodically configured, the CORESET may be periodically transmitted. A TCI state for the CORESET may be indicated to the terminal by higher layer signaling (e.g., system information, RRC signaling, and/or MAC CE). Since the terminal knows the TCI state for the CORESET, a DCI may be detected by using the corresponding TCI state in a time resource for monitoring the search space set.

Figure 3:
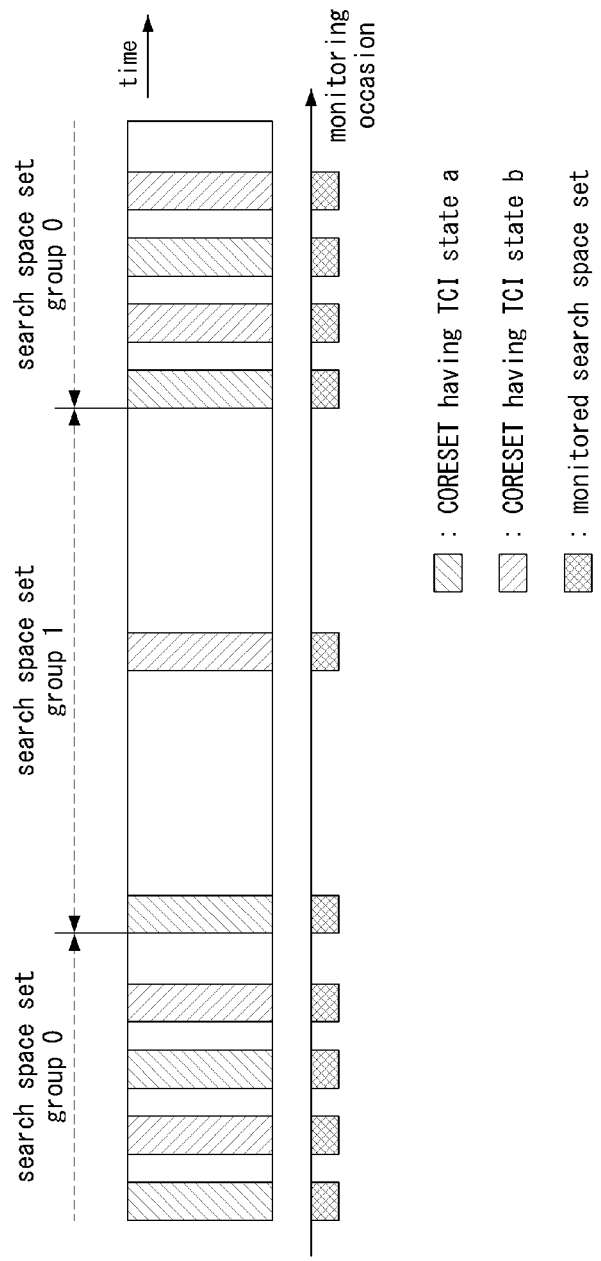
FIG. 3 is a conceptual diagram illustrating a first exemplary embodiment of a method for monitoring a search space set group based on an omni-directional sensing procedure.

FIG. 3 is a conceptual diagram illustrating a first exemplary embodiment of a method for monitoring a search space set group based on an omni-directional sensing procedure.

Referring to FIG. 3, a search space set group may be switched, and a plurality of TCI states for a CORESET may exist. The terminal may perform a CORESET reception operation to monitor search space sets belonging to the search space set group 0. In the search space set group 0, the terminal may frequently monitor search space sets. Thereafter, the search space set group 0 may be switched to the search space set group 1. In this case, in the search space set group 1, the terminal may rarely monitor search space sets. Thereafter, the search space set group 1 may be switched back to the search space set group 0. In this case, the terminal may frequently monitor search space sets. The TCI states for the CORESETs belonging to the search space set group may be set to different TCI states. For example, a TCI state of a CORESET a may be indicated as a TCI state a, and a TCI state of a CORESET b may be indicated as a TCI state b. The terminal may receive the CORESET a by applying the TCI state a, and may receive the CORESET b by applying the TCI state b. Since the terminal can receive all CORESETs, the terminal may perform a monitoring operation on all search space sets.

The base station may secure a channel (e.g., COT) by using the omni-directional sensing procedure. In this case, the base station may transmit a beam in any direction within the COT. Therefore, the base station may transmit an arbitrary CORESET to the terminal. However, when the base station secures the channel by using the directional sensing procedure, a CORESET that can be transmitted within the COT may be limited. The reason is that only a CORESET corresponding to the directional sensing can be transmitted. The direction of the transmission beam of the CORESET may coincide to some extent with the direction of the reception beam applied in the directional sensing procedure.

3.2 Search Space Set Reception Method Based on Directional Sensing Procedure

When the directional sensing procedure is used, it may be preferable for the base station to transmit only a CORESET having the same TCI state as a TCI state of a CORESET associated with a search space set in which a COT-DCI is transmitted within a COT. Therefore, a terminal may distinguish between a valid TCI state and an invalid TCI state within the COT. In exemplary embodiments, that a search space set is associated with a specific TCI state may mean that a TCI state of a CORESET associated with the corresponding search space set is a specific TCI state.

Method 3.2-1: A terminal may receive only a CORESET having a valid TCI state.

It may be preferable that the terminal does not change a reception beam in order to receive a CORESET having an invalid TCI state. For a CORESET associated with a specific search space set, the terminal may determine whether a TCI state of the CORESET is valid or invalid, and may not monitor a search space set associated with the invalid CORESET within the COT.

Figure 4:
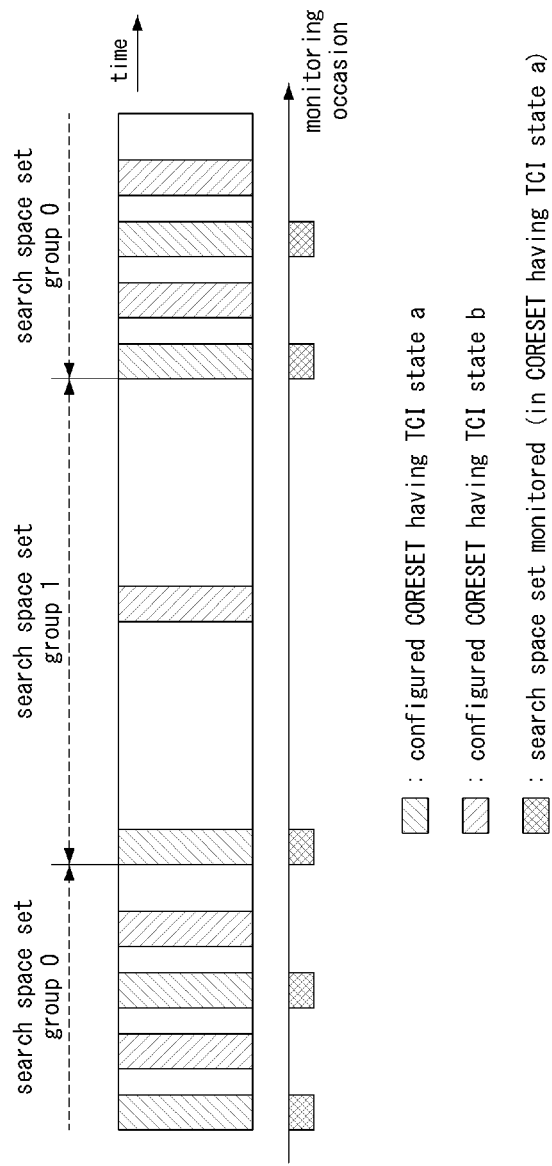
FIG. 4 is a conceptual diagram illustrating a first exemplary embodiment of a method for monitoring a search space set group based on a directional sensing procedure.

FIG. 4 is a conceptual diagram illustrating a first exemplary embodiment of a method for monitoring a search space set group based on a directional sensing procedure.

Referring to FIG. 4, a terminal may perform a reception operation on a specific CORESET according to a TCI state of the CORESET. The base station may perform a transmission operation by using a CORESET corresponding to a TCI state a. In this case, the terminal may perform a reception operation on the CORESET corresponding to the TCI state a. When a certain search space set is associated with a TCI state other than the TCI state a, the terminal may not monitor the search space set associated with the TCI state other than the TCI state a. The terminal may apply search space set group switching to the search space set associated with the TCI state a, and a monitoring opportunity (e.g., monitoring occasion) according to the search space set group switching may be a monitoring occasion shown in FIG. 4. The terminal may receive a COT-DCI, and may know time and frequency resources (e.g., structure) of a COT secured by the base station from a field belonging to the received COT-DCI. In addition, duration information of the COT may be indicated by the COT-DCI. The duration information of the COT may be utilized to the search space set group switching.

When the terminal performs a monitoring operation on only the COT-CORESET, the potential number of DCIs and/or the size of the search space set may be insufficient. A part of the CORESET may not be monitored, and accordingly, the base station may control the same time resource by using a small CORESET within the secured COT. It may be preferable for the base station to secure more CORESETs.

Method 3.2-2: CORESET(s) including search space set(s) within a COT secured by a base station may all be interpreted as having the same TCI state.

A CORESET may be classified into a valid CORESET and an invalid CORESET. A TCI state of the invalid CORESET may be updated, and the updated TCI state may be interpreted to be the same as a TCI state of the valid CORESET. According to this operation, the terminal should receive all CORESETs configured within the COT.

Figure 5:
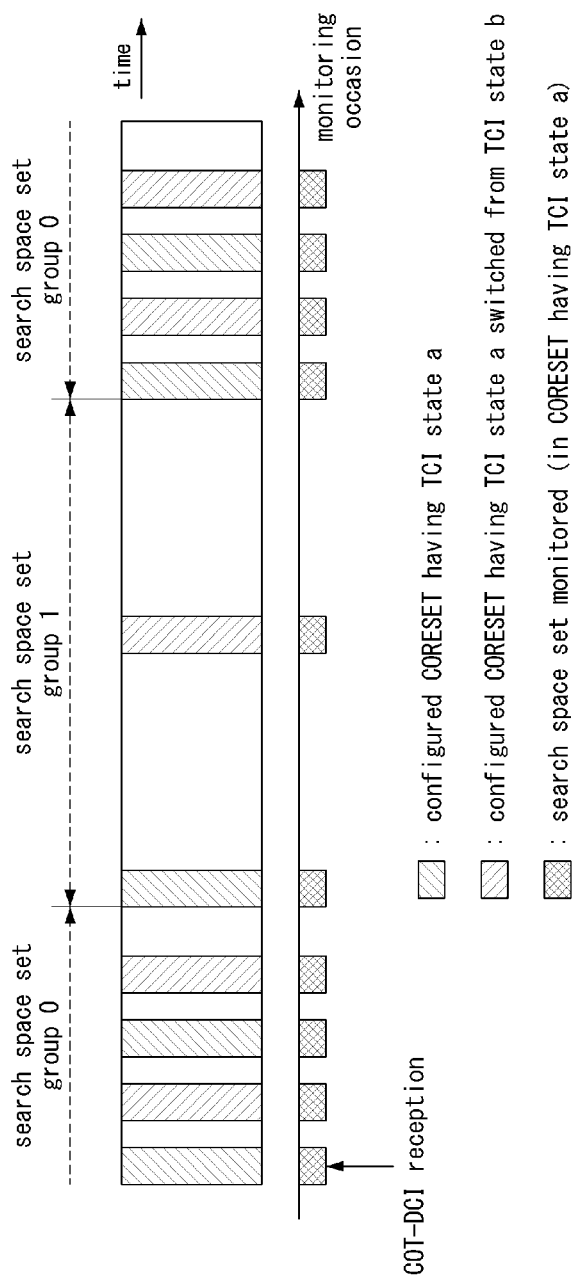
FIG. 5 is a conceptual diagram illustrating a second exemplary embodiment of a method for monitoring a search space set group based on a directional sensing procedure.

FIG. 5 is a conceptual diagram illustrating a second exemplary embodiment of a method for monitoring a search space set group based on a directional sensing procedure.

Referring to FIG. 5, a TCI state of a CORESET may be changed, and the terminal may monitor a search space set group associated with a CORESET interpreted as a valid CORESET according to the change of the TCI state. A CORESET may have the same TCI state as that of a specific CORESET regardless of the TCI state. For example, the TCI state of the COT-CORESET is set to a TCI state a, but a TCI state of a CORESET other than the COT-CORESET may be configured to the terminal differently from the TCI state a. According to a proposed method, the terminal may perform a reception operation on all CORESETs within the COT by assuming the TCI state a, and may monitor search space set(s) associated with the corresponding CORESET(s).

Chapter 4 SPS PDSCH Reception Method 4.1 SPS PDSCH Configuration Method for Supporting Randomly Arrived Traffic URLLC traffic may arrive periodically. Alternatively, URLLC traffic may arrive randomly. In this case, a random arrival time may be expressed as a random variable, and an expected value and a variance value may be derived based on the random variable. This operation may be applied to DL traffic transmission in a base station. In order to reduce the amount of a PDCCH (e.g., DCI), an SPS PDSCH may be configured and/or activated. In this case, a periodicity of the SPS PDSCH may be defined as an expected value of the arrival time of the URLLC traffic, and a plurality of SPS PDSCHs may be configured and/or activated. Time resources of the SPS PDSCHs may be configured to be more distributed than the variance value of the arrival time of the URLLC traffic. This configuration may be shown in FIG. 6.

Figure 6:
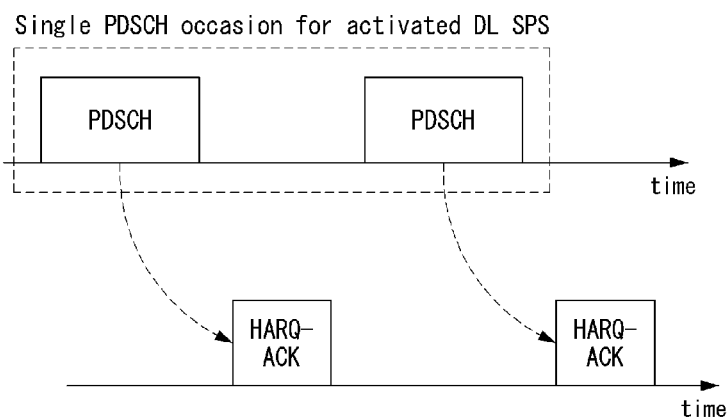
FIG. 6 is a conceptual diagram illustrating a first exemplary embodiment of SPS PDSCH configuration.

FIG. 6 is a conceptual diagram illustrating a first exemplary embodiment of SPS PDSCH configuration.

Referring to FIG. 6, two PDSCH instances may be allocated in one PDSCH occasion, and PUCCHs for transmitting HARQ-ACKs for the two PDSCH instances may be allocated. The above-described PDSCH occasion may be configured periodically.

When the above-described operation is applied to UL traffic transmission, a configured grant (CG) PUSCH may be configured and/or activated, and a periodicity of the CG PUSCH may be defined as an expected value of the arrival time of URLLC traffic, and a plurality of CG PUSCHs may be configured and/or activated. Time resources of the CG PUSCHs may be configured to be more distributed than the variance value of the arrival time of the URLLC traffic. This configuration may be shown in FIG. 7.

Figure 7:
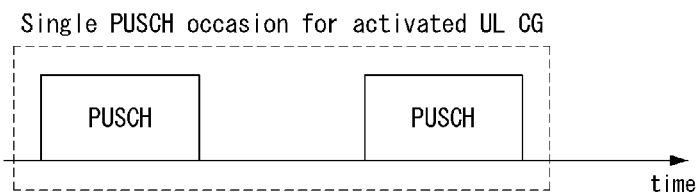
FIG. 7 is a conceptual diagram illustrating a first exemplary embodiment of CG PDSCH configuration.

FIG. 7 is a conceptual diagram illustrating a first exemplary embodiment of CG PDSCH configuration.

Referring to FIG. 7, two PUSCH instances may be allocated in one PUSCH occasion, and the above-described PUSCH occasion may be periodically configured.

If the URLLC traffic arrives randomly, the URLLC traffic may arrive later than the last PDSCH instance belonging to the PDSCH occasion or the last PUSCH instance belonging to the PUSCH occasion. In this case, the base station may allocate a PDSCH by using dynamic scheduling. Alternatively, the terminal may request dynamic scheduling by transmitting a scheduling request (SR), may receive dynamic scheduling information according to the SR from the base station, and may identify an allocated PUSCH from the dynamic scheduling information.

4.2 SPS PDSCH Time Resource Configuration Method

In order to support the URLLC traffic, an SPS PDSCH occasion comprising one or more SPS PDSCH instances may be introduced. In order to support this operation, the SPS PDSCH occasion may be one set comprising two or more SPS PDSCHs (e.g., SPS PDSCH instances). Alternatively, the resource of one SPS PDSCH (e.g., SPS PDSCH instance) may be extended.

Figure 8A:
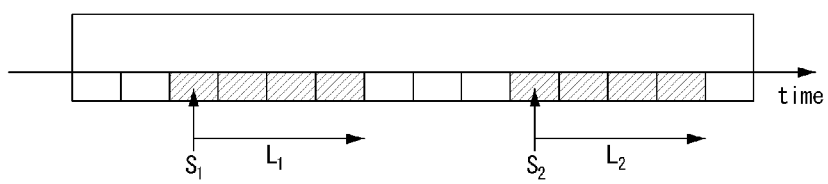
FIG. 8A is a conceptual diagram illustrating a first exemplary embodiment of an SPS PDSCH occasion.
Figure 8B:
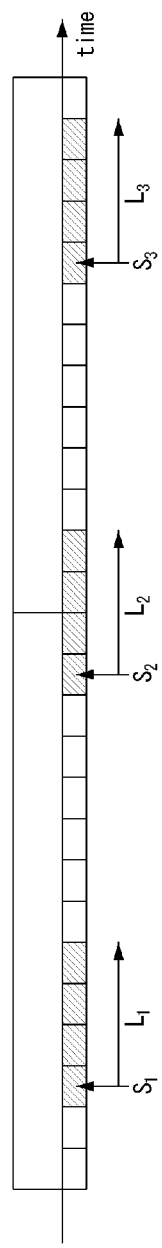
FIG. 8B is a conceptual diagram illustrating a second exemplary embodiment of an SPS PDSCH occasion.

FIG. 8A is a conceptual diagram illustrating a first exemplary embodiment of an SPS PDSCH occasion, and FIG. 8B is a conceptual diagram illustrating a second exemplary embodiment of an SPS PDSCH occasion.

Referring to FIG. 8A, SPS PDSCH instances included in an SPS PDSCH occasion may be configured within one slot.

Referring to FIG. 8B, SPS PDSCH instances included in an SPS PDSCH occasion may be configured within two slots.

Method 4.2-1: Configuration of one or more SPS PDSCHs may be configured by one SPS set.

A SPS set may include one or more SPS PDSCHs. Each of the one or more SPS PDSCHs may be activated or released. Alternatively, one or more SPS PDSCHs may be simultaneously activated or released. The base station may indicate one SPS set by using a specific field of an activating DCI, and all SPS PDSCH(s) belonging to the indicated SPS set may be activated. The base station may indicate one SPS set by using a specific field of a release DCI, and all SPS PDSCH(s) belonging to the indicated SPS set may be released. The specific field of the DCI (e.g., activating DCI, release DCI) may be a HARQ process number (HPN) field.

Configurations for one or more SPS PDSCHs belonging to the same SPS set may have independent values for some or all configuration parameters.

When some configuration parameters have different values, time resource information of each SPS PDSCH and/or information related to a PUCCH for transmission of a HARQ-ACK for each SPS PDSCH may be included in the above-described configuration. The time resource of the SPS PDSCH may refer to the first symbol to which the SPS PDSCH is mapped and the number of symbols (e.g., start and length indicator value (SLIV)) to which the SPS PDSCH is mapped within a slot. The information related to the PUCCH may mean a resource index (e.g., PRI) and a time resource in which the PUCCH is transmitted (e.g., a (sub)slot offset between a (sub)slot in which the PDSCH is received and a (sub)slot in which the PUCCH is to be transmitted). In exemplary embodiments, a (sub)slot may mean a 'slot' or a 'subslot'.

Bit(s) included in a confirmation MAC control element (CE) may indicate all SPS PDSCHs belonging to the SPS set.

A HPN may be independently derived for each SPS PDSCH. The HPN may be derived from a time resource in which the SPS PDSCH is received and/or a HPN offset.

Method 4.2-2: Two or more time resources may be configured for an SPS PDSCH, and one or more PUCCH resources may be configured for the SPS PDSCH.

The time resource (e.g., time domain resource assignment (TDRA)) of the SPS PDSCH may be indicated by an activating DCI. According to Method 4.2-2, the TDRA may represent two or more SLIVs. The SLIV may not mean only an index derived from a combination of S and L. S and L may be indicated separately. S may be an index of a start symbol, and L may be the number of symbols. The value of L may be commonly applied, and S may be configured as one or more values. The TDRA may indicate non-consecutive symbols. Here, the non-consecutive symbols may be distinguished from each other, and may be expressed by the SLIV. If the TDRA represents n non-consecutive symbols, the non-consecutive symbols may be represented as 'SLIV 1, SLIV 2, . . . SLIV n' without restriction due to generalization. n may be a natural number A TB may be allocated in some resources indicated by the TDRA. Therefore, the TB may be mapped to a resource indicated by one of the SLIVs. Alternatively, the TB may be mapped to a resource indicated by one of the SLIVs, and may not be mapped to resources indicated by the remaining SLIVs. The TB may be mapped differently for each SLIV, and may not be mapped to resources indicated by some SLIVs.

The HPN may be derived from the TDRA. The HPN may be derived from the first SLIV belonging to the TDRA. Alternatively, the HPN may be allocated for each SLIV expressed by the TDRA. When the HPN is derived from the SLIV, the HPN may be derived based on S identified by the SLIV. For example, the HPN may be derived from S and an offset set to the terminal by higher layer signaling. As another example, the HPN may be derived from a sum of the offset set to the terminal by higher layer signaling and S.

Method 4.2-3: When Method 4.2-2 is applied, each SLIV (or S) may be derived from the first symbol of a slot.

Method 4.2-4: When Method 4.2-2 is applied, each SLIV (or S) may be derived from the first symbol of a CORESET in which an activating DCI is received.

Method 4.2-5: Where Method 4.2-2 is applied, each SLIV (or S) may be derived based on the previous SLIV (or S and/or L). For example, a SLIV 1 may be derived from the first symbol of the slot, and a SLIV 2 may be derived from the last symbol indicated by the SLIV 1 or a symbol next to the last symbol. Therefore, some SLIVs may be interpreted across a slot boundary.

Method 4.2-6: A time resource of a PDSCH may be interpreted in a unit smaller than a slot (e.g., subslot or mini-slot), and a configuration parameter corresponding to the number K of repetitions may be utilized in a configuration procedure of the SPS PDSCH. For example, the number of SLIVs that the SPS PDSCH has may be equal to the number K of repetitions. The first SLIV may be indicated by the activating DCI, and the SLIV may be interpreted relatively in consecutive K−1 sub slots or mini-slots after the first SLIV. In order to support this operation, the length of the PDSCH that SLIV indicates may be smaller than the length of a subslot or a mini-slot.

In the exemplary embodiment shown in FIG. 8A, the time resource of the SPS PDSCH may be configured (or defined) within one slot. In the exemplary embodiment shown in FIG. 8B, the time resource of the SPS PDSCH may be configured (or defined) within two or more slots.

Based on Method 4.2-3, the SLIV 1 and SLIV 2 may be interpreted independently. The first symbol of the slot may be expressed as 0. In this case, in the exemplary embodiment shown in FIG. 8A, $S_1$ of the SLIV 1 may be 2, and $S_2$ of the SLIV 2 may be 9. In the exemplary embodiment shown in FIG. 8B, $S_1$ of the SLIV 1 may be 2, $S_2$ of the SLIV 2 may be 12, and $S_3$ of the SLIV 3 may be 22.

Based on Method 4.2-4, the SLIV 1 and SLIV 2 may be interpreted independently. The first symbol of the CORESET including the activating DCI within the slot may be expressed as 0. Accordingly, the exemplary embodiment shown in FIG. 8A and/or the exemplary embodiment shown in FIG. 8B may be interpreted differently depending on the symbol in which the activating DCI is received. In the exemplary embodiment shown in FIG. 8B, S of some SLIVs may be equal to or greater than 14.

Based on Method 4.2-5, the first symbol of the slot or the first symbol of the CORESET including the activating DCI may be regarded as 0, and based on this, the SLIV 1 may be interpreted. The last symbol of the PDSCH indicated by the SLIV 1 or the next symbol of the last symbol may be regarded as 0, and based on this, the SLIV 2 may be interpreted. In the exemplary embodiment shown in FIG. 8A, $S_1$ of the SLIV 1 may be 2, and $S_2$ of the SLIV 2 may be 3. In the exemplary embodiment shown in FIG. 8B, $S_1$ of the SLIV 1 may be 2, $S_2$ of the SLIV 2 may be 6, and $S_3$ of the SLIV 3 may be 6.

Based on Method 4.2-6, a mini-slot or subslot may include 7 symbols (e.g., a half of a slot, 7 symbols when a normal cyclic prefix (CP) is used, or 6 symbols when an extended CP is used). In a procedure of configuring the SPS PDSCH to the terminal, the number of mini-slots, the number of subslots, and/or the number of slots may be indicated to the terminal. The above-mentioned number may be pdsch-AggregationFactor-r16. According to the above-described configuration, it may be expected that the PDSCH is periodically received in consecutive mini-slots, consecutive subslots, or consecutive slots. In this case, one SLIV may be indicated, and the same SLIV may be applied to the consecutive mini-slots, consecutive subslots, or consecutive slots. In the exemplary embodiment shown in FIG. 8A, S of the SLIV may be 2, the length of the mini-slot or the length of the subslot may be a half of a slot, and the number of mini-slots or the number of sub slots may be 2.

The HPN may be independently derived for each SLIV (or S) of the SPS PDSCH. The HPN may be derived from the time resource in which the SPS PDSCH is received and/or the HPN offset. The HPN may be interpreted in units of symbols, mini-slots, or subslots.

Chapter 5 SPS PUCCH Transmission Method 5.1 SPS PUCCH Time Resource Configuration Method A terminal may receive an SPS PDSCH and may transmit a HARQ-ACK for the SPS PDSCH. A set of slots or subslots in which a PUCCH is transmitted may be indicated to the terminal by higher layer signaling, and one value belonging to the set may be indicated by an index. An activating DCI may include the above-described index. The time resource of the SPS PUCCH may mean not only the first symbol or the number of symbols to which the PUCCH is mapped, but also a timing (e.g., a slot or a subslot) at which the HARQ-ACK is transmitted.

When the SPS set based on Method 4.2-1 is configured, the time resource of the SPS PUCCH may be independently indicated for each SPS PDSCH.

When one or more time resources for the SPS PDSCH are indicated (e.g., when a plurality of SLIVs are used), time resources of a plurality of SPS PUCCHs may be derived.

Method 5.1-1: A time resource of one SPS PUCCH may be derived from a TDRA.

One SPS PUCCH may include HARQ-ACK(s) for PDSCH(s) received in resource(s) indicated by one or more SLIVs.

Method 5.1-2: From a TDRA, an independent SPS PUCCH time resource may be derived for each SLIV to which an SPS PDSCH is mapped.

One SPS PUCCH may include a HARQ-ACK for one SLIV. Therefore, a plurality of SPS PUCCHs may be derived for an SPS PDSCH, and a specific method may be further subdivided.

Method 5.1-3: When Method 5.1-2 is applied, a time resource of each SPS PUCCH may be derived from one slot (or mini-slot or subslot) offset.

The one offset (e.g., K) may be indicated to the terminal by higher layer signaling or a combination of higher layer signaling and an activating DCI. The offset may be an interval from a reception timing of the PDSCH to a transmission timing of the PUCCH. The offset may be interpreted in units of slots, mini-slots, or subslots. A time resource of a PUCCH corresponding to a received TB may be derived based on an SLIV to which the TB is mapped and K (e.g., offset). When only one or less TB can be mapped to one slot, one mini-slot, or one subslot, the SPS PUCCHs may be expected to be transmitted in different slots, different mini-slots, or different sub slots.

Method 5.1-4: When Method 5.1-2 is applied, a time resource of each SPS PUCCH may be independently indicated.

One offset (e.g., K) may be indicated to the terminal by higher layer signaling or a combination of higher layer signaling and an activating DCI. The offset may be interpreted as one or more time resources. The interpreted time resources may respectively correspond to time resources of the SPS PUCCHs. The number of time resources may be equal to the number of SLIVs interpreted by the TDRA.

Figure 9A:
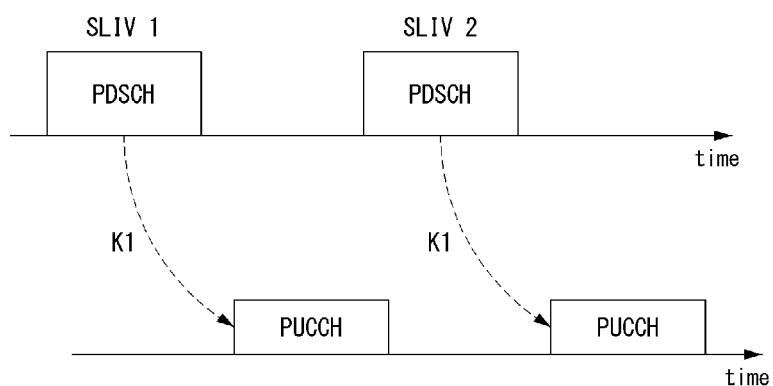
FIG. 9A is a conceptual diagram illustrating a first exemplary embodiment of a method for configuring SPS PUCCH time resources.
Figure 9B:
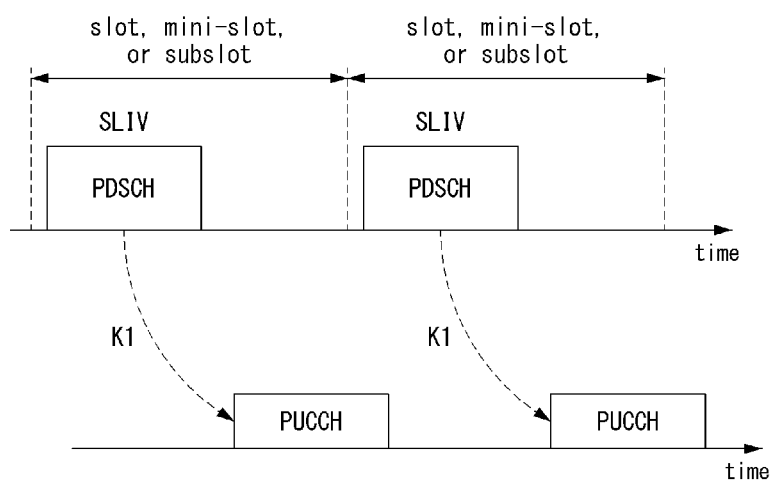
FIG. 9B is a conceptual diagram illustrating a second exemplary embodiment of a method for configuring SPS PUCCH time resources.

FIG. 9A is a conceptual diagram illustrating a first exemplary embodiment of a method for configuring SPS PUCCH time resources, and FIG. 9B is a conceptual diagram illustrating a second exemplary embodiment of a method for configuring SPS PUCCH time resources.

Referring to FIG. 9A, two SLIVs (e.g., SLIV 1 and SLIV 2) may be indicated, and a PUCCH resource (e.g., SPS PUCCH resource) may be configured after K1 for each SLIV. The PUCCH resource may be allocated for each SLIV.

Referring to FIG. 9B, one SLIV may be indicated, and the SLIV may be applied to consecutive slots, consecutive mini-slots, or consecutive subslots. In this case, a PUCCH resource (e.g., SPS PUCCH resource) may be allocated after K1 from a PDSCH.

According to another method, PDSCH candidates included in an SPS PUCCH may be classified into all PDSCH candidates belonging to a predetermined time window from a transmission timing of the PUCCH. This operation will be described in more detail in Method 5.3-7.

5.2 Method of Determining HARQ-ACK Transmitted on SPS PUCCH

A terminal may receive a TB and may transmit a HARQ-ACK for the received TB. In an eMBB traffic transmission procedure, a base station may perform scheduling such that an ACK probability is 90% and a NACK probability is 10%. In general, in a transmission procedure of URLLC traffic, the base station may perform scheduling such that the ACK probability is generally $10^{-3}$ or more. Accordingly, the terminal may determine ACK with a probability of $10^{-3}$ and may transmit the ACK on a PUCCH. In order not to interfere with other terminals, when an ACK occurs, the terminal may not transmit the corresponding ACK on a PUCCH. That is, the terminal may transmit only a NACK on a PUCCH.

Method 5.2-1: Only when a HARQ-ACK is NACK, a terminal may transmit the NACK on a PUCCH.

In order to transmit a HARQ-ACK of 3 bits or more, the terminal may generate a HARQ codebook, and may transmit the HARQ codebook on a PUCCH. In this case, in order to apply Method 5.2-1, it may be limited to a case of transmitting a HARQ-ACK of less than 3 bits or 1 bit.

When a 1-bit HARQ-ACK is transmitted, only a sequence for NACK may be configured to the terminal. If a PUCCH is not received from the terminal, the base station may consider that the HARQ-ACK for the corresponding TB (or the corresponding SPS PDSCH) is ACK. If a PUCCH is received from the terminal, the base station may consider that the HARQ-ACK for the corresponding TB (or the corresponding SPS PDSCH) is NACK.

Based on Method 5.2-1, if an SPS PDSCH is associated with a plurality of SPS PUCCHs and continuous NACKs occur in the terminal, the terminal may not transmit a PUCCH. The reason is that the terminal can transmit a PUCCH only when the terminal first obtains ACK. For a PUCCH associated with an SPS PDSCH thereafter, the terminal may transmit the PUCCH. Alternatively, the terminal may not transmit a PUCCH.

Figure 10A:
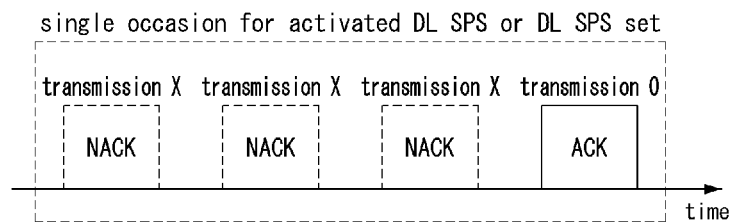
FIG. 10A is a conceptual diagram illustrating a first exemplary embodiment of a method of transmitting a HARQ-ACK on a last SPS PUCCH associated with an SPS PDSCH.

FIG. 10A is a conceptual diagram illustrating a first exemplary embodiment of a method of transmitting a HARQ-ACK on a last SPS PUCCH associated with an SPS PDSCH, and FIG. is a conceptual diagram illustrating a second exemplary embodiment of a method of transmitting a HARQ-ACK on a last SPS PUCCH associated with an SPS PDSCH.

Referring to FIG. 10A, when a HARQ-ACK is ACK, the terminal may transmit the ACK on an SPS PUCCH.

Figure 10B:
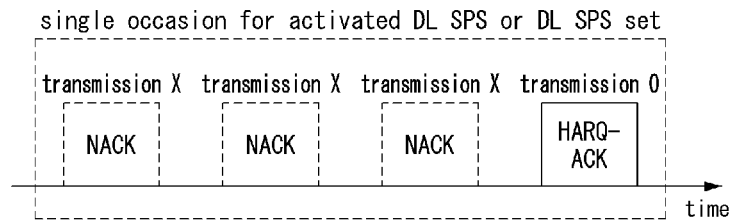
FIG. 10B is a conceptual diagram illustrating a second exemplary embodiment of a method of transmitting a HARQ-ACK on a last SPS PUCCH associated with an SPS PDSCH.

Referring to FIG. 10B, when NACK occurs, the terminal may not transmit an SPS PUCCH, and when ACK occurs, the terminal may transmit ACK on the last SPS PUCCH. Since only ACK for the SPS PDSCH is transmitted, the base station may not know whether the reason that ACK is not received is that NACK for a TB received at the terminal occurred or that the TB was not received at the terminal. In order to resolve the ambiguity described above, the terminal may transmit a PUCCH including the HARQ-ACK. Here, the PUCCH may be the last resource (e.g., the last SPS PUCCH) in the time domain among SPS PUCCHs associated with the SPS PDSCH. The terminal may not transmit the SPS PUCCH when NACK occurs, and may transmit the HARQ-ACK (e.g., TB decoding result) on the last SPS PUCCH.

Method 5.2-2: Based on Method 5.2-1, a terminal may transmit a HARQ-ACK on the last SPS PUCCH.

Method 5.2-3: A terminal may generate a HARQ codebook including HARQ-ACK(s) (e.g., ACK or NACK).

In order to transmit HARQ-ACKs of 3 bits or more, the terminal may generate a HARQ codebook including HARQ-ACK bit(s) based on positions determined according to the technical specification. In a reception procedure of URLLC traffic, the terminal may obtain ACK in most cases, and may obtain NACK in some cases. In this case, the terminal may generate a HARQ codebook including HARQ-ACKs.

Transmission of a PUSCH as well as a PUCCH may be indicated to the terminal. In this case, the terminal may multiplex HARQ-ACKs (or HARQ codebook including HARQ-ACKs) in the PUSCH.

In case of a type-1 HARQ codebook and/or a type-3 HARQ codebook, the size of the HARQ codebook may be indicated semi-statically. In this case, the size of the HARQ codebook may not change depending on whether a DCI is received. In order to maintain the size of the HARQ codebook regardless of a case in which a HARQ-ACK is always transmitted, a case in which only NACK is transmitted, or a case in which only ACK is transmitted, the type-1 HARQ codebook and/or type-3 HARQ codebook may include HARQ-ACK for the SPS PDSCH as a certain value. In this case, the corresponding value may be a HARQ-ACK, a fixed ACK, or a fixed NACK. In exemplary embodiments, the type-1 HARQ codebook may refer to a type-1 HARQ-ACK codebook, and the type-3 HARQ codebook may refer to a type-3 HARQ-ACK codebook. The type-3 HARQ codebook may include HARQ-ACKs for respective data units received in one or more aggregated carriers. The data unit may be a transport block (TB) or a code block group (CBG). The type-3 HARQ codebook may be used for HARQ-ACK transmission for aggregated carrier(s) when communication according to carrier aggregation (CA) is performed.

Two or more SPS PDSCHs may be configured. Alternatively, two or more SLIVs for the SPS PDSCHs may be configured. According to Method 5.2-1, when only a PUCCH is transmitted, the terminal may not transmit the PUCCH according to a HARQ-ACK. On the other hand, if a PUCCH and a PUSCH are transmitted, X is derived from the first HARQ-ACK, and Y is derived from the second HARQ-ACK, the terminal may multiplex the HARQ-ACK (s) in each PUSCH.

Method 5.2-4: When an SPS PDSCH corresponds to a plurality of PUCCH resources or when a PUCCH resource corresponds to each SLIV derived from an SPS PDSCH, HARQ-ACK may be expressed as bundling of HARQ-ACKs associated with the same SPS PDSCH. This operation may be shown in FIG. 11.

Figure 11A:
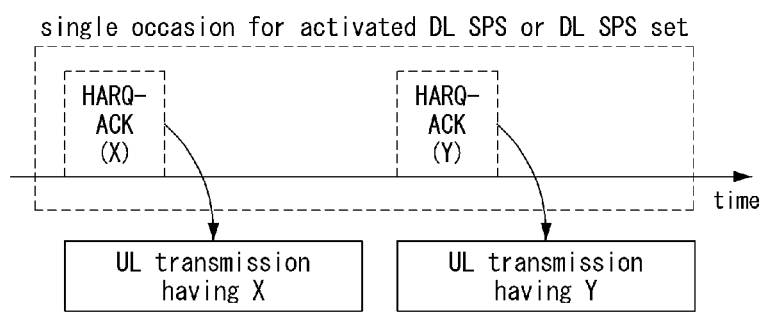
FIG. 11A is a conceptual diagram illustrating a first exemplary embodiment of a method of transmitting a HARQ-ACK on a PUSCH.
Figure 11B:
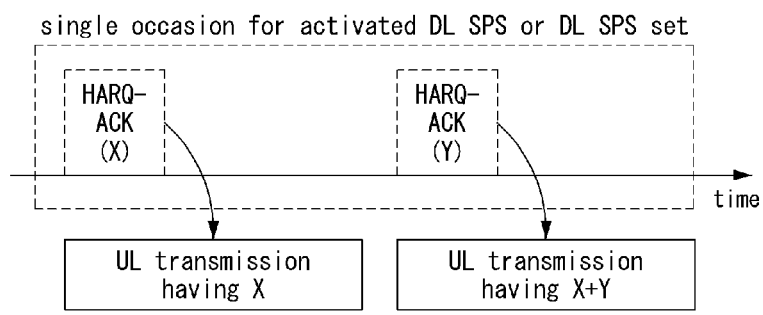
FIG. 11B is a conceptual diagram illustrating a second exemplary embodiment of a method of transmitting a HARQ-ACK on a PUSCH.

FIG. 11A is a conceptual diagram illustrating a first exemplary embodiment of a method of transmitting a HARQ-ACK on a PUSCH, and FIG. 11B is a conceptual diagram illustrating a second exemplary embodiment of a method of transmitting a HARQ-ACK on a PUSCH.

Referring to FIG. 11A, a HARQ-ACK may be independently multiplexed in a PUSCH. When X is ACK, the terminal may not transmit a PUCCH. When X is NACK, the terminal may transmit a PUCCH. Alternatively, when X is ACK or NACK, the terminal may transmit a PUCCH. When the terminal transmits a PUSCH, the HARQ-ACK may be multiplexed in the PUSCH. The above-described method may also be applied to transmission of Y.

Referring to FIG. 11B, the method according to FIG. 11A may be applied to transmission of X. Transmission of Y may be performed based on Method 5.2-4. For example, a result of an OR operation on X and Y may be included in the HARQ codebook or PUSCH. That is, when X or Y is ACK, the HARQ-ACK may be ACK. When both X and Y are NACK, the HARQ-ACK may be NACK.

The above-described method may be applied even when the SPS PDSCH corresponds to two or more PUCCHs. For example, the HARQ-ACK may be expressed as X, X+Y, X+Y+Z, . . . , or the like. Based on this operation, the terminal may repeatedly inform the base station of a reception response (e.g., ACK or NACK) for one TB received on the SPS PDSCH.

5.3 Method of Reducing the Size of HARQ-ACK for SPS PDSCH

In order to transmit randomly arriving traffic, configuration and/or activation of many SPS PDSCHs or extension of a time resource of an SPS PDSCH may be supported. Therefore, the terminal needs to transmit many HARQ-ACKs. When the type-1 HARQ codebook is used, HARQ-ACK for a PDSCH for a configured SPS may be derived. As a method for solving the above-described problem, a method for reducing some HARQ-ACKs may be required. The method proposed below may be implemented alone. Alternatively, a combination of the method proposed below and other method(s) may be implemented.

Method 5.3-1: A HARQ codebook may include HARQ-ACK(s) of PDSCH(s) for all serving cells (e.g., all carriers) configured through RRC signaling.

Method 5.3-2: A HARQ codebook may include HARQ-ACK(s) for PDSCH(s) for activated serving cell (e.g., activated carrier).

The terminal may assume a specific BWP for an deactivated serving cell (e.g., deactivated carrier), and based on the above-mentioned assumption, the terminal may generate a HARQ codebook including a HARQ-ACK (e.g., NACK) of a PDSCH. When the base station transmits a MAC CE for deactivating some serving cells to the terminal, the terminal may transmit a HARQ-ACK for the MAC CE. Therefore, the terminal and the base station may have the same information about the deactivated serving cell. Accordingly, the terminal may generate a HARQ codebook including a HARQ-ACK for an active serving cell. This operation may be applied not only to an SPS PDSCH but also to a PDSCH scheduled by a DCI.

The terminal may select some serving cell(s) and may generate a HARQ codebook including HARQ-ACKs of PDSCHs of the selected serving cell(s). This operation nay be further specified in methods below.

Method 5.3-3: A terminal may transmit a HARQ codebook for a corresponding serving cell by using a carrier indication field (CIF) included in a DCI.

Method 5.3-4: A HARQ codebook may include HARQ-ACKs of all SPS PDSCHs configured with RRC signaling.

Method 5.3-5: A HARQ codebook may include HARQ-ACK(s) of PDSCH(s) received with respect to an active SPS.

The terminal may start an SPS PDSCH reception operation based on an activating DCI. Alternatively, the terminal may not perform an SPS PDSCH reception operation based on a release DCI. Upon receiving the release DCI for SPS configuration, the terminal may transmit a HARQ-ACK for the corresponding DCI. Upon receiving the activating DCI for SPS configuration, the terminal may transmit a HARQ-ACK for an SPS PDSCH. Therefore, the base station and the terminal may have the same information. Accordingly, the terminal may generate a HARQ codebook including the HARQ-ACK for the activated SPS PDSCH.

The terminal may receive a TDRA including a plurality of SLIVs indicating the SPS PDSCH. Alternatively, a plurality of SPS PDSCHs may be combined, and the combined SPS PDSCHs may be configured and/or activated. In this case, the size of the HARQ-ACK may be expressed by being compressed (e.g., bundled). For example, an AND operation or an OR operation on HARQ-ACKs may be performed. Based on Method 5.2-4, the size of HARQ-ACK may be reduced by applying the OR operation. Even in this case, there is no loss of information.

Method 5.3-6: A HARQ codebook may include bundled HARQ-ACKs.

When an SPS HARQ codebook for all configured SPS configs or all active SPS configs is generated, HARQ-ACKs for unnecessary SPS configs may also be transmitted to the base station. Bundling of HARQ-ACKs may cause information loss. In order to solve the above-described problem, a method for reducing the size of the SPS HARQ codebook is needed. The SPS HARQ codebook may include a HARQ-ACK for a data unit (e.g., TB or CBG) received according to each of one or more SPSs. In exemplary embodiments, methods applied to the type-3 HARQ codebook may also be applied to the SPS HARQ codebook, and methods applied to the SPS HARQ codebook may also be applied to the type-3 HARQ codebook.

Method 5.3-7: A predetermined time window may be applied from a transmission timing of an SPS PUCCH, and an SPS HARQ codebook may include HARQ-ACKs for SPS configs belonging to the time window.

The time window may be defined in the technical specification. Alternatively, the base station may indicate the time window to the terminal using higher layer signaling or a combination of higher layer signaling and an activating DCI. It may be preferable to reduce the size of the SPS HARQ codebook by minimizing the size of the time window. Therefore, the time window may be indicated to the terminal by a DCI triggering the SPS HARQ codebook. For example, a period from a reception timing (e.g., a slot or a subslot) of a DL-DCI to a transmission timing of the SPS HARQ codebook may be interpreted as the time window. For example, the last time point of the time window may be interpreted as the transmission timing of the SPS HARQ codebook, and the start time point of the time window may not be separately signaled. The terminal may interpret the length of the time window based on a HARQ-ACK timing (e.g., K1, slot offset, subslot offset) of the SPS PDSCH. When two or more HARQ-ACK timings are configured to the terminal, the terminal may interpret the length of the time window based on one HARQ-ACK timing among the two or more HARQ-ACK timings. For example, the HARQ-ACK timing used to interpret the length of the time window may be the largest HARQ-ACK timing among the two or more HARQ-ACK timings.

Alternatively, in order to reduce the size of the SPS HARQ codebook, only the minimum HARQ-ACKs may be transmitted.

Method 5.3-8: An SPS HARQ codebook may include only HARQ-ACKs that a terminal has not transmitted.

The terminal may not be able to transmit a PUCCH due to a slot format, an SS/PBCH block, or a type0-PDCCH CSS set.

In an SPS HARQ codebook generation procedure, SPS HARQ-ACKs may be arranged in consideration of the following methods. The methods below may be applied to all methods of generating the SPS HARQ codebook.

Method 5.3-9: HARQ-ACKs in an SPS HARQ codebook may be arranged in an order of SPS-ConfigIndex.

Method 5.3-10: HARQ-ACKs in an SPS HARQ codebook may be arranged in a reception order of SPS PDSCH candidates.

Method 5.3-11: HARQ-ACKs in an SPS HARQ codebook may be arranged in an order of HARQ process numbers.

When the time window is large in the SPS HARQ codebook generation procedure, two or more HARQ-ACK bits may occur in SPSs having the same SPS-ConfigIndex (Method 5.3-9), or two or more SPSs having the same HPN may occur (Method 5.3-11).

5.4 Priority of HARQ-ACK for SPS PDSCH

A PUCCH on which a HARQ-ACK for an SPS PDSCH is transmitted may have a priority. In order to transmit different uplink control information (UCI) or TBs, the terminal may perform multiplexing or selection (prioritization) for PUCCH(s) and/or PUSCH(s) according to priorities of the PUCCH(s). This operation may be performed according to Method 5.4-1 or Method 5.4-2.

Method 5.4-1: A priority of a PUCCH (e.g., HARQ-ACK) may be determined by RRC signaling for configuring an SPS PDSCH.

The priority of the SPS PDSCH may be indicated to the terminal by semi-static signaling. The priority of the SPS PDSCH may not be dynamically changed.

Method 5.4-2: A HARQ-ACK for an SPS PDSCH may follow a priority indicated by a field included in an activating DCI.

When the SPS PDSCH is activated by a DCI format 1_1 or format 1_2, the above-mentioned priority may be explicitly indicated. When the SPS PDSCH is activated by a DCI format 1_0, the priority may be determined from a search space set in which the activating DCI is detected. For example, if the activating DCI is detected in a UE-specific search space set (i.e., USS set), the priority may be interpreted as high, and if the activating DCI is detected in a common search space set (i.e., CSS set), the priority may be interpreted as low.

A field included in the activating DCI may indicate multiplexing between UCI or TB and HARQ-ACK having different priorities. In this case, multiplexing in a PUCCH may be considered for not only the same priority but also different priorities.

The methods proposed in the section 5.3 may be applied. In this case, in the HARQ-ACK arrangement procedure in the HARQ codebook, a first HARQ-ACK for an SPS PDSCH and a second HARQ-ACK for a PDSCH scheduled by a DCI may be independently multiplexed, and the multiplexed first HARQ-ACK and second HARQ-ACK may be concatenated with each other.

5.5 SPS PUCCH Triggering Method

A base station may dynamically instruct a terminal to transmit an SPS PUCCH. A DCI indicating transmission of the SPS PUCCH may be referred to as a triggering DCI. The triggering DCI may be a DL-DCI (e.g., DCI format 1_0, DCI format 1_1, DCI format 1_2, or DCI format 2_x). Scrambling for the triggering DCI may be performed differently. The triggering DCI (e.g., cyclic redundancy check (CRC) of the triggering DCI) may be scheduled by a cell-radio network temporary identifier (C-RNTI). Alternatively, the triggering DCI may be scrambled based on Method 5.5-1.

Method 5.5-1: A triggering DCI may be scrambled by a configured scheduling (CS)-RNTI.

When a specific field (e.g., one-shot HARQ-ACK request) included in the triggering DCI has a preset value (e.g., 1), the terminal may interpret that an SPS PUCCH is triggered. According to this operation, the terminal may distinguish a triggering DCI, an activating DCI, and a release DCI. The format of the triggering DCI may be a DCI format 1_1, DCI format 1_2, or DCI format 2_x. The terminal may determine that an SPS PUCCH is triggered based on a specific field included in the DCI format 1_1, DCI format 1_2, or DCI format 2_x.

When the triggering DCI has a DCI format 1_1, the one-shot HARQ-ACK request field may be reused.

Method 5.5-2: A DCI format 1_2 may include a specific field triggering an SPS PUCCH.

The triggering DCI may not need to allocate a PDSCH. Therefore, a TDRA and/or FDRA included in the triggering DCI may indicate a preset value, and the terminal may not interpret the value indicated by the TDRA and/or FDRA as a PDSCH resource. Alternatively, the terminal may ignore the TDRA and/or FDRA included in the triggering DCI.

Method 5.5-3: A HARQ-ACK timing indicated by a triggering DCI may be interpreted as an offset K1 of a slot or subslot in which an SPS HARQ codebook is transmitted.

K1 may have a sufficiently large value in consideration of a processing capability of the terminal. For example, K1 may indicate a time longer than a time from the last symbol of the CORESET in which the triggering DCI is received to a symbol after preset symbol(s) from the last symbol. Here, the time according to the processing capability of the terminal may be a processing time applied to an SPS PDSCH release or a type-3 HARQ-ACK codebook.

Figure 12:
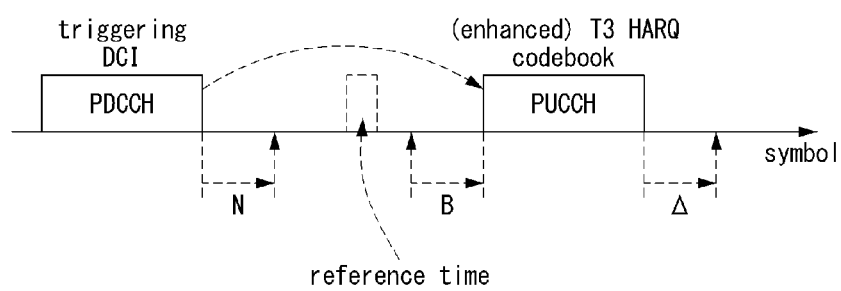
FIG. 12 is a conceptual diagram illustrating a first exemplary embodiment of a temporal relationship to be considered for generating an (enhanced) type-3 HARQ codebook.

FIG. 12 is a conceptual diagram illustrating a first exemplary embodiment of a temporal relationship to be considered for generating an (enhanced) type-3 HARQ codebook.

Referring to FIG. 12, a base station may transmit a triggering DCI to a terminal. The terminal may receive the triggering DCI and may generate an (enhanced) type-3 HARQ codebook. In exemplary embodiments, the (enhanced) type-3 HARQ codebook may be referred to as a 'type-3 HARQ codebook' or 'enhanced type-3 HARQ codebook'. A time may be required for the terminal to decode the triggering DCI, and a time may be required for the terminal to generate the type-3 HARQ codebook. It may take a time for the serving base station to deliver a decoding result of the type-3 HARQ codebook to a HARQ entity of a MAC layer.

In this case, it may be preferable for the serving base station and the terminal to derive the type-3 HARQ codebook from the same time resource. In order to support this operation, a reference time resource may be introduced, and the type-3 HARQ codebook may be derived from the reference time resource (e.g., slot or subslot). The reference time resource may be shared between the base station and the terminal. That is, the reference time resource known by the base station may be the same as the reference time resource known by the terminal. The reference time resource may be signaled from the base station to the terminal by system information, RRC signaling, MAC CE, and/or DCI. The reason why the reference time resource is needed will be explained in detail in the methods described below. For example, when a method in which the size of the type-3 HARQ codebook is determined by an activating DCI, release DCI, and/or MAC CE is applied, the reference time resource may be utilized. Here, if a timing of deriving the type-3 HARQ codebook is not defined, a plurality of slots or a plurality of sub slots may be considered, whereby the terminal and the base station may derive the type-3 HARQ codebooks having different sizes. In exemplary embodiments, the reference time resource may be referred to as a 'reference time' or 'reference timing'.

The reference time may be implicitly determined by the triggering DCI. Alternatively, the reference time may be defined in the technical specification. The reference time may be defined after N symbols from the last symbol in which the PDCCH (e.g., triggering DCI) is received. The reference time may be defined from before B symbols from the first symbol of the PUCCH or PUSCH (e.g., channel on which the type-3 HARQ codebook is transmitted).

Method 5.5-4: A reference time (e.g., slot or subslot) for deriving a type-3 HARQ codebook may be introduced, and a terminal may derive the type-3 HARQ codebook at the reference time. The terminal may transmit the type-3 HARQ codebook to the base station. The base station may receive the type-3 HARQ codebook from the terminal, may estimate that the type-3 HARQ codebook is generated at the reference time, and may interpret the type-3 HARQ codebook based on the reference time.

When the triggering DCI includes a downlink assignment index (DAI), the value of the DAI may indicate the size of the SPS HARQ codebook (or type-3 HARQ codebook). For example, when the SPS HARQ codebook includes HARQ-ACK(s) for all configured SPS-ConfigIndex (Method 5.3-4), the terminal may ignore the information indicated by the DAI. When the SPS HARQ codebook includes HARQ-ACK(s) for the active SPS-ConfigIndex (Method 5.3-5), the DAI may indicate the size of the SPS HARQ codebook. Even when the size of the SPS HARQ codebook is dynamically changed, the terminal may know the size of the SPS HARQ codebook from the DAI included in the triggering DCI.

When the triggering DCI includes a counter DAI (cDAI), the number of SPS HARQ-ACKs may correspond to a remainder value divided by a predetermined number (e.g., $2^{cDAI}$). Additionally, when the triggering DCI includes a total DAI (tDAI), the size of the SPS HARQ codebook may correspond to a remainder value divided by a predetermined number (e.g., $2^{tDAI}$).

In the triggering DCI, a priority indicator field may be activated, and the priority indicator field may indicate a priority of a PUCCH generated in the terminal. When a type-3 HARQ codebook is configured to the terminal, generation of a type-3 HARQ codebook including an NDI may be configured to the terminal. The terminal may derive a HARQ-ACK and an NDI for each HPN. Alternatively, the terminal may derive only HARQ-ACK for each HPN. The enhanced type-3 HARQ codebook may not additionally include an NDI. When the terminal is instructed to derive HARQ-ACK(s) only for active serving cell(s), it may not be configured that the type-3 HARQ codebook additionally includes an NDI. The HARQ codebook additionally including an NDI may be introduced to solve a problem that occurs when an LBT fails in an unlicensed band. There may be no case in which the terminal fails an LBT in a licensed band. The case where the terminal fails the LBT in an unlicensed band supporting a semi-static access mode may be very rare.

Method 5.5-5: When a type-3 HARQ codebook (or enhanced type-3 HARQ codebook) is generated for an activated serving cell, a terminal may generate a type-3 HARQ codebook (or enhanced type-3 HARQ codebook) that does not always include an NDI. Alternatively, the base station may configure the terminal to generate a type-3 HARQ codebook (or enhanced type-3 HARQ codebook) that does not include an NDI.

When the serving cell operates in an unlicensed band, it may be advantageous for an NDI to be included in the type-3 HARQ codebook (or enhanced type-3 HARQ codebook). It may be unnecessary for an NDI to be included in the type-3 HARQ codebook (or enhanced type-3 HARQ codebook) in the serving cell operating in a licensed band. In order to support this operation, whether an NDI is included in the type-3 HARQ codebook (or enhanced type-3 HARQ codebook) for each serving cell may be independently configured.

Method 5.5-6: Based on Method 5.5-5, whether to include an NDI may be configured in units of a serving cell considered in the type-3 HARQ codebook (or enhanced type-3 HARQ codebook).

5.5.1 Method of Triggering M SPS HARQ Codebooks

The base station may indicate (or configure) M SPS HARQ codebooks to the terminal by RRC signaling. M may be a natural number. One SPS HARQ codebook among the M SPS HARQ codebooks may be indicated to the terminal by a specific field or a combination of fields included in a DCI. The HARQ codebook indicated by the base station may not be limited to an SPS HARQ codebook. For example, the SPS HARQ codebook may be considered as the type-3 HARQ codebook.

For example, according to Table 1 below, four HARQ codebooks may be triggered by using two bits. The size of each HARQ codebook may not be dynamically determined. The size of each HARQ codebook may be determined by higher layer signaling (e.g., RRC signaling and/or MAC signaling). In Table 1, a form of the HARQ codebook according to a value of a trigger field for the HARQ codebook may be defined.

Method 5.5-7: The length of a field indicating a one-shot HARQ-ACK request included in a DCI may be increased.

If Method 5.5-7 is utilized for triggering of the SPS HARQ codebook, the corresponding DCI may be scrambled by a C-RNTI or MCS-C-RNTI.

In order not to increase the size of the DCI field, the HARQ codebook may be indicated by a combination of other fields included in the DCI. Some fields included in the DCI triggering the type-3 HARQ codebook may have specific values. Alternatively, some fields included in the DCI triggering the type-3 HARQ codebook may be reserved.

Method 5.5-8: When one-shot HARQ-ACK request has a specific value in a DCI, a reused HPN field may indicate a specific HARQ codebook.

The size of the HPN field included in the DCI may have 4 bits or less than 4 bits. The bit(s) in the HPN field may be selected from most significant bits (MSBs) or least significant bits (LSBs), and Method 5.5-7 may be applied.

In another exemplary embodiment, the terminal may generate a different HARQ codebook according to an RNTI. In a DCI scrambled with a C-RNTI, a one-shot HARQ-ACK request may be indicated to the terminal. Alternatively, one-shot HARQ-ACK request may be indicated to the terminal in a DCI scrambled with a CS-RNTI. When the C-RNTI is used, a type-3 HARQ codebook for all HPNs in all serving cells (e.g., active carrier(s) and inactive carrier(s)) configured for the terminal may be generated. When the CS-RNTI is used, a preconfigured HARQ codebook may be indicated to the terminal. The above-described exemplary embodiment may be an exemplary embodiment according to Table 1. For example, the HARQ codebook may be an SPS HARQ codebook. The terminal may generate an SPS HARQ codebook for SPS PDSCH(s) for a BWP in which the DCI is received.

TABLE 1

| Field value | Form of HARQ codebook |
|---|---|
| 00 | Type-3 HARQ codebook |
| 01 | SPS HARQ codebook |
| 10 | Type-3 HARQ codebook for a subset of serving cells, active serving cells, or configured serving cells |
| 11 | A subset of HPNs for type-3 HARQ codebook |

5.5.2 Method of Interpreting a Timing of Flushing a HARQ Buffer in a Procedure of Activating and/or Deactivating a Serving Cell A plurality of serving cells may be configured to a terminal, and some serving cell(s) among the plurality of serving cells may be activated. The terminal may identify the activated serving cell(s) and/or the deactivated serving cell(s) by using a bitmap included in a MAC CE. The terminal may flush a HARQ buffer for the deactivated serving cell(s), stop a timer (e.g., sCellDeactivationTimer and/or bwp-Inactivity Timer), and suspend an SPS and/or configured grant (CG).

When a PDSCH including the MAC CE is received, a timing of reflecting it by the terminal may be defined in the technical specification. When activation of the serving cell is indicated, operations related to CSI reporting and a timer may be distinguished from operations other than the corresponding operations. For the last slot n in which the PDSCH is received, the terminal may perform deactivation and/or activation of serving cells according to the indication of the MAC CE. In order to support this operation, the technical specification may define a preset time for the terminal to change a state of the serving cell. The terminal may change the state of the serving cell before the preset time elapses. The base station may identify whether decoding of the PDSCH is successful based on a HARQ-ACK received from the terminal (e.g., HARQ-ACK in a slot (n+m)). Therefore, depending on a time when the terminal transmits the HARQ-ACK to the base station and the aforementioned preset time, the state of the serving cell may not be clearly defined.

Figure 13:
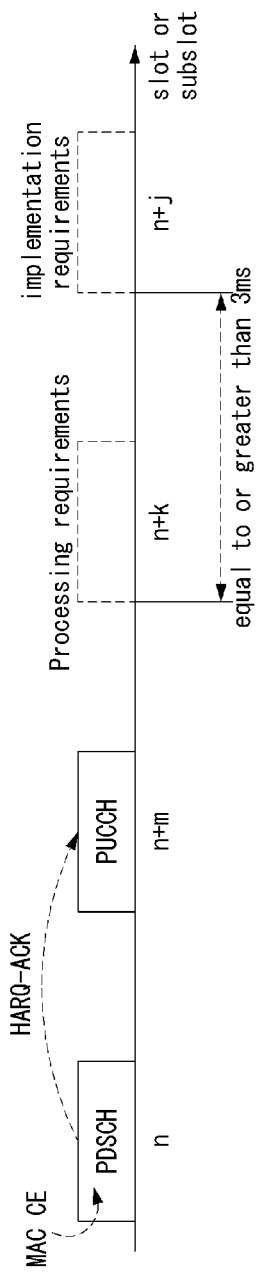
FIG. 13 is a conceptual diagram illustrating a reception timing of a MAC CE for changing a state of a serving cell and a time taken to reflect the MAC CE.

FIG. 13 is a conceptual diagram illustrating a reception timing of a MAC CE for changing a state of a serving cell and a time taken to reflect the MAC CE.

Referring to FIG. 13, the preset time allowed for the terminal may occur in a slot (n+j). A slot (n+k) may be the first slot 3 ms after a slot (n+m) in which a HARQ-ACK for a PDSCH is transmitted. The value of k may be determined by $m+3\cdot N_{slot}^{subframe}+1$. $N_{slot}^{subframe,\mu}$ may be the number of slots belonging to one subframe. µ may be µ applied to a PUCCH on which the HARQ-ACK is transmitted. The first slot after 3 ms from the transmission timing of the PUCCH may correspond to k. After successful decoding of the MAC CE in the slot (n+k), it may be determined that a sufficient time has elapsed for the state change of the serving cell. According to the precedence relationship between the slot (n+j) and the slot (n+k), the operation of the terminal and/or the state of the serving cell may be different from the interpretation of the base station.

In the first case, the slot (n+j) may occur first, and the slot (n+k) may occur after the slot (n+j). The terminal should complete the state change of the serving cell in the slot (n+j), but a logical error may occur because the slot (n+j) is located before the slot (n+k). The base station should not cause such the case, and may indicate the value of k (e.g., feedback of HARQ-ACK) to the terminal not to be too late.

In the second case, the slot (n+k) may occur first, and the slot (n+j) may occur after the slot (n+k). The terminal may not change the state of the serving cell until the slot (n+k−1). In the slot (n+k), slot (n+k+1), . . . , and slot (n+j−1), the state of the serving cell may or may not be changed. This operation may be determined by the implementation of the terminal. In the slot (n+j), slot (n+j+1), . . . , and the like, the state of the serving cell may not be changed. Therefore, slots in which the state of the serving cell is not conclusive may occur. The slots in which the state of the serving cell is not conclusive may be the slot (n+k), slot (n+k+1), . . . , and slot (n+j−1).

The state change of the serving cell may be completed from a specific slot among the above-described slots. The terminal may perform an operation according to the activated state for the activated serving cell, and may perform an operation according to the deactivated state for the deactivated serving cell.

In an exceptional case, operations related to CSI reporting and sCellDeactivationTimer may be performed in a reference slot. The terminal may perform an operation related to the CSI reporting for the active serving cell in the slot (n+k). The terminal may not perform CSI reporting for the inactive serving cell in the slot (n+k), and may perform an operation related to CSI reporting in the first slot (e.g., a slot after the slot (n+k)) activated for the serving cell to be activated soon. The operation for sCellDeactivationTimer may be considered to be performed in the slot (n+k).

When the serving cell is deactivated, the terminal may perform an operation of flushing the HARQ buffer. However, in slots in which the state of the serving cell is not conclusive (e.g., slot (n+k), slot (n+k+1), . . . , slot (n+j−1)), the state of the serving cell may be regarded by the terminal and the base station as different states.

According to indication of the base station, the terminal may generate an (enhanced) type-3 HARQ codebook. For example, the terminal may select some serving cell(s), and may generate the type-3 HARQ codebook including HARQ-ACK(s) for the selected serving cell(s). When only active serving cell(s) are to be selected, the state of the serving cell known by the terminal should be the same as the state of the serving cell known by the base station.

Method 5.5-9: When an (enhanced) type-3 HARQ codebook is generated only for an activate serving cell (e.g., activate carrier), a terminal may flush a HARQ buffer for an deactivated serving cell (e.g., deactivated carrier) based on a predetermined slot t.

The operation for CSI reporting and/or sCellDeactivationTimer may or may not be performed based on the slot (n+k) depending on the state of the serving cell. Therefore, the operation on the HARQ buffer may also be performed in the predetermined slot t (e.g., t=n+k). In addition, when generating the (enhanced) type-3 HARQ codebook in the slot t (e.g., when the slot t is the reference time), the state of the HARQ buffer may be determined. The base station may inform the terminal of a timing (e.g., slot t) of flushing the HARQ buffer for the deactivated serving cell (or released SPS) by using system information, RRC signaling, MAC CE, and/or DCI. Alternatively, a timing (e.g., slot t) of flushing the HARQ buffer for the deactivated serving cell (or the released SPS) may be predefined in the technical specification.

Method 5.5-10: In Method 5.5-9, it may be assumed that flushing of a HARQ buffer occurs in a slot (n+k).

In case that the timing of generating the (enhanced) type-3 HARQ codebook (e.g., reference time) is the slot t or a period including the slot t, if it is assumed that the serving cell is deactivated, HARQ-ACK information may become meaningless. If only the activated serving cell is considered, HARQ-ACK information for the corresponding serving cell may be omitted. In the former case in which the HARQ buffer is flushed, the HARQ-ACK information may be filled with a fixed value (e.g., NACK or ACK). In the latter case in which the deactivated serving cell is excluded, HARQ-ACKs as many as the number of HPNs configured in the deactivated serving cell may not be included in the HARQ codebook. When the deactivated serving cell becomes activated and Method 5.5-9 is applied, a HPN having a HARQ-ACK configured to a fixed value (e.g., NACK or ACK) may exist. The reason is that since a PDSCH is not received in a certain HPN, the terminal may generate a HARQ-ACK having an arbitrary value, but a fixed value is defined in the technical specification.

5.6 SPS HARQ Codebook Generation Method

A HARQ-ACK for an SPS PDSCH may be transmitted on an SPS PUCCH or PUSCH. The SPS PUCCH may include a HARQ codebook for the SPS PDSCH. An SPS HARQ codebook may refer to a HARQ codebook consisting of only HARQ-ACK(s) for SPS PDSCH(s).

A method of arranging HARQ-ACK(s) in the SPS HARQ codebook will be described. When two or more SPS configs are configured, SPS-ConfigIndex(es) may be assigned. All or part of the two or more SPS configs may be active. All or part of the two or more SPS configs may be released.

The size of the SPS HARQ codebook may be set by RRC signaling. Alternatively, according to indication of a DCI, the SPS HARQ codebook may include only a small number of HARQ-ACK bits.

In the SPS HARQ codebook, HARQ-ACKs may be arranged in an order of the SPS configs configured in the terminal (e.g., SPS-ConfigIndex).

In one method, an SPS HARQ codebook for all SPS configs indicated to the terminal by RRC signaling may be generated.

Since the number of SPS configs configured in the terminal is determined by RRC signaling, when only a small number of SPS configs are active, the size of the SPS HARQ codebook may be unnecessarily large. Therefore, a method for reducing the size of the SPS HARQ codebook may be required.

Alternatively, the SPS HARQ codebook for the active SPS config among the SPS configs indicated to the terminal by RRC signaling may be generated.

The terminal may generate the SPS HARQ codebook in the order of SPS-ConfigIndex for the active SPS configs. Some SPS configs may be active or released, some SPS configs may become active, and some SPS configs may become released. In this case, the terminal and the base station should be able to interpret the state of the SPS config as the same state (e.g., active state or release state).

Upon receiving an activating DCI (e.g., activating DCI for SPS configuration), the terminal may not transmit an ACK for the activating DCI to the base station. The terminal may receive an SPS PDSCH and may transmit a HARQ-ACK for the SPS PDSCH to the base station. In a procedure in which the base station instructs the terminal to transmit the SPS HARQ codebook, if some SPS configs are active, a timing at which the state of the SPS config can be interpreted as the same state may be defined.

After a predetermined processing time required for decoding from the timing of receiving the activating DCI, the terminal may expect to receive a certain SPS PDSCH. When the SPS HARQ codebook needs to be transmitted at a request of the base station, the terminal may consider that a HARQ-ACK for the corresponding SPS config is included in the SPS HARQ codebook. Before the predetermined processing time elapses, it may be considered that the terminal has not decoded the activating DCI, and it may be considered that the corresponding SPS config is not active in the SPS HARQ codebook.

Upon receiving the release DCI (e.g., release DCI for SPS configuration), the terminal may transmit an ACK for the release DCI to the base station. When the base station releases some SPS configs, a timing at which the state of the corresponding SPS config can be interpreted as the same state may be defined. Since the base station is able to select the timing for receiving the ACK for the release DCI, it may be assumed that the terminal can transmit a PUCCH including the ACK. For example, when a PUCCH cannot be transmitted in a certain slot according to a slot format, the base station may transmit the release DCI to the terminal so that the terminal transmits the PUCCH in a valid slot.

In this case, in order to transmit the SPS HARQ codebook, the states (e.g., activate state and/or release state) of SPS configs (i.e., SPS-ConfigIndex) to be included in the SPS HARQ codebook may be made clear.

In the SPS HARQ codebook, HARQ-ACKs may be arranged in the order of HPNs indicated to the terminal. The HPN may be determined by a timing at which the SPS PDSCH is received and/or an offset. The HPN may be calculated as a function of a slot in which the SPS PDSCH is received, the maximum value of HPN, and/or the offset indicated by RRC signaling.

Different SPS PDSCHs belonging to one SPS config may have the same HPN. Alternatively, SPS PDSCHs belonging to two or more SPS configs may have the same HPN. In this case, since the terminal maps only one HARQ-ACK to the HPN, one SPS PDSCH may be selected by the terminal.

Method 5.6-1: A terminal may use a HARQ-ACK for a temporally late SPS PDSCH among SPS PDSCHs having the same HPN.

Method 5.6-2: A terminal may use a HARQ-ACK for an SPS PDSCH having the lowest SPS-ConfigIndex among SPS PDSCHs having the same HPN.

In the method described below, a method of generating an SPS HARQ codebook using only some SPSs will be specifically described.

5.6.1 A Timing of Reflecting Activating DCI and/or Release DCI when an SPS HARQ Codebook Includes Only HARQ-ACKs for Active SPSs In one BWP, a plurality of SPSs may be configured to the terminal, and some SPS(s) among the plurality of SPSs may be active. Therefore, when an SPS HARQ codebook includes only HARQ-ACK(s) for the active SPS(s), a timing at which an activating DCI and/or release DCI is reflected should be promised between the terminal and the base station.

Figure 14:
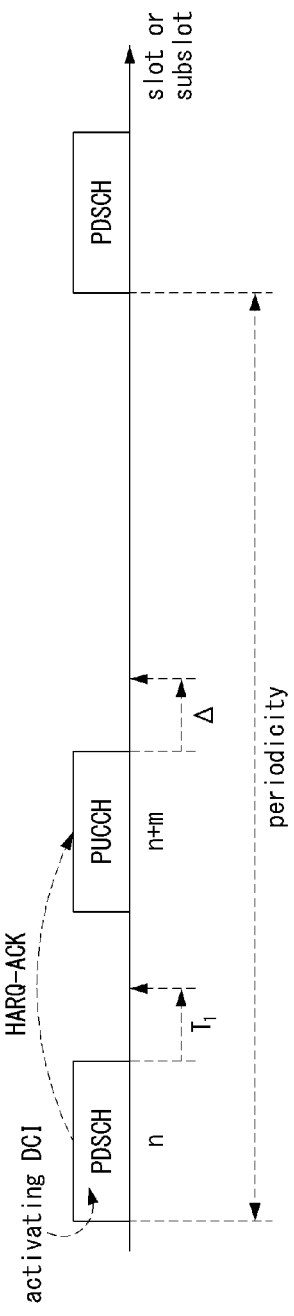
FIG. 14 is a conceptual diagram illustrating a reception operation of an activating DCI and a timing at which the activating DCI is reflected.

FIG. 14 is a conceptual diagram illustrating a reception operation of an activating DCI and a timing at which the activating DCI is reflected.

Referring to FIG. 14, a base station may instruct a terminal to receive an SPS PDSCH by using an activating DCI. The terminal may receive the activating DCI and may not perform an additional operation for the activating DCI. The terminal may receive the SPS PDSCH, may generate a HARQ-ACK for the SPS PDSCH, and may transmit the HARQ-ACK to the base station.

The terminal may receive the activating DCI, may receive the SPS PDSCH, and may transmit the HARQ-ACK for the SPS PDSCH to the base station. The base station may recognize the HARQ-ACK as ACK or NACK for a preset time (e.g., $\Delta$). When ACK or NACK is received at the base station, the corresponding SPS may be considered as being active. However, the base station may not know the state of the corresponding SPS before identifying the ACK or NACK.

Figure 15:
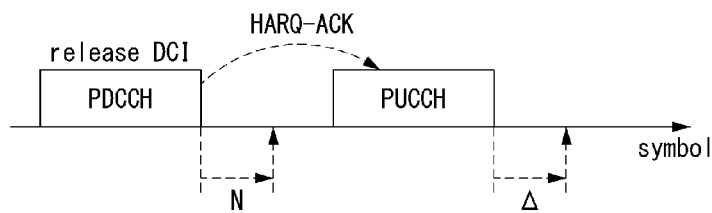
FIG. 15 is a conceptual diagram illustrating a reception operation of a release DCI and a timing at which the release DCI is reflected.

FIG. 15 is a conceptual diagram illustrating a reception operation of a release DCI and a timing at which the release DCI is reflected.

Referring to FIG. 15, a terminal may receive a release DCI and may transmit a HARQ-ACK for the release DCI to a base station. The base station may recognize the HARQ-ACK as ACK or NACK for a preset time (e.g., $\Delta$). When the ACK or NACK is received at the base station, the corresponding SPS may be considered as being released. However, the base station may not know the state of the corresponding SPS before identifying the ACK or NACK.

For an SPS HARQ codebook, the state of the SPS (e.g., active state or release state) needs to be identified, so that a reference time needs to be determined between the terminal and the base station. In a proposed method, a timing at which activation and/or deactivation of the SPS PDSCH is recognized by the base station may be configured as a boundary, and it may be assumed that the state of the corresponding SPS does not change before the boundary. In order to support this operation, the preset time (e.g., $\Delta$) from the timing at which the HARQ-ACK is received by the base station to the timing when the result of the HARQ-ACK is reflected may be defined. The preset time may be indicated to the terminal by system information, RRC signaling, MAC CE, and/or control information. Alternatively, the preset time may be defined in the technical specification. The reference time for generation of the (enhanced) type-3 HARQ codebook or the SPS HARQ codebook may be after the preset time (e.g., $\Delta$).

Method 5.6-3: A preset time from a timing of decoding a HARQ-ACK related to an SPS to a timing at which the decoding result is reflected in a base station may be defined in the technical specification. Alternatively, the preset time may be indicated to a terminal by system information, RRC signaling, MAC CE, and/or control information.

When the terminal receives a triggering DCI triggering the (enhanced) type-3 HARQ codebook or SPS HARQ codebook, the size of the (enhanced) type-3 HARQ codebook or SPS HARQ codebook may vary depending on the timing at which the corresponding HARQ codebook is triggered. When an activating DCI is received, the terminal may transmit a HARQ-ACK for the first SPS PDSCH, and a slot or symbol after the preset time may become a boundary. When a release DCI is received, the terminal may transmit a HARQ-ACK for the release DCI, and a slot or symbol after the preset time may become a boundary.

The preset time may vary depending on a processing capability of the terminal. For example, the base station may receive processing capability information of the terminal, and in consideration of the processing capability of the terminal, the base station may configure a processing capability 1 or a processing capability 2 to the terminal by using RRC signaling. Alternatively, when there is no configuration by RRC signaling, the processing capability 1 may be considered to be used. When the processing capability 2 is used, the base station may configure the processing capability 2 to the terminal by using RRC signaling.

The preset time may be defined in units of symbols. The preset time may be determined by a combination of subcarrier spacings used in a DL BWP and/or a UL BWP in which the terminal operates.

The base station may transmit the triggering DCI to the terminal, and the terminal may receive the triggering DCI on a PDCCH. After a preset time (e.g., N symbols) from the next symbol of the last symbol of the PDCCH, the terminal may generate an SPS HARQ codebook by using a HARQ-ACK corresponding to an HPN. Therefore, the terminal may derive a HARQ-ACK for an active SPS or released SPS according to the timing of generating the SPS HARQ codebook.

It may be indicated that the (enhanced) type-3 HARQ codebook or SPS HARQ codebook does not include an NDI. Alternatively, whether the (enhanced) type-3 HARQ codebook or SPS HARQ codebook includes an NDI may be interpreted differently for each serving cell.

5.6.2 Case when SPS HARQ Codebook Includes HARQ-ACK for Configured SPS

One or more SPSs may be configured to a terminal by RRC signaling. The terminal may receive a PDSCH according to an active SPS among the one or more SPSs, and report a HARQ-ACK for the received PDSCH to a base station. When an SPS HARQ codebook (or (enhanced) type-3 HARQ codebook) is triggered to the terminal, the terminal may derive HARQ-ACK(s) for all configured SPS(s), and generate the SPS HARQ codebook including the HARQ-ACK(s). In this case, the SPS HARQ codebook may include not only HARQ-ACK(s) for active SPS(s) but also HARQ-ACK(s) for released SPS(s).

The terminal may derive a HARQ-ACK for an activated SPS PDSCH, and when a release DCI (e.g., release DCI for SPS configuration) is received, the terminal may derive a HARQ-ACK for the release DCI, and derive NACK or ACK for the released SPS.

For the active SPS, an HPN related to the SPS PDSCH may be determined based on a time resource in which the corresponding SPS PDSCH is received, a formula defined in the technical specification, and/or an HPN offset set by RRC signaling. When the SPS HARQ codebook includes only the configured SPS(s), the terminal may arrange HARQ-ACK(s) in the SPS HARQ codebook according to the order (e.g., ascending or descending order) of HPNs received in the SPS PDSCH.

The HPNs derived from SPSs may not always be contiguous. Even when some missing HPNs exist, the terminal may derive the SPS HARQ codebook by arranging HARQ-ACKs in the order of HPNs associated with the SPS PDSCHs.

Alternatively, the terminal may derive the SPS HARQ codebook by arranging the HARQ-ACKs in the order (e.g., ascending or descending order) of identifiers (or indexes) included in the SPS configs.

Generation of the SPS HARQ codebook not including an NDI may be indicated to the terminal. Alternatively, the above-mentioned indication may be interpreted differently for each serving cell.

5.7 HARQ-ACK Timing Change Method

A transmission time resource of an SPS PUCCH including a HARQ-ACK for an SPS PDSCH may be indicated to a terminal by an activating DCI and/or higher layer signaling. In a TDD system or a system supporting an unlicensed band, the PUCCH resource through which the HARQ-ACK is transmitted may not always be utilized. In the TDD system, since an SPS PUCCH can be transmitted in UL symbols, the terminal may not transmit a PUCCH in a symbol (e.g., DL symbol or FL symbol) other than a UL symbol. In the system supporting an unlicensed band, if the terminal does not secure a COT, if a COT is not shared with the terminal, or if the PUCCH resource includes a symbol belonging to an idle period, the terminal may not transmit the PUCCH.

In the TDD system, a slot pattern may be indicated to the terminal by RRC signaling and/or a DCI. A slot pattern having a specific periodicity may be indicated, and a pattern of DL, UL, and/or FL symbols may be indicated to the terminal. Some of the FL symbols indicated by RRC signaling may be changed (or determined) to DL, UL, or FL symbols through a specific DCI (e.g., DCI format 2_0).

The terminal may perform a reception operation of a DL signal/channel or a transmission operation of a UL signal/channel in a semi-static FL symbol according to configuration or scheduling. Alternatively, the terminal may not perform a periodic reception operation or a periodic transmission operation in the semi-static FL symbol. For example, a symbol in which an SPS PDSCH can be received may be a semi-static DL symbol. For example, a symbol in which a PUCCH including an SPS HARQ-ACK can be transmitted may be limited to a semi-static UL symbol. Since UL signals/channels allocated by a DCI can be multiplexed, the UL signals/channels may be transmitted even in a semi-static FL symbol in a transmission procedure in which the DCI is involved.

Communication in an unlicensed band may be performed in a frame based equipment (FBE) scheme. In this case, the terminal may not transmit a UL signal/channel in an idle period. The terminal may derive the idle period by a specific DCI (e.g., DCI format 2_0) or an implicit manner. For a fixed frame period (FFP) initiated by the terminal, the terminal may not be able to perform a transmission operation in the idle period. For a FFP initiated by the base station, the base station may not be able to perform a transmission operation in the idle period.

If an SPS PUCCH is expected to be invalid, the base station may not transmit an SPS PDSCH. If an SPS PUCCH is expected to be invalid, the terminal may not transmit an SPS PUCCH (e.g., SPS HARQ-ACK). When the SPS PDSCH is not transmitted, the base station may transmit a DCI to the terminal to schedule a PDSCH having a valid PUCCH. In order to perform the above-described operation in an unlicensed band, the base station may secure a COT.

Alternatively, a COT may be shared with the base station. If a COT is not secured or shared, the base station may not be able to transmit a PDCCH. In a proposed method, if a time resource (e.g., transmission time resource) of an SPS PUCCH for an SPS PDSCH is changed in a predetermined scheme, the base station may transmit the SPS PDSCH without additional DCI transmission.

Method 5.7-1: If it is determined that a time resource of an SPS PUCCH is invalid, a terminal may consider the time resource of the SPS PUCCH (or timing of HARQ-ACK) as a non-numerical value K (NNK).

When generation of a type-2 HARQ codebook is indicated to the terminal, a PDSCH may be divided into two groups, and a field included in a scheduling DCI may indicate a PDSCH group index. The terminal may generate a HARQ codebook (e.g., type-2 HARQ codebook) for each PDSCH group index. The terminal may map only a HARQ codebook having the same PDSCH group index according to the scheduling DCI to a PUCCH. Alternatively, the terminal may map HARQ codebooks having different PDSCH group indexes according to the scheduling DCI to a PUCCH.

The terminal may consider a HARQ-ACK to be transmitted on the SPS PUCCH as NNK. In this case, the HARQ-ACK (e.g., NNK) may be multiplexed in a HARQ codebook for a PDSCH group to which the SPS PDSCH belongs. NNK may mean that the time resource of the PUCCH is not determined.

Figure 16:
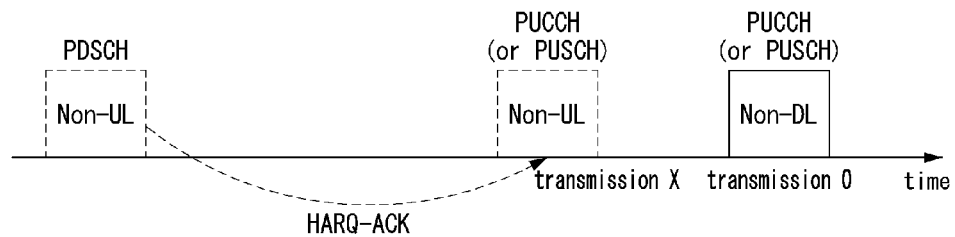
FIG. 16 is a conceptual diagram illustrating a first exemplary embodiment of a method of changing a time resource (e.g., feedback timing) of a PUCCH for an SPS PDSCH.

FIG. 16 is a conceptual diagram illustrating a first exemplary embodiment of a method of changing a time resource (e.g., feedback timing) of a PUCCH for an SPS PDSCH.

Referring to FIG. 16, a HARQ-ACK timing (e.g., feedback timing) may be changed based on Method 5.7-1. A HARQ-ACK for an SPS PDSCH may not be transmitted on an SPS PUCCH, and a base station may instruct the terminal to transmit a HARQ codebook having the same PDSCH group index as the SPS PDSCH.

Alternatively, a PDSCH group to which an SPS PDSCH belongs may not be predefined. If an SPS HARQ-ACK is not transmitted on an SPS PUCCH, the corresponding SPS HARQ-ACK may be transmitted on the first PUSCH or the first PUCCH that occurs later. In this case, for the PDSCH group(s), the SPS HARQ-ACK may belong to any one PDSCH group, and may be concatenated (appended or prepended) with another HARQ-ACK in the PDSCH group. That is, the SPS HARQ-ACK may be mapped to the corresponding PDSCH group. In this case, when two PDSCH groups are configured, HARQ-ACK bit strings for the respective PDSCH groups may be concatenated, and the SPS HARQ-ACK may be included in any one HARQ-ACK bit string.

Alternatively, the SPS HARQ-ACK may not belong to the PDSCH group. Therefore, after the HARQ codebook is generated, the SPS HARQ-ACK may be mapped as being concatenated with the corresponding HARQ codebook. In this case, after the HARQ-ACK bit string for the PDSCH group is concatenated, the SPS HARQ-ACK may be concatenated.

In a communication system supporting a licensed band, the PDSCH group may not be defined. In this case, an SPS PUCCH having NNK may be interpreted as being transmitted in a (sub)slot having the first PUSCH or PUCCH valid for the terminal. For example, the terminal may receive from the base station one value indicating an offset of the (sub)slot in which the SPS PUCCH is transmitted. When the SPS PUCCH cannot be transmitted at the timing indicated by the base station, the terminal may multiplex the SPS HARQ-ACK in the first PUSCH or PUCCH. If the corresponding PUSCH or PUCCH is not indicated, the terminal may retransmit the previous SPS HARQ-ACK on a PUCCH for the next received SPS PDSCH.

In a TDD system, the terminal may apply only a semi-static slot pattern to determine a transmission possibility of an SPS PUCCH. That is, the terminal may operate without dependence on a DCI format 2_0. Therefore, the terminal may not transmit an SPS PUCCH in a symbol indicated as a semi-static DL symbol, in a symbol belonging to an SS/PBCH block, and/or in a symbol belonging to a CORESET associated with a type-0-PDCCH CSS set.

Method 5.7-2: In a TDD system, a terminal may not transmit a PUCCH including SPS HARQ-ACK bit(s), SR, and/or CSI in a symbol indicated as a semi-static DL symbol, in a symbol belonging to an SS/PBCH block, in a type-0-PDCCH CSS set, and/or in a symbol belonging to a CORESET associated with a type-0-PDCCH CSS set.

The symbols in which the SPS PUCCH can be transmitted may include at least a semi-static UL symbol. In addition, the symbols in which the SPS PUCCH can be transmitted may also include some semi-static FL symbols. The reason is that if the symbol in which the SPS HARQ-ACK is transmitted is limited to only a semi-static UL symbol, the transmission of the SPS PUCCH is limited. In order to secure a high transmission amount, a part of the semi-static FL symbols may be utilized. In order to support this operation, it may be preferable for the base station to perform RRC signaling to the terminal.

Method 5.7-3: In Method 5.7-2, a base station may indicate, to a terminal, information indicating up to which semi-static FL symbol symbols from a semi-static DL symbol are invalid or information indicating from which semi-static FL symbol symbols are valid, by using RRC signaling.

According to a slot pattern indicated to the terminal, the semi-static DL symbols may be arranged first, then the semi-static FL symbols may be arranged, and then the semi-static UL symbols may be arranged. A method of indicating to the terminal symbols in which the SPS PUCCH can be transmitted may be classified into a method of informing a boundary of invalid symbols or a method of informing a boundary of valid symbols.

In the method of informing a boundary of invalid symbols, the base station may inform the terminal up to which semi-static FL symbol symbols are invalid according to Method 5.7-3. For example, when the base station indicates n to the terminal, the terminal may not transmit an SPS PUCCH in n consecutive symbols from a semi-static FL symbol arranged consecutively with a semi-static DL symbol. n may be a natural number.

In the method of informing a boundary of valid symbols, the base station may inform the terminal from which semi-static FL symbol symbols are valid according to Method 5.7-3. For example, when the base station indicates n to the terminal, the terminal may transmit an SPS PUCCH from the first semi-static FL symbol consecutively arranged with the last semi-static DL symbol to the n-th FL symbol. n may be a natural number.

A valid symbol or an invalid symbol indicated to the terminal may be equally applied to not only the SPS PUCCH but also the PUSCH. In order to support this operation, the following method may be considered.

Method 5.7-4: In Method 5.7-3, in order to indicate to a terminal semi-static FL symbols in which an SPS PUCCH cannot be transmitted, an RRC parameter (e.g., numberOfInvalidSymbolsForDL-UL-Switching) applied to a PUSCH may be applied as it is. Alternatively, a new RRC parameter to which the same value is applied may be introduced.

As another method proposed to represent a time resource for transmitting the SPS PUCCH, two or more (sub)slot offsets for transmitting the SPS PUCCH may be considered. Since the terminal transmits the SPS PUCCH only once, one (sub)slot offset may be selected from among the two or more (sub)slot offsets.

Method 5.7-5: Two or more (sub)slot offsets may be indicated to a terminal, and the terminal may select the smallest valid value among the two or more (sub)slot offsets to transmit an SPS PUCCH.

According to an SPS-Config configured to the terminal, a PUCCH resource may be indicated, and a set of (sub)slot offsets of the PUCCH (e.g., dl-DataToUL-ACK, RRC parameter(s) based on dl-DataToUL-ACK, K1 set) may be considered. One value may be indicated to the terminal by an activating DCI, and a (sub)slot in which the SPS PUCCH is transmitted may be determined. Therefore, in consideration of a subset consisting only of values greater than the value indicated by the activating DCI, the terminal may select the smallest value for which the SPS PUCCH can be transmitted from the corresponding subset.

When the terminal cannot find the above-mentioned value (e.g., when the corresponding subset is empty or when all elements of the subset indicate only invalid SPS PUCCH), the terminal may drop the SPS PUCCH. Alternatively, the terminal may multiplex the SPS HARQ-ACK in a PUSCH or PUCCH appearing later than the greatest value among the elements of the subset.

For example, the K1 set may have 16 values. In the activating DCI, an arbitrary value (e.g., the fourth value) belonging to the K1 set may be used. The terminal may not be able to transmit the SPS PUCCH based on the fourth value. In this case, the terminal may select the smallest value for which the SPS PUCCH can be transmitted from among values greater than the fourth value in the K1 set. The corresponding value may be obtained from the K1 set. Alternatively, if the SPS PUCCH cannot be transmitted with respect to all values belonging to the K1 set, the terminal may select the first PUCCH or PUSCH so as to transmit the SPS PUCCH at a value greater than the corresponding value, and may multiplex the SPS HARQ-ACK belonging to the SPS PUCCH in the PUCCH or PUSCH.

5.7.1 Method of Changing SPS PUCCH Timing to the First UL Channel Transmitted by a Terminal According to a periodicity of an SPS PDSCH, a periodicity of a TDD slot, and/or a periodicity of an FFP, a timing of an SPS PUCCH may be changed. The timing of the SPS PUCCH may be changed or deferred to a specific timing. According to the above-described methods, when a base station transmits a separate DCI, an SPS HARQ-ACK may be transmitted.

In a (sub)slot in which a PUCCH or PUSCH can be transmitted, the terminal may multiplex the SPS HARQ-ACK and/or other UCI type(s). UCIs corresponding to different priorities (e.g., eMBB or URLLC) may be multiplexed according to indication and/or configuration of the base station.

If there is a deferred SPS HARQ-ACK, one PUCCH resource may be determined in consideration of the deferred SPS HARQ-ACK, SPS HARQ-ACK, and/or other UCIs. When the terminal transmits a PUSCH, the UCIs may be multiplexed in the corresponding PUSCH. In the multiplexing procedure, some UCIs may be dropped.

The transmission of the PUCCH and/or PUSCH may not be allowed according to a slot pattern, an invalid symbol, or a valid symbol. In this case, the terminal may drop UCI and/or UL-SCH (or TB) excluding the SPS HARQ-ACK. The SPS HARQ-ACK may include both the already-deferred SPS HARQ-ACK and the first deferred SPS HARQ-ACK in the corresponding (sub)slot.

The terminal may multiplex the SPS PUCCH in the first UL transmission. One or more SPS PUCCHs may be changed to the same timing. In this case, the PUCCH resource to be applied by the terminal may be applied differently according to the amount of the HARQ-ACK (e.g., the number of SPS PUCCHs).

Method 5.7-6: When a terminal fails to transmit an SPS PUCCH, a corresponding SPS HARQ-ACK may be multiplexed in the first PUCCH or PUSCH transmitted after the SPS PUCCH.

The base station may allocate and/or activate the first PUCCH or PUSCH by using a DCI. Alternatively, the base station may allocate the first PUCCH or PUSCH by using RRC signaling. For example, the PUCCH may be a PUCCH transmitting a HARQ-ACK for a PDSCH allocated by a separate DL-DCI. Alternatively, the PUCCH or PUSCH may have the same SPS-configIndex or a different SPS-configIndex as the SPS HARQ-ACK for the SPS PDSCH. For example, the PUSCH may be a PUSCH allocated by a separate UL-DCI, a type 1 CG PUSCH, or a type 2 CG PUSCH. Here, the first PUCCH may refer to a PUCCH having a time resource or a subsequent time resource of a next (sub)slot of a (sub)slot in which the SPS PUCCH is to be transmitted. The first PUSCH may refer to a PUSCH having a time resource or a subsequent time resource of a next (sub)slot of a (sub)slot in which the SPS PUCCH is to be transmitted.

Since the base station knows all of the TDD slot pattern, the time resource of the SPS PDSCH, and the time resource of the SPS PUCCH, the base station may know the first UL channel of the terminal. The terminal may multiplex the SPS HARQ-ACK in the first UL channel. When the timing of the SPS PUCCH is changed, the corresponding SPS HARQ-ACK may be multiplexed in another PUCCH or another PUSCH. In this case, since the amount of HARQ-ACK is changed, a method for indicating the changed amount of HARQ-ACK to the terminal may be required.

The PUCCH resource index included in the SPS-config may indicate a resource for one HARQ-ACK bit. When the previously-changed SPS HARQ-ACK is further multiplexed at the feedback timing, the SPS PUCCH may include two or more bits. In order to support this operation, the base station may indicate a separate PUCCH resource index to the terminal.

A payload may be determined according to the number of SPS HARQ-ACKs to be transmitted in the same PUCCH or the same HARQ codebook, and a PUCCH resource list for the payload may be indicated to the terminal through RRC signaling. The terminal may determine a PUCCH resource set according to the number of SPSs (e.g., SPS-configIndexes), and may determine a PUCCH resource by applying the PUCCH resource index indicated by the base station. Here, the SPS HARQ-ACKs belonging to the HARQ codebook may have different SPS-configIndexes.

In another exemplary embodiment, SPS HARQ-ACKs having the same SPS-configIndex may be multiplexed in one HARQ codebook. Here, the HARQ codebook may be a type-1 HARQ codebook, a type-2 HARQ codebook, a type-3 HARQ codebook, or an SPS HARQ codebook.

The terminal may generate a HARQ codebook for a PUCCH that has not been transmitted due to a TDD slot pattern, and may multiplex the HARQ codebook in the first UL channel after the PUCCH that has not been transmitted. This operation may be embodied in the following methods.

Method 5.7-7: In a procedure of generating a type-1 HARQ codebook, a terminal may consider a temporal order of PUCCHs. The terminal may apply a K1 value for the actually transmitted SPS PDSCH instead of the non-transmitted SPS PDSCH.

Consequently, in Method 5.7-7, the temporal order of the PUCCHs may be an order of (sub)slots in which the SPS PDSCHs are received. The reason is that the K1 values of the SPS PDSCHs may be the same. PDSCH candidate(s) included in the type-1 HARQ codebook may be referred to as $M_{A,c}$. When the HARQ-ACKs for the changed timing are included in the type-1 HARQ codebook, the size of the set of $M_{A,c}$ may be further increased so that the non-transmitted HARQ-ACK(s) for the SPS PDSCH(s) are also included in the type-1 HARQ codebook.

For example, periodic repetition of a slot pattern 'DSUUU' may be indicated (or configured) to the terminal by RRC signaling. In this case, the SPS PDSCH may be activated, the periodicity of the SPS PDSCH may be four slots, and the HARQ-ACK feedback timing may be indicated to the terminal as two slots. In the slot pattern, 'D' may be a DL slot and 'U' may be a UL slot. In 'S' of the slot pattern, the PDSCH may not be received, and the PUCCH may not be transmitted. The K1 set used by the terminal may be assumed to be {2, 4} slots. Here, the slot may be interpreted also as a subslot.

Figure 17:
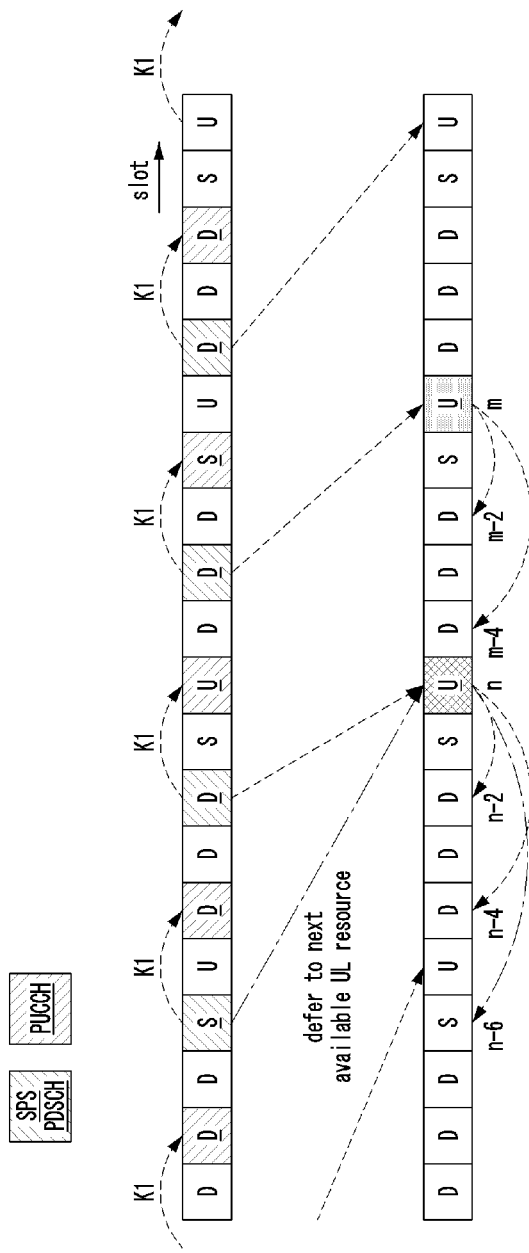
FIG. 17 is a conceptual diagram illustrating a first exemplary embodiment of a method of changing a feedback timing of a HARQ-ACK for an SPS PDSCH.

FIG. 17 is a conceptual diagram illustrating a first exemplary embodiment of a method of changing a feedback timing of a HARQ-ACK for an SPS PDSCH.

Referring to FIG. 17, a HARQ codebook may be considered in one specific slot n. In a TDD system, a terminal may consider PDSCHs received in slots (n−2) and (n−4). Considering SPS PDSCHs, the terminal may derive HARQ-ACKs for the PDSCHs received in the slots {n−4, n−2}. The derived HARQ-ACKs may be arranged in a PUCCH of the slot n according to the reception order of the PDSCHs. That is, the derived HARQ-ACKs may be included in a HARQ codebook. The terminal may not transmit a HARQ-ACK for a PDSCH received in a slot (n−6). The reason is that a PUCCH for the corresponding HARQ-ACK should be transmitted in the slot (n−4), but the slot (n−4) is a DL slot.

According to Method 5.7-6, since the SPS HARQ-ACK for the SPS PDSCH received in the slot (n−6) cannot be transmitted on the PUCCH of the slot (n−4), the terminal may find a slot in which PUCCH transmission is possible after the slot (n−4). The slot in which PUCCH transmission is possible may be regarded as the slot n. According to Method 5.7-7, the temporal order between the PDSCH received in the slot (n−6) and the PDSCHs received in the slots {n−4, n−2} may be considered. The terminal may generate the HARQ codebook by arranging the HARQ-ACKs for the PDSCHs received in the slots {n−6, n−4, n−2} in order, and may transmit the HARQ codebook on the PUCCH of the slot n.

When the SPS-configIndex is configured according to the TDD slot pattern, the procedure for determining whether the SPS PDSCH is received in a valid time resource may be modified. If the SPS PDSCH for the SPS-configIndex is not received in a valid time resource, the terminal may not generate an SPS HARQ-ACK. Alternatively, in this case, the terminal may fix the SPS HARQ-ACK to NACK. In addition, when the timing of the SPS PUCCH is changed, the terminal may generate the SPS HARQ-ACK in consideration of the changed timing, generate the HARQ codebook by arranging the SPS HARQ-ACKs in the reception order of the SPS PDSCHs, and transmit the HARQ codebook on a PUCCH or PUSCH. This operation may be expressed as Method 5.7-8 below. Method 5.7-8 may be applied to a type-1 SPS HARQ codebook or a type-2 SPS HARQ codebook.

Method 5.7-8: For a given SPS-configIndex, two or more HARQ-ACKs may be arranged in an SPS HARQ codebook. The SPS HARQ codebook may include a HARQ-ACK (e.g., deferred HARQ-ACK) for an SPS PDSCH associated with an invalid SPS PUCCH resource.

When the timing of the SPS PUCCH is changed from a (sub)slot m to the (sub)slot n, one or more HARQ-ACKs may be arranged according to SPS-ConfigIndexes in the SPS HARQ codebook transmitted in the (sub)slot n, and the arrangement order of the one or more HARQ-ACKs may be the reception order of the SPS PDSCH(s). The SPS HARQ-ACK(s) to be transmitted in the (sub)slot m and the SPS HARQ-ACK(s) transmitted in the (sub)slot n may be concatenated, and then a loop considering the SPS-ConfigIndexes may be performed outside.

As another proposed method, the SPS HARQ-ACKs in the SPS HARQ codebook may be arranged in a different scheme.

Method 5.7-9: In a procedure of generating a type-1 SPS HARQ codebook, a terminal may separately generate an SPS HARQ codebook intended to be transmitted for a corresponding SPS-configIndex, and may generate one HARQ codebook by concatenating a deferred SPS HARQ codebook and the SPS HARQ codebook to be transmitted this time.

Method 5.7-10: In a procedure of generating a type-2 SPS HARQ codebook, a terminal may separately generate an SPS HARQ codebook intended to be transmitted for a corresponding SPS-configIndex, and may generate one HARQ codebook by concatenating a deferred SPS HARQ codebook and the SPS to be transmitted this time.

The timing of the SPS PUCCH may be changed from the (sub)slot m to the (sub)slot n. In this case, the terminal may generate an SPS HARQ codebook (e.g., SPS HARQ codebook whose feedback timing is changed) associated with the (sub)slot m, generate an SPS HARQ codebook (e.g., SPS HARQ codebook whose feedback timing is not changed) associated with the (sub)slot n, and transmit a HARQ codebook by concatenating the above-described SPS HARQ codebooks.

The terminal may wait a long time until the terminal transmits the first UL channel. In this case, the terminal may not transmit the SPS HARQ-ACK according to traffic delay conditions. In order to solve this problem, the base station may schedule a UL channel to the terminal by using an additional DCI.

Method 5.7-11: A time window may be indicated to a terminal, and the terminal may transmit an SPS HARQ-ACK on the next UL channel within the time window. In this case, transmission of the SPS HARQ-ACK may be deferred. The terminal may not multiplex the SPS HARQ-ACK outside the time window. Alternatively, the terminal may consider the SPS HARQ-ACK as NACK outside the time window, and may multiplex the NACK.

The base station may indicate the time window to the terminal using higher layer signaling. The terminal may know a time during which the SPS HARQ-ACK is valid within the time window. Therefore, it is not necessary to transmit the HARQ-ACK outside the time window, and a procedure for including the SPS HARQ-ACK for the corresponding SPS-configIndex in a subsequent UL channel may not be performed. This operation may be applied to all types of SPS HARQ codebooks.

5.8 Multiplexing of SPS HARQ Codebook and UCI

An SPS HARQ codebook may correspond to a PUCCH. If only the SPS HARQ codebook is to be transmitted, the terminal may transmit only an SPS PUCCH. A time resource of the SPS PUCCH may overlap with a time resource of a PUCCH or PUSCH for other UCI or TB. In this case, the SPS HARQ codebook may be transmitted by being multiplexed with the UCI or TB.

The UCI may be configured as a type-1 HARQ codebook. In this case, the terminal may generate a bit string including HARQ-ACKs for all potential PDSCH candidates for which PUCCH transmission is possible in overlapping symbol(s).

The UCI may include a type-2 HARQ codebook. In this case, the terminal may generate a bit string including HARQ-ACKs for all PDSCH candidates dynamically indicated by a PUCCH (e.g., PRI) of the same resource.

When a priority of the UCI is the same as that of the SPS HARQ-ACK, the UCI and the SPS HARQ-ACK may be concatenated, and an encoding operation may be performed on the concatenation result. When the priority of UCI is different from that of the SPS HARQ-ACK, the terminal may transmit only UCI or SPS HARQ-ACK having a higher priority. Alternatively, the terminal may perform different encoding operations for the SPS HARQ-ACK and the UCI, and may concatenate results of the different encoding operations.

The UCI may include a type-3 HARQ codebook. In this case, the type-3 HARQ codebook may include HARQ-ACKs for all HARQ processes configured for the terminal. Therefore, the type-3 HARQ codebook may also include HARQ-ACK(s) for HARQ process(es) included in the SPS HARQ codebook.

When the priority of the UCI is the same as that of the SPS HARQ-ACK, the SPS HARQ-ACK may not be transmitted, and only an encoding operation for the UCI may be performed. When the priority of the UCI is different from that of the SPS HARQ-ACK, the terminal may transmit UCI or SPS HARQ-ACK having a higher priority. Alternatively, the terminal may perform different encoding operations for the SPS HARQ-ACK and the UCI, and may concatenate results of the different encoding operations.

Method 5.8-1: When overlapping symbol(s) exists between a PUCCH corresponding to a type-3 HARQ codebook and a PUCCH corresponding to an SPS HARQ codebook, a terminal may transmit only a PUCCH having a higher priority. When the priority of the type-3 HARQ codebook is the same as that of the SPS HARQ codebook, the terminal may transmit only the type-3 HARQ codebook.

5.8.1 Generation Timing of Type-3 HARQ Codebook

A terminal may receive a triggering DCI indicating transmission of an (enhanced) type-3 HARQ codebook. The terminal may transmit the (enhanced) type-3 HARQ codebook to a base station by using a PUCCH resource indicated by the triggering DCI. In this case, a HARQ-ACK timing reflected in the (enhanced) type-3 HARQ codebook may be clearly defined.

The terminal may generate the type-3 HARQ codebook by using HARQ-ACKs associated with all HARQ processes configured in a reference time resource (e.g., slot or subslot), HARQ-ACK(s) for active serving cell(s), HARQ-ACK(s) for active SPS(s), or a combination of the above-described HARQ-ACK(s).

When a generation timing of the type-3 HARQ codebook is not defined, a time resource from the reception timing of the triggering DCI to the transmission timing of a PUCCH (or PUSCH) may be given as a plurality of (sub)slots. When some serving cells are activated or deactivated or when some SPSs are active or released, interpretation of the generation timing of the type-3 HARQ codebook (or SPS HARQ codebook) in the base station may be different from the interpretation of the generation timing of the type-3 HARQ codebook (or SPS HARQ codebook) in the terminal. In order for the base station and the terminal to always derive the type-3 HARQ codebook (or SPS HARQ codebook) of the same size, one reference may be introduced.

Method 5.8-2: A reference time resource for generation of an (enhanced) type-3 HARQ codebook may be the last (sub)slot to which a PDCCH on which a triggering DCI is received belongs.

A HARQ-ACK for a certain HPN may have been already reported to the base station as a type-3 HARQ codebook. In this case, the same HARQ-ACK for the same HPN may be repeatedly reported to the base station. In order to prevent such the problem, it is necessary to identify whether a new PDSCH has been received or not. This operation may be performed by using an NDI. If the NDI is changed, the terminal may consider that a new PDSCH has been received. In this case, the terminal may report the HARQ-ACK to the base station. If the NDI is not changed, the terminal may not need to report the HARQ-ACK to the base station.

Method 5.8-3: A new PDSCH may not be received after a HARQ-ACK has already been reported in a procedure of generating an (enhanced) type-3 HARQ codebook. In this case, a terminal may not report a HARQ-ACK for a corresponding HPN.

The terminal may report a HARQ-ACK having a fixed value (e.g., NACK) in order to maintain the size of the type-3 HARQ codebook.

When the HARQ-ACK already reported to the base station should be included in the type-3 HARQ codebook, in order to prevent the HARQ-ACK from being reported to the base station in duplicate, a fixed value (e.g., NACK) instead of the HARQ-ACK may be reported to the base station.

Chapter 6 Sensing-Based CG PUSCH Transmission Method 6.1 PUSCH Repetition Type B Transmission Method in a Licensed Band A slot pattern may be indicated to a terminal by RRC signaling or a combination of RRC signaling and DCI. A semi-static UL/DL pattern of slots may be configured in common to an unspecified number of terminals by RRC signaling. A semi-static UL/DL pattern of slots may be configured to a specific terminal by RRC signaling. A DCI format 2_0 may be configured to a terminal by RRC signaling, and a UL/DL pattern of slots may be dynamically configured to a specific terminal by the DCI format 2_0.

When the PUSCH repetition type B is used, a time resource of a PUSCH occasion may be indicated by a DCI, and both a reference time resource and the number of repetitions of PUSCH instance(s) may be indicated. When a type 1 CG is used, the time resource of the PUSCH occasion may be indicated by RRC signaling. The time resource of the PUSCH occasion may cross a slot boundary. The terminal may or may not transmit PUSCH instance(s) crossing a slot boundary according to a slot format (e.g., DL/FL symbols), an occupancy time (e.g., an SFI of a COT or an end symbol of a COT by an MCOT), or dynamic activation of invalid resources. An invalid symbol may refer to a symbol to which a PUSCH is not mapped by a DCI or RRC signaling, and a valid symbol may refer to a symbol (e.g., a symbol to which a PUSCH is mapped) that is not an invalid symbol within a time window. In addition, the invalid symbol may include a symbol in which an SS/PBCH block is indicated to be transmitted by RRC signaling and a symbol in which a type0-PDCCH CSS set is configured. In addition, the terminal may assume that symbols as many as the number indicated by RRC signaling after a semi-static DL symbol(s) are invalid symbols.

Figure 18A:
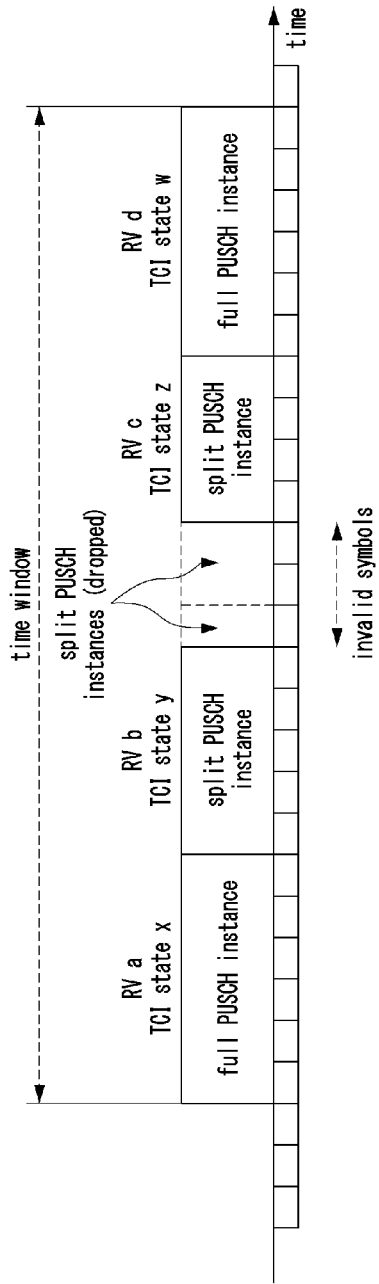
FIG. 18A is a conceptual diagram illustrating a first exemplary embodiment of a PUSCH occasion transmission method when PUSCH instances are continuously arranged.
Figure 18B:
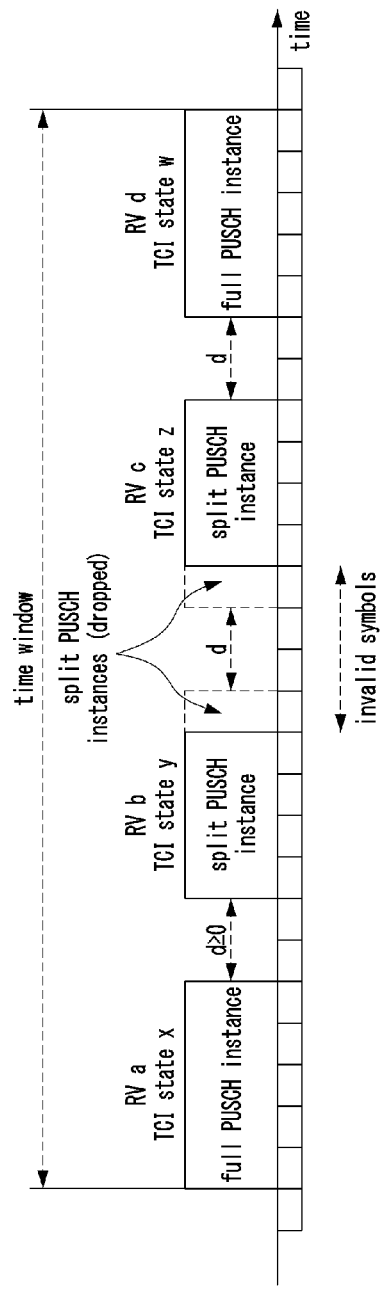
FIG. 18B is a conceptual diagram illustrating a first exemplary embodiment of a PUSCH occasion transmission method when PUSCH instances are arranged according to a preset interval.

FIG. 18A is a conceptual diagram illustrating a first exemplary embodiment of a PUSCH occasion transmission method when PUSCH instances are continuously arranged, and FIG. 18B is a conceptual diagram illustrating a first exemplary embodiment of a PUSCH occasion transmission method when PUSCH instances are arranged according to a preset interval.

Referring to FIGS. 18A and 18B, time resources may be time resources for PUSCH repetition type B. The terminal may repeatedly transmit a PUSCH four times in some symbols belonging to a time window. Invalid symbols in which the PUSCH cannot be transmitted may be excluded from the symbols belonging to the time window. The second and third PUSCH instances may be transmitted by being split in the time domain due to the invalid symbols. The second and third PUSCH instances may be referred to as split PUSCH instances. A DM-RS for each split PUSCH instance may be transmitted, and a TB may be mapped to each split PUSCH instance. If a split PUSCH instance consists of only a small number of symbols (e.g., one symbol), DM-RS mapping to the split PUSCH is possible, and TB mapping to the split PUSCH instance is not possible, the split PUSCH instance may not be transmitted.

When the base station (s) are deployed as several RxPs (e.g., multi-TRP (mTRP) or multi-RxP (mRxP) scenario), the terminal transmit PUSCH instances in a PUSCH occasion to different RxPs. Even when the terminal applies the same transmit precoding matrix indicator (TPMI)/transmit rank indicator (TRI) or SRS resource indicator (SRI) to all PUSCH instances in a communication system operating in a frequency range 1 (FR1), a reception operation in the mRxP may not be difficult. In a communication system operating in a FR2, it may be preferable for the terminal to apply a different TPMI/TRI or SRI for each RxP. Therefore, in order for the terminal to apply a spatial pre-processor (e.g., precoding or spatial filter) differently to each RxP or to allocate a transmit power differently to each RxP, an operation of changing the TPMI/TRI or SRI for each PUSCH instance may be required. A UL TCI state may refer to the pre-processor applied by the terminal.

The operation of changing the TCI state may include an operation for the terminal to change the spatial pre-processor, an operation of allocating the transmit power differently, and/or an operation of allocating a timing advance differently. Therefore, a processing time for applying the different TCI state according to the capability of the terminal may be required. The processing time d may be set in units of symbols. For example, the processing time d may be set by RRC signaling. Alternatively, the processing time d may be a fixed value in the technical specification. In the exemplary embodiment shown in FIG. 18A, the processing time d may be zero, and in the exemplary embodiment shown in FIG. 18B, the processing time d may be equal to or greater than zero. For example, the value of d may be determined as one value according to a frequency band.

The split PUSCH instances may have different RVs. Each split PUSCH instance may have one value belonging to one sequence among sequences indicated by higher layer signaling. Alternatively, each split PUSCH instance may have one value from among sequences fixed in the technical specification.

The symbols belonging to the time window may be classified into valid symbols to which the PUSCH instance can be mapped and invalid symbols to which the PUSCH instance cannot be mapped. The base station may indicate to the terminal a time pattern (e.g., periodicity and slot offset) of the invalid symbols by higher layer signaling. The base station may indicate whether the time pattern of the invalid symbols is applied by using a DCI scheduling or activating the PUSCH occasion. The terminal may consider symbol(s) in which an SS/PBCH block is transmitted or symbol(s) in which a type0-PDCCH CSS set is configured among the symbol(s) that do not correspond to the time pattern of the invalid symbols as invalid symbol(s), and may not map the PUSCH instance to the invalid symbols.

6.2 CG-UCI Transmission Method in an Unlicensed Band

A base station may allocate or activate periodic transmission of a PUSCH to a terminal. When PUSCH transmission is performed in an unlicensed band, the terminal may select some of scheduling information. The terminal may express the above-described scheduling information by using a CG-UCI, and the CG-UCI may be transmitted by being multiplexed with the PUSCH. The CG-UCI may include a HARQ process number, RV, and/or NDI of a TB mapped to the PUSCH. In addition, the CG-UCI may include information for sharing a COT secured by the terminal (hereinafter, referred to as 'COT sharing information'). The COT sharing information may be configured in two schemes, and the number of bits used to express the COT sharing information in the CG-UCI may vary according to the configuration scheme.

According to the first configuration scheme, an energy detection threshold may be indicated to the terminal, the terminal may secure a COT based on the energy detection threshold, and COT sharing information of the terminal may be indicated to the base station. The COT sharing information may be interpreted as a list, and one or more values may constitute the corresponding list. One value belonging to the list may indicate that COT sharing is not allowed. Another value belonging to the list may be a slot offset, and the slot offset may indicate slots available for the base station. The slot offset may indicate D consecutive slots, and may be expressed as a time after O slots elapses from a slot n in which the CG-UCI is transmitted (i.e., slots (n+O), (n+O+1), . . . , (n+O+D−1)). Since an access priority of LBT (e.g., channel access priority class (CAPC)) is also indicated to the terminal, if the terminal selects one value in the CG-UCI, the base station may perform DL transmission according to the CAPC of the COT shared by the CG-UCI. Since the COT sharing information may be expressed in the CG-UCI in form of a plurality of indices, UL-DL switching may occur several times within the COT secured by the terminal. The COT sharing information may be expressed as bits corresponding to the size of the list in the CG-UCI.

According to the second configuration scheme, an energy detection threshold may not be indicated to the terminal, and COT sharing information for sharing a COT secured by the terminal may be indicated to the base station. The COT sharing information may be represented by one bit. When the COT sharing information is expressed as '1' in the CG-UCI, the COT secured by the terminal may be shared with the base station. If the COT sharing information is expressed as '0' in the CG-UCI, the COT secured by the terminal may not be shared with the base station. A symbol offset (or slot offset) may be configured, and the base station may perform DL transmission after the symbol offset (or slot offset) from the slot n in which the CG-UCI is transmitted.

The CG-UCI may be mapped to the PUSCH, and a TB may be rate-matched in the PUSCH. When the PUSCH and a PUCCH overlap in the time domain, UCI belonging to the PUCCH may be transmitted as being multiplexed in the PUSCH. In this case, the PUCCH may not be transmitted. When the UCI includes a HARQ-ACK, the UCI may be concatenated with the CG-UCI, and an encoding operation on the concatenation result may be performed. The encoded CG-UCI and/or UCI may be mapped to REs close to a DM-RS.

When the (sub)slot in which the PUCCH is transmitted and the (split) PUSCH instance(s) overlap, the terminal may multiplex the UCI in the first transmitted (split) PUSCH instance among the (split) PUSCH instance(s) overlapping the PUCCH. Alternatively, the terminal may multiplex the UCI in the first (split) PUSCH instance belonging to the PUSCH occasion. The (split) PUSCH instance may be referred to as a PUSCH instance (e.g., full PUSCH instance) or a split PUSCH instance.

6.2.1 CG-UCI Mapping Method Considering Frequency Hopping

A UL signal/channel transmitted by a terminal in an unlicensed band may have an appropriate power density, and the UL signal/channel may be transmitted in an appropriate bandwidth. A DL signal/channel transmitted by a base station in an unlicensed band may have an appropriate power density, and the DL signal/channel may be transmitted in an appropriate bandwidth.

6.3 CG PUSCH Repetition Type B Transmission Method in an Unlicensed Band

A terminal operating in an unlicensed band may transmit a CG PUSCH. A CG-UCI may include scheduling information for the PUSCH and information on a time resource (e.g., COT) secured by the terminal. The CG-UCI may include an HPN, RV, NDI, and/or information on the time resource secured by the terminal. Information on the time resource secured by the terminal may be expressed as an index. For example, information on the time resource secured by the terminal may be expressed by one or more bits. It may be configured that the time resource secured by the terminal can be shared with the base station or another terminal. In this case, a list of energy detection thresholds and/or schemes for sharing the time resource secured by the terminal may be indicated to the terminal.

When a PUCCH and a PUSCH are located in the same symbol and the terminal is given a sufficient processing time, UCI may be multiplexed in the PUSCH. When the CG PUSCH is transmitted in an unlicensed band, the CG-UCI may be multiplexed with the UCI in the CG PUSCH, and an encoding operation may be performed on the multiplexing result. In this case, the UCI may include at least HARQ-ACK.

When the terminal is instructed to perform the PUSCH repetition type B, the terminal may consider the following method(s) in order to transmit the CG-UCI on the PUSCH.

Figure 19A:
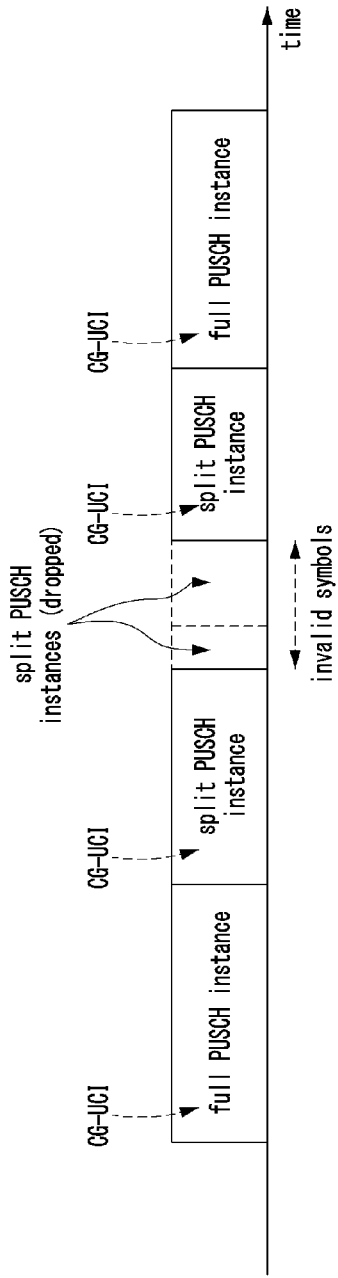
FIG. 19A is a conceptual diagram illustrating a first exemplary embodiment of a sensing-based method of transmitting a CG-UCI in all PUSCH instances belonging to a PUSCH occasion when the PUSCH instances are consecutively arranged.
Figure 19B:
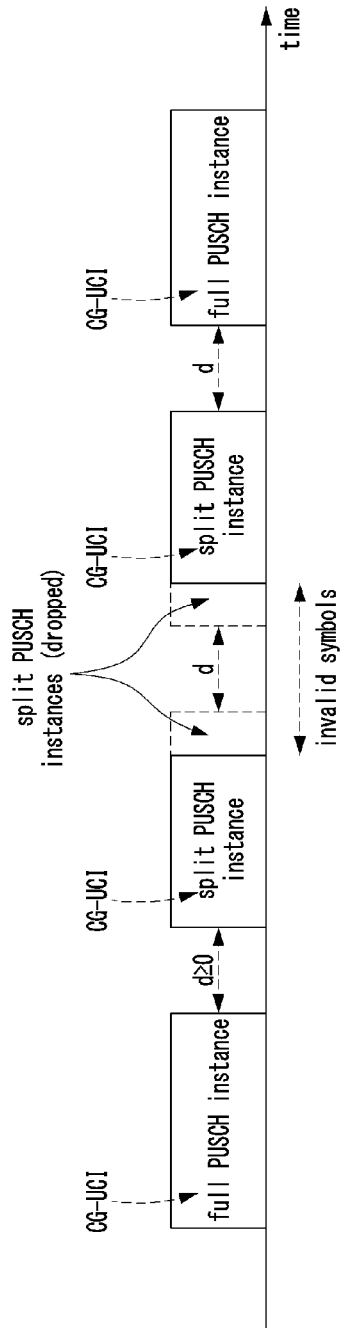
FIG. 19B is a conceptual diagram illustrating a first exemplary embodiment of a sensing-based method of transmitting a CG-UCI in all PUSCH instances belonging to a PUSCH occasion when the PUSCH instances are arranged according to a preset interval.

FIG. 19A is a conceptual diagram illustrating a first exemplary embodiment of a sensing-based method of transmitting a CG-UCI in all PUSCH instances belonging to a PUSCH occasion when the PUSCH instances are consecutively arranged, and FIG. 19B is a conceptual diagram illustrating a first exemplary embodiment of a sensing-based method of transmitting a CG-UCI in all PUSCH instances belonging to a PUSCH occasion when the PUSCH instances are arranged according to a preset interval.

Referring to FIGS. 19A and 19B, a terminal may transmit a CG-UCI based on the method(s) below.

Method 6.3-1: All (split) PUSCH instances belonging to a PUSCH occasion may include a CG-UCI.

The CG-UCI may always be included in a PUSCH instance. A PUSCH occasion may include four PUSCH instances, and the CG-UCI may always be included in the PUSCH instance. The CG-UCI may include an HPN, NDI, RV and/or COT sharing information.

With respect to the COT sharing information, the terminal may transmit different COT sharing information for each PUSCH instance, but it may be preferable not to change the previously transmitted COT sharing information. Therefore, it may be preferable to add new COT sharing information while maintaining the previously transmitted COT sharing information.

When transmission according to the PUSCH repetition type B is performed, the terminal may transmit one TB in a PUSCH occasion. Accordingly, some (e.g., HPN, NDI) of the scheduling information included in the CG-UCI may maintain the same value. The RV may have different values in the split PUSCH instances.

According to a proposed method, the terminal may interpret the RV as an RV for the split PUSCH instance. Therefore, the CG-UCI may always have a different value for each PUSCH instance. When the PUSCH repetition type B is used, a method of applying the RV may be known. Therefore, the terminal and the base station may predict the changed value of the RV even when the CG-UCI is changed.

According to another proposed method, the terminal may interpret the RV as an RV for the first PUSCH instance in the PUSCH occasion. When a value of energy, which is a result of LBT performed by the terminal, is measured to be high, the terminal may not be able to transmit the first PUSCH instance. Even in this case, the terminal may apply the RV to the first PUSCH instance. In the (split) PUSCH instance that the terminal actually transmits, the actual RV may be derived from the RV indicated by the CG-UCI, and the derived actual RV may be applied. According to this method, since all of the CG-UCIs express the same scheduling information, if the COT sharing information is also maintained to be the same, the CG-UCI may always be maintained to be the same in the PUSCH occasion. The base station may lower an error rate by decoding the CG-UCI based on the above-described configuration.

In the mTRP scenario, a plurality of spatial relation information or a plurality of TPMIs or TCI state indexes for a PUSCH occasion may be indicated to the terminal. In this case, if Method 6.3-1 is applied, each spatial relation information may correspond to a CG-UCI, and a PUSCH instance including the CG-UCI may be transmitted.

Method 6.3-2: Some PUSCH instances belonging to a PUSCH occasion may include a CG-UCI, and the PUSCH instance including the CG-UCI may be the first PUSCH instance for which LBT is successful or the first PUSCH instance transmitted within an FFP.

When the PUSCH repetition type B is used, PUSCH instances may have the same HPN and NDI. The RV and/or COT sharing information may have different values for each PUSCH instance. For example, the RV may be determined according to a preset order in the (split) PUSCH instances. The first value of the sequence of the RV may be indicated to the terminal by a DCI or higher layer signaling. Here, one value may be indicated to the terminal. Therefore, it may be sufficient for the base station to receive the value of the RV only once.

The COT sharing information may imply a time during which the base station can perform DL transmission within the time secured by the terminal. If the terminal does not update the COT sharing information or if the terminal does not add new COT sharing information, it may be sufficient for the base station to receive the COT sharing information only once.

Accordingly, the terminal may transmit only one CG-UCI for all PUSCH instances belonging to the PUSCH occasion. In this case, considering a processing time of the base station, the PUSCH instance in which the CG-UCI is multiplexed may be the first (split) PUSCH instance transmitted by the terminal. When it is determined that the amount of received energy is small as a result of LBT performed by the terminal, the CG-UCI may be multiplexed in the (split) PUSCH instance, and the CG-UCI may not be multiplexed in the remaining PUSCH instances. When the terminal performs a transmission operation within an FFP, the CG-UCI may be multiplexed in the first split PUSCH instance transmitted by the terminal, and the CG-UCI may not be multiplexed in the remaining PUSCH instances. This operation may be shown in FIGS. 20A and 20B.

FIG. 20A is a conceptual diagram illustrating a first exemplary embodiment of a method of transmitting a CG-UCI in the first PUSCH instance for which LBT is successful when PUSCH instances are consecutively arranged, and FIG. 20B is a conceptual diagram illustrating a first exemplary embodiment of a method of transmitting a CG-UCI in the first PUSCH instance for which LBT is successful wen PUSCH instances are arranged according to a preset interval.

Referring to FIGS. 20A and 20B, a terminal may transmit a CG-UCI based on the method(s) below.

Method 6.3-3: A CG-UCI may be included in non-consecutive (split) PUSCH instance(s) in the time domain.

Some symbols among symbols belonging to a PUSCH occasion may be determined to be invalid symbols or symbols other than valid symbols, and in this case, a (split) PUSCH instance may be transmitted. The terminal may identify whether a measured energy is less than or equal to a threshold by performing LBT before transmission of the (split) PUSCH instance. When the measured energy exceeds the threshold, the terminal may not transmit the PUSCH instance. This operation may be shown in FIGS. 21A and 21B.

Figure 21A:
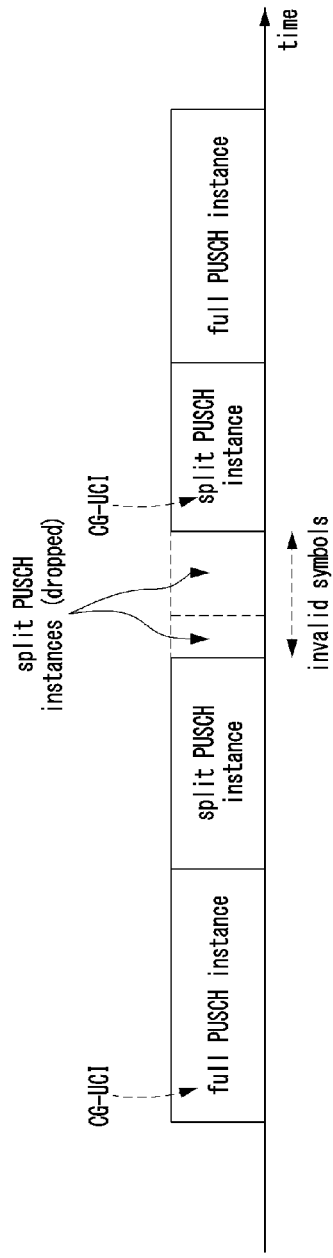
FIG. 21A is a conceptual diagram illustrating a first exemplary embodiment of a method of transmitting a CG-UCI in one PUSCH instance for each COT/FFP when PUSCH instances are consecutively arranged.
Figure 21B:
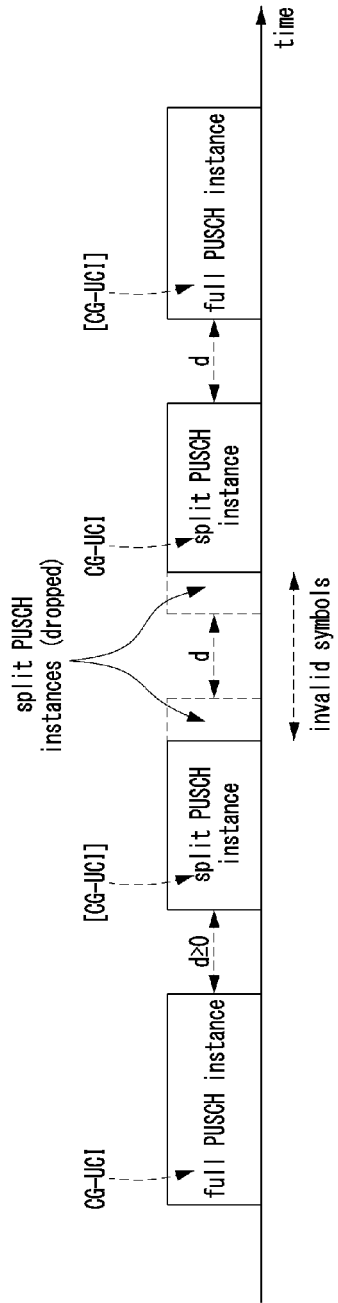
FIG. 21B is a conceptual diagram illustrating a first exemplary embodiment of a method of transmitting a CG-UCI in one PUSCH instance for each COT/FFP when PUSCH instances are arranged according to a preset interval.

FIG. 21A is a conceptual diagram illustrating a first exemplary embodiment of a method of transmitting a CG-UCI in one PUSCH instance for each COT/FFP when PUSCH instances are consecutively arranged, and FIG. 21B is a conceptual diagram illustrating a first exemplary embodiment of a method of transmitting a CG-UCI in one PUSCH instance for each COT/FFP when PUSCH instances are arranged according to a preset interval.

Referring to FIG. 21A, a PUSCH occasion may include two consecutive PUSCH instances, and a CG-UCI may be included in the first PUSCH instance of the consecutive PUSCH instances.

Referring to FIG. 21B, since PUSCH instances are arranged according to a preset interval, a PUSCH occasion may be interpreted as including two consecutive PUSCH instances. In this case, a CG-UCI may be included in the first PUSCH instance of the consecutive PUSCH instances. Alternatively, in case of (d>0), the PUSCH occasion may be interpreted as including four PUSCH instances. In this case, the CG-UCI may be included in all PUSCH instances.

When the terminal fails to perform a transmission operation in consecutive symbols or when the terminal performs the first transmission operation, the terminal may secure a COT by performing LBT. The terminal may share the secured COT with another terminal and/or a base station. The terminal may utilize the corresponding COT again after a time during which the COT is shared. In this case, the corresponding COT may be referred to as a 'paused COT'. The terminal may perform LBT to re-utilize the paused COT. Therefore, according to Method 6.3-3, the CG-UCI may be included in the PUSCH instance on which the LBT is performed, not all PUSCH instances. Here, the PUSCH instance may be a full PUSCH instance or a split PUSCH instance.

A terminal operating according to the FBE scheme may transmit a PUSCH occasion for a time longer than one FFP. When the PUSCH occasion crosses a boundary of the FFP, according to Method 6.3-3, the terminal may retransmit the CG-UCI. That is, the CG-UCI may be included in a specific PUSCH instance.

Method 6.3-4: When Method 6.3-3 is applied, one PUSCH instance including a CG-UCI may be defined for each COT/FFP secured by a terminal or each paused COT/FFP.

Chapter 7 PUCCH Carrier Switching 7.1 PUCCH Transmission in One TDD Cell

When communication is performed in a single cell, a terminal may transmit a HARQ-ACK to a base station by using a valid PUCCH resource when the PUCCH resource is valid. In a TDD system, symbol(s) according to a slot format (or slot pattern), SS/PBCH block, type-0 PDCCH CSS set, and/or CORESET may be regarded as symbol(s) in which the PUCCH is not transmitted.

When the above-described methods are applied in the sections 5.7 and the chapter 5, the terminal may wait for a valid resource in which the PUCCH can be transmitted in order to transmit the PUCCH in a PCell. This operation may be established for at least HARQ-ACK transmission for an SPS PDSCH. A time resource in which the SPS HARQ-ACK is transmitted may be the first UL resource available to the terminal. Here, the time resource for transmitting the PUCCH may be configured and/or indicated on a subslot or slot basis.

When repeated transmission of the PUCCH is configured, configuration information of PUCCH resources may include information indicating the number of repetitions of each PUCCH format. The number of repetitions of the PUCCH format may be equal to or greater than one. For example, the number of repetitions of the PUCCH format may be 2, 4, or 8. When repeated transmission of the PUCCH is configured to the terminal, the terminal may derive a time resource for transmitting the PUCCH in consideration of a TDD slot pattern. In this case, the terminal may wait until the terminal can utilize a valid time resource while maintaining the number of transmissions of the PUCCH.

Figure 22:
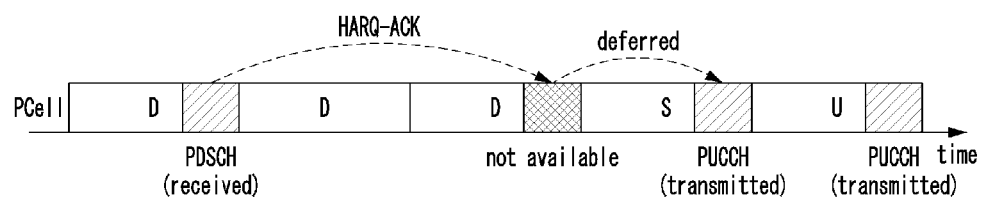
FIG. 22 is a conceptual diagram illustrating a first exemplary embodiment of a method of deferring HARQ-ACK transmission when repeated transmission of a PUCCH is indicated in a TDD system.

FIG. 22 is a conceptual diagram illustrating a first exemplary embodiment of a method of deferring HARQ-ACK transmission when repeated transmission of a PUCCH is indicated in a TDD system.

Referring to FIG. 22, a HARQ-ACK may be repeatedly transmitted twice based on slots. If a transmission time resource of a PUCCH in the current slot is not valid, the PUCCH may be transmitted through the same time resource in the next slot. This operation may be equally applied even when subslots are configured to the terminal.

In the TDD system, since a slot pattern is indicated to the terminal by RRC signaling, the terminal may derive a time resource in which the HARQ-ACK can be transmitted in advance. In particular, for transmission of the SPS HARQ-ACK, the terminal may predict in advance in which time resources PUCCH transmission is possible. Therefore, the terminal may not need to calculate the time resource of the PUCCH every time at least in the TDD system.

When repeated transmission of the PUCCH is not configured (e.g., when the PUCCH is transmitted only once), the PUCCH may be dropped according to the slot pattern. In order to improve the method in which the PUCCH is dropped in the TDD system, the repeated transmission procedure of the PUCCH may be extended. This operation may be shown in FIG. 23.

Figure 23:
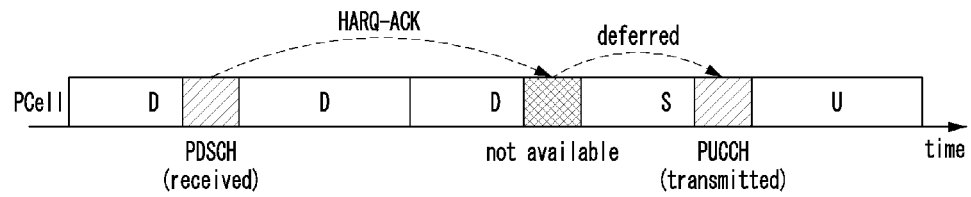
FIG. 23 is a conceptual diagram illustrating a first exemplary embodiment of a method of deferring HARQ-ACK transmission when repeated transmission of a PUCCH is not indicated in a TDD system.

FIG. 23 is a conceptual diagram illustrating a first exemplary embodiment of a method of deferring HARQ-ACK transmission when repeated transmission of a PUCCH is not indicated in a TDD system.

Referring to FIG. 23, when repeated transmission of a PUCCH is not indicated, HARQ-ACK transmission may be deferred.

Method 7.1-1: The number of repeated transmissions of a PUCCH may be increased by one, and a HARQ-ACK may be transmitted in the first time resource among valid time resources in which the PUCCH can be transmitted. The number of repeated transmissions of the PUCCH may be set to one value from among 1, 2, 4, 8, or a value equal to or greater than 8.

When the PUCCH is deferred, two or more SPS PDSCHs or HARQ-ACKs for the two or more PDSCHs may be transmitted in the same PUCCH resource. In this case, when repeated transmission of the PUCCH is not indicated to the terminal, the terminal may perform a UCI multiplexing operation according to the technical specification. For example, the terminal may generate a HARQ-ACK codebook, and may transmit the HARQ-ACK codebook to the base station on the PUCCH.

When repeated transmission of the PUCCH is indicated to the terminal, the terminal may transmit a HARQ-ACK for the first transmission, and may assume that a HARQ-ACK for transmission after the first transmission is not transmitted in the same time resource (e.g., PUCCH). In the HARQ codebook generation procedure, some HARQ-ACKs may be deferred HARQ-ACKs, and other HARQ-ACKs may not be deferred HARQ-ACKs. According to a proposed method, the terminal may generate the HARQ codebook regardless of the deferred HARQ-ACKs and the non-deferred HARQ-ACKs.

Method 7.1-2: When repeated transmission of a PUCCH is indicated to a terminal, the terminal may generate a HARQ codebook for HARQ-ACKs for which initial transmission is allowed in the same PUCCH instance without distinction between deferred HARQ-ACKs and non-deferred HARQ-ACKs.

According to Method 7.1 2, two or more SPS HARQ-ACK bits may be transmitted on one PUCCH according to a periodicity of an SPS PDSCH. In this case, a HARQ codebook may be generated based on one or a combination of two or more of the methods proposed in the sections 5.6 and 5.8.

7.2 PUCCH Transmission in Intra-Band TDD Carrier Aggregation (CA)

When two or more serving cells are activated for a terminal by CA, two or more UL symbols may be configured in a slot according to a pattern of each serving cell. Since a serving cell (e.g., PCell or PUCCH SCell) to which PUCCH transmission is possible is configured by RRC signaling, the terminal may not transmit a PUCCH to another serving cell (e.g., SCell). In exemplary embodiments, a PUCCH may be assumed to be transmitted in the PCell, and the terminal may assume that one or more SCells are activated.

When the terminal waits for a valid time resource of the PCell for HARQ-ACK transmission, a latency of the HARQ-ACK transmission may increase. In order to solve this problem, a valid time resource of the SCell may be used for HARQ-ACK transmission.

Method 7.2-1: Application of time deferral to SPS HARQ-ACK transmission or change of a serving cell to which an SPS HARQ-ACK is transmitted may be indicated to a terminal by RRC signaling The base station may instruct the terminal to perform either application of time deferral to SPS HARQ-ACK transmission or change of a serving cell to which an SPS HARQ-ACK is transmitted. The reason is that it is preferable for the base station to receive a PUCCH in one resource. The terminal may perform a UCI multiplexing operation based on the technical specification, and then may identify a frequency resource in which the PUCCH is transmitted. Thereafter, the terminal may determine the time resource for transmitting the PUCCH by using a group common DCI (e.g., DCI format 2_0, DCI format 2_1, DCI format 2_4, etc.).

Method 7.2-2: After performing a UCI multiplexing operation, a terminal may perform application of time deferral to SPS HARQ-ACK transmission and change of a serving cell to which an SPS HARQ-ACK is transmitted, and then may apply a group common DCI.

When a serving cell to which the PUCCH is transmitted may be changed, resources of the PUCCH may be configured for each active BWP in the serving cells. A separate DCI for managing a transmit power of the PUCCH may be required.

Method 7.2-3: A DCI format for controlling a power of a PUCCH may indicate the power of the PUCCH for another serving cell by reusing a bit that applies a supplementary UL (SUL).

When a SUL carrier is not configured in the terminal, according to Method 7.2-3, a method in which a transmit power control (TPC) command for SUL is indicated may be applied. Therefore, one bit may be added to the TPC command. That is, the TPC command may be expressed with three bits. Here, the added bit may refer to an index of the serving cell, the added bit set to a first value may indicate the PCell, and the added bit set to a second value may indicate the SCell.

The change of the serving cell to which the PUCCH is transmitted may be indicated by RRC signaling and/or DCI. The frequency resource in which the PUCCH is transmitted may be indicated by RRC signaling. Specifically, the serving cell to which the PUCCH is transmitted may be indicated to the terminal by using a preset pattern. The preset pattern may be periodically extended and applied. The preset pattern may be repeated with a periodicity of 20 ms or a periodicity of a factor of 20.

The terminal may receive a bitmap from the base station, and may determine to which serving cell the PUCCH is transmittable within a slot based on values of bits included in the bitmap. Here, at most one serving cell may be indicated to the terminal. For example, the terminal may receive a list of serving cells from the base station, and may apply the list of serving cells in order for each slot.

Method 7.2-4: A base station may indicate a pattern of serving cells to which a PUCCH is transmitted to a terminal through RRC signaling.

According to another method, the serving cell to which the PUCCH is transmitted may be changed according to a dynamic indication of the base station. The terminal may derive the serving cell to which the PUCCH is transmitted based on a separate field included in a scheduling DCI or a combination of field(s) indicating the PUCCH resource.

When the terminal transmits a plurality of HARQ-ACK bits, the terminal may derive the serving cell of the PUCCH based on a value indicated by the last received DL-DCI. When the PUCCH overlaps a PUSCH in the time domain of the derived serving cell, UCI may be multiplexed in the PUSCH in the corresponding serving cell.

Method 7.2-5: By extending (or reusing) a separate field or an existing field included in a DL-DCI, a serving cell for PUCCH may be derived.

A new field may be introduced in a DCI, and one serving cell may be selected from among two or more serving cells. Alternatively, a field indicating a PRI may be extended, and one bit in the corresponding field may indicate one of the serving cells. Alternatively, a PUCCH resource set may be extended, and a PUCCH resource belonging to the PUCCH resource set may include information implicitly indicating the change of the serving cell.

That repeated transmission of a PUCCH is indicated to the terminal may mean that the PUCCH is transmitted at least twice or more. If the above-described Method 7.1-1 is applied, the PUCCH may be transmitted one or more times. In this case, PUCCH carrier switching may be additionally activated in the terminal. In this case, the terminal may transmit a PUCCH occasion and may derive frequency resources for one or more PUCCH instances.

Method 7.2-6: When UCI repetition is configured, a terminal may transmit a PUCCH in the same carrier.

A PUCCH instance may always be transmitted in the same serving cell. This operation may be shown in FIG. 24.

Figure 24:
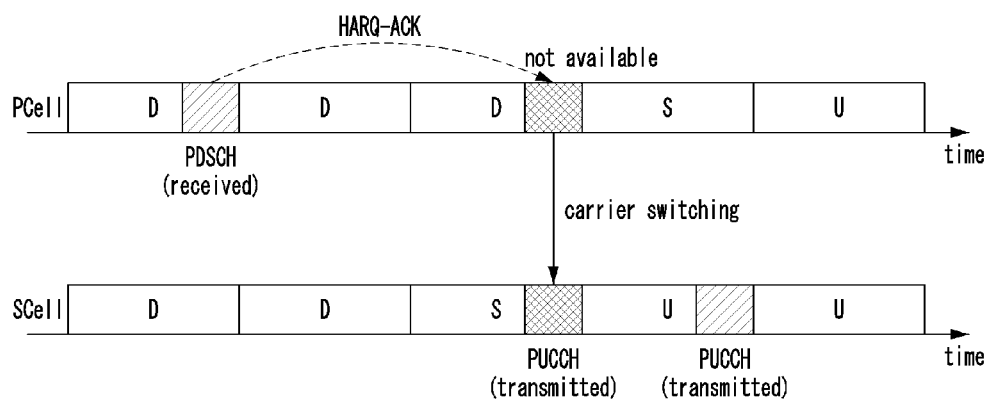
FIG. 24 is a conceptual diagram illustrating a first exemplary embodiment of a method of changing a serving cell to which a PUCCH is transmitted in TDD CA when repeated transmission of the PUCCH is indicated.

FIG. 24 is a conceptual diagram illustrating a first exemplary embodiment of a method of changing a serving cell to which a PUCCH is transmitted in TDD CA when repeated transmission of the PUCCH is indicated.

Referring to FIG. 24, a terminal may use two slots to transmit a PUCCH occasion, and the transmission of the PUCCH occasion may be performed in a SCell. In this case, since a slot pattern in a PCell is different from a slot pattern in the SCell, a valid UL resource may be allocated to the terminal.

The terminal may need to wait another time for transmission of a PUCCH instance according to a combination of the slot pattern(s) in the PCell and the slot pattern(s) in the SCell. This operation may be shown in FIG. 25.

Figure 25:
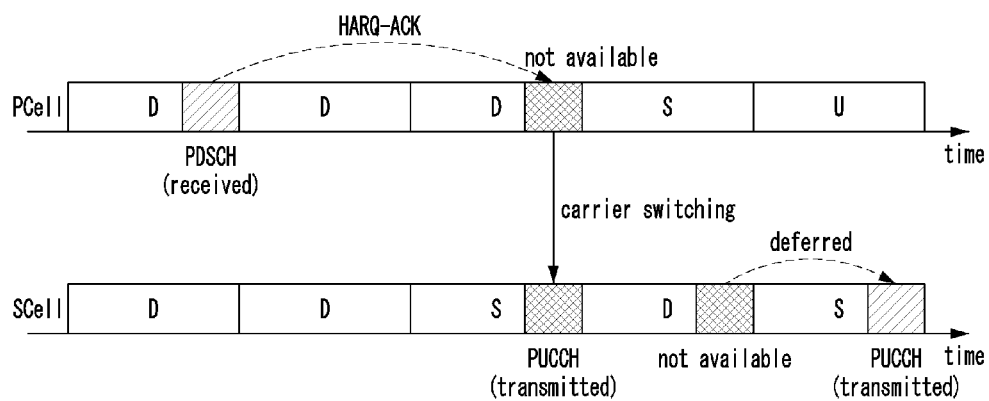
FIG. 25 is a conceptual diagram illustrating a second exemplary embodiment of a method of changing a serving cell to which a PUCCH is transmitted in TDD CA when repeated transmission of the PUCCH is indicated.

FIG. 25 is a conceptual diagram illustrating a second exemplary embodiment of a method of changing a serving cell to which a PUCCH is transmitted in TDD CA when repeated transmission of the PUCCH is indicated.

Referring to FIG. 25, a serving cell may be continuously maintained. For two transmissions of a PUCCH instance, the PUCCH may be transmitted in a SCell because the PUCCH cannot be transmitted in a PCell. The terminal may defer one slot according to a slot format of the SCell, and may transmit a PUCCH occasion using three slots.

Even when the method using only the PCell is applied, the PUCCH instance may be deferred. Accordingly, the terminal may transmit the PUCCH occasion by using three slots. When Method 7.2-6 is applied, there may be a case where the latency of the PUCCH transmission cannot be reduced. The reason is that the PUCCH occasion is limited to always be transmitted in the same serving cell.

In another method, it may be allowed for PUCCH instances to be transmitted in different serving cells. That is, the terminal may transmit the PUCCH instances in all serving cells available for transmission of the PUCCH instances.

Method 7.2-7: When UCI repetition is configured, a terminal may transmit each PUCCH instance in a different serving cell. This operation may be shown in FIG. 26.

Figure 26:
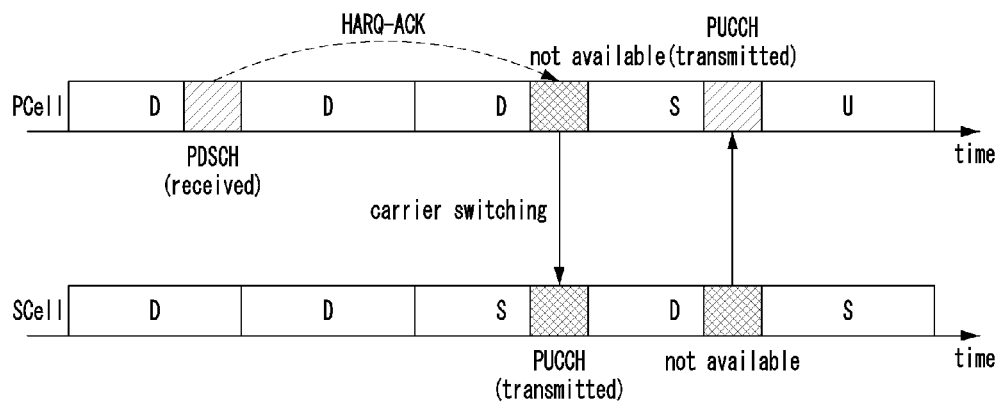
FIG. 26 is a conceptual diagram illustrating a third exemplary embodiment of a method of changing a serving cell to which a PUCCH is transmitted in TDD CA when repeated transmission of the PUCCH is indicated.

FIG. 26 is a conceptual diagram illustrating a third exemplary embodiment of a method of changing a serving cell to which a PUCCH is transmitted in TDD CA when repeated transmission of the PUCCH is indicated.

Referring to FIG. 26, a serving cell may be further changed. For two transmissions of a PUCCH instance, available serving cells may be indicated to a terminal by RRC signaling and/or DCI. Accordingly, the case in which the PUCCH instance is deferred may be reduced. The terminal may transmit the PUCCH instance once in the PCell and may transmit the PUCCH instance once in the SCell. In this case, the terminal may transmit the PUCCH occasion by using only two slots.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, the method comprising:
receiving information of a time window from a base station;
receiving a first semi-persistent scheduling (SPS) physical downlink shared channel (PDSCH) from the base station;
generating first hybrid automatic repeat request-acknowledgement (HARQ-ACK) information of the first SPS PDSCH;
determining a second resource after a first resource when transmission of the first HARQ-ACK information is not performed in the first resource; and
transmitting a HARQ-ACK codebook including the first HARQ-ACK information using the second resource to the base station, wherein the second resource is determined within the time window, and the transmission of the first HARQ-ACK information is not performed in a resource after the time window.

2. The method of claim 1, further comprising:
receiving a second SPS PDSCH from the base station; and
generating second HARQ-ACK information of the second SPS PDSCH,
wherein the HARQ-ACK codebook transmitted in the second resource includes the first HARQ-ACK information and the second HARQ-ACK information.

3. The method of claim 2, wherein the first HARQ-ACK information is deferred HARQ-ACK information, and the second HARQ-ACK information is non-deferred HARQ-ACK information.

4. The method of claim 1, wherein the HARQ-ACK codebook is a Type1 HARQ-ACK codebook or a Type2 HARQ-ACK codebook.

5. The method of claim 1, wherein the first resource is a first slot or a first subslot, and the second resource is a second slot or a second subslot.

6. A method of a terminal, the method comprising:
receiving information of a time window from a base station;
receiving a first semi-persistent scheduling (SPS) physical downlink shared channel (PDSCH) from the base station;
generating first hybrid automatic repeat request-acknowledgement (HARQ-ACK) information of the first SPS PDSCH;
receiving a second SPS PDSCH from the base station;
generating second HARQ-ACK information of the second SPS PDSCH;
determining a second resource after a first resource when transmission of the first HARQ-ACK information is not performed in the first resource; and
transmitting a HARQ-ACK codebook including the second HARQ-ACK information when a first HARQ process number of the first HARQ-ACK information is identical to a second HARQ process number of the second HARQ-ACK information,
wherein the second resource is determined within the time window, and the transmission of the first HARQ-ACK information is not performed in a resource after the time window.

7. The method of claim 6, wherein the first HARQ-ACK information is deferred HARQ-ACK information, and the second HARQ-ACK information is non-deferred HARQ-ACK information.

8. The method of claim 6, wherein the HARQ-ACK codebook is a Type1 HARQ-ACK codebook or a Type2 HARQ-ACK codebook.

9. The method of claim 6, wherein the first resource is a first slot or a first subslot, and the second resource is a second slot or a second subslot.

10. A terminal, the terminal comprising:
a processor,
wherein the processor causes the terminal to:
receive information of a time window from a base station;
receive a first semi-persistent scheduling (SPS) physical downlink shared channel (PDSCH) from the base station;
generate first hybrid automatic repeat request-acknowledgement (HARQ-ACK) information of the first SPS PDSCH;
determine a second resource after a first resource when transmission of the first HARQ-ACK information is not performed in the first resource; and
transmit a HARQ-ACK codebook including the first HARQ-ACK information using the second resource to the base station,
wherein the second resource is determined within the time window, and the transmission of the first HARQ-ACK information is not performed in a resource after the time window.

11. The terminal of claim 10, wherein the processor further causes the terminal to:
receive a second SPS PDSCH from the base station; and
generate second HARQ-ACK information of the second SPS PDSCH,
wherein the HARQ-ACK codebook transmitted in the second resource includes the first HARQ-ACK information and the second HARQ-ACK information.

12. The terminal of claim 11, wherein the first HARQ-ACK information is deferred HARQ-ACK information, and the second HARQ-ACK information is non-deferred HARQ-ACK information.

13. The terminal of claim 10, wherein the HARQ-ACK codebook is a Type1 HARQ-ACK codebook or a Type2 HARQ-ACK codebook.

14. The terminal of claim 10, wherein the first resource is a first slot or a first subslot, and the second resource is a second slot or a second subslot.

* * * * *